US012709879B2

(12) United States Patent
Gibson et al.

(10) Patent No.: US 12,709,879 B2
(45) **Date of Patent: *Aug. 18, 2026**

(54) HYDRANT NOZZLE CAP ADAPTER

(71) Applicant: Mueller International, LLC, Atlanta, GA (US)

(72) Inventors: Daryl Lee Gibson, Chattanooga, TN (US); Timofey Sitnikov, McDonald, TN (US); Paul S. Gifford, Chattanooga, TN (US)

(73) Assignee: Mueller International, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/790,252

(22) Filed: Jul. 31, 2024

(65) Prior Publication Data

US 2024/0392543 A1 Nov. 28, 2024

Related U.S. Application Data

(63) Continuation of application No. 18/071,359, filed on Nov. 29, 2022, now Pat. No. 12,084,844, which is a (Continued)

(51) Int. Cl.
*F16L 55/115* (2006.01)
*E03B 9/06* (2006.01)
(Continued)

(52) U.S. Cl.
CPC .............. *E03B 9/06* (2013.01); *F16L 37/248* (2013.01); *F16L 37/252* (2013.01); (Continued)

(58) Field of Classification Search
CPC .... E03B 9/06; Y10T 137/5468; F16L 37/248; F16L 37/252; F16L 55/1155;
(Continued)

(56) References Cited

U.S. PATENT DOCUMENTS

| | | | |
|---|---|---|---|
| 691,904 | A | 1/1902 | Hallbergh |
| 1,165,429 | A | 12/1915 | Mass |

(Continued)

FOREIGN PATENT DOCUMENTS

| | | |
|---|---|---|
| AU | 2009308949 | 5/2010 |
| AU | 2010249499 | 5/2015 |

(Continued)

OTHER PUBLICATIONS

US 11,296,403 B2, 04/2022, Gibson et al. (withdrawn)
(Continued)

*Primary Examiner* — Kevin F Murphy
(74) *Attorney, Agent, or Firm* — Smith, Gambrell & Russell LLP

(57) ABSTRACT

Example aspects of a nozzle cap adapter, a nozzle cap assembly, and a method for method for mounting a nozzle cap to a fire hydrant nozzle are disclosed. The nozzle cap adapter can comprise an adapter ring defining a first adapter ring end, a second adapter ring end opposite the first adapter ring end, and an interior void extending from the first adapter ring end to the second adapter ring end; a nozzle connector extending from the second end of the adapter ring, the nozzle connector configured to rotatably engage a fire hydrant nozzle; and a latch coupled to the adapter ring and configured to removably lock the nozzle cap adapter onto the fire hydrant nozzle.

16 Claims, 13 Drawing Sheets

Related U.S. Application Data continuation of application No. 16/874,340, filed on May 14, 2020, now Pat. No. 11,542,690.

(51) Int. Cl.
*F16L 37/248* (2006.01)
*F16L 37/252* (2006.01)

(52) U.S. Cl.
CPC ....... *F16L 55/1155* (2013.01); *F16L 55/1157* (2013.01); *Y10T 137/5468* (2015.04)

(58) Field of Classification Search
CPC ... F16L 55/1157; F16L 37/12; F16L 37/1205; F16L 37/121; F16L 37/127
USPC .......................................................... 285/87
See application file for complete search history.

(56) References Cited

U.S. PATENT DOCUMENTS

| | | | | |
|---|---|---|---|---|
| 1,738,094 A | | 12/1929 | Caldwell | |
| 1,788,618 A | | 1/1931 | Cover | |
| 1,808,209 A | | 6/1931 | Earl | |
| 1,808,212 A | | 6/1931 | Earl | |
| 2,171,173 A | | 8/1939 | Coyer | |
| 2,302,529 A | | 11/1942 | Cornell et al. | |
| 3,254,528 A | | 6/1966 | Michael | |
| 3,254,660 A | | 6/1966 | Ray | |
| 3,592,967 A | | 7/1971 | Harris | |
| 3,593,957 A | | 7/1971 | Dolter et al. | |
| 3,612,922 A | | 10/1971 | Furnival | |
| 3,653,261 A | | 4/1972 | Feldman | |
| 3,662,600 A | | 5/1972 | Rosano, Jr. et al. | |
| 3,672,233 A | | 6/1972 | Hjermstad | |
| 3,673,856 A | | 7/1972 | Panigati | |
| 3,705,385 A | | 12/1972 | Batz | |
| 3,731,534 A | | 5/1973 | Painley et al. | |
| 3,795,144 A | | 3/1974 | Marchesi | |
| 3,815,129 A | | 6/1974 | Sweany | |
| 4,000,753 A | | 1/1977 | Ellis | |
| 4,056,970 A | | 11/1977 | Sollish | |
| 4,083,229 A | | 4/1978 | Anway | |
| 4,093,997 A | | 6/1978 | Germer | |
| 4,120,031 A | | 10/1978 | Kincheloe et al. | |
| 4,126,338 A | | 11/1978 | Coel et al. | |
| 4,156,156 A | | 5/1979 | Sweany et al. | |
| 4,291,375 A | | 9/1981 | Wolf | |
| 4,333,028 A | | 6/1982 | Panton | |
| 4,388,690 A | | 6/1983 | Lumsden | |
| 4,414,633 A | | 11/1983 | Churchill | |
| 4,431,873 A | | 2/1984 | Dunn et al. | |
| 4,442,492 A | | 4/1984 | Karlsson et al. | |
| 4,462,249 A | | 7/1984 | Adams | |
| 4,465,970 A | | 8/1984 | Dimassimo et al. | |
| 4,467,236 A | | 8/1984 | Kolm et al. | |
| 4,516,213 A | | 5/1985 | Gidden | |
| 4,542,469 A | | 9/1985 | Brandberry et al. | |
| 4,543,817 A | | 10/1985 | Sugiyama | |
| 4,591,988 A | | 5/1986 | Klima et al. | |
| 4,638,314 A | | 1/1987 | Keller | |
| 4,707,852 A | | 11/1987 | Jahr et al. | |
| 4,727,900 A | | 3/1988 | Dooling et al. | |
| 4,763,686 A | | 8/1988 | Laurel | |
| 4,778,204 A | | 10/1988 | Berger | |
| 4,792,946 A | | 12/1988 | Mayo | |
| 4,796,466 A | | 1/1989 | Farmer | |
| 4,803,632 A | | 2/1989 | Frew et al. | |
| 4,827,969 A | | 5/1989 | Lyasko | |
| 4,833,618 A | | 5/1989 | Verma et al. | |
| 4,844,396 A | | 7/1989 | Norton | |
| 4,868,566 A | | 9/1989 | Strobel et al. | |
| 4,881,070 A | | 11/1989 | Burrowes et al. | |
| 4,893,679 A | | 1/1990 | Martin et al. | |
| 4,901,751 A | | 2/1990 | Story | |
| 4,930,358 A | | 6/1990 | Motegi et al. | |
| 4,940,976 A | | 7/1990 | Gastouniotis et al. | |
| 4,953,403 A | | 9/1990 | Springer | |
| 4,967,996 A | | 11/1990 | Sonoda et al. | |
| 4,984,498 A | | 1/1991 | Fishman | |
| 4,989,830 A | | 2/1991 | Ratnik | |
| 5,038,614 A | | 8/1991 | Bseisu et al. | |
| 5,052,215 A | | 10/1991 | Lewis | |
| 5,056,107 A | | 10/1991 | Johnson et al. | |
| 5,075,792 A | | 12/1991 | Brown et al. | |
| 5,078,006 A | | 1/1992 | Maresca et al. | |
| 5,079,715 A | | 1/1992 | Venkataraman et al. | |
| 5,085,082 A | | 2/1992 | Cantor et al. | |
| 5,090,234 A | | 2/1992 | Maresca et al. | |
| 5,117,676 A | | 6/1992 | Chang | |
| 5,118,464 A | | 6/1992 | Richardson et al. | |
| 5,121,344 A | | 6/1992 | Laage et al. | |
| 5,163,314 A | | 11/1992 | Maresca et al. | |
| 5,165,280 A | | 11/1992 | Sternberg et al. | |
| 5,170,657 A | | 12/1992 | Maresca et al. | |
| 5,174,155 A | | 12/1992 | Sugimoto | |
| 5,184,851 A | | 2/1993 | Sparling et al. | |
| 5,187,973 A | | 2/1993 | Kunze et al. | |
| 5,189,904 A | | 3/1993 | Maresca et al. | |
| 5,201,226 A | | 4/1993 | John et al. | |
| 5,203,202 A | | 4/1993 | Spencer | |
| 5,205,173 A | | 4/1993 | Allen | |
| 5,209,125 A | | 5/1993 | Kalinoski et al. | |
| 5,218,859 A | | 6/1993 | Stenstrom et al. | |
| 5,239,575 A | | 8/1993 | White et al. | |
| 5,243,862 A | | 9/1993 | Latimer | |
| 5,251,480 A | | 10/1993 | Brunson, IV et al. | |
| 5,251,940 A | * | 10/1993 | DeMoss | F16L 37/252 285/330 |
| 5,254,944 A | | 10/1993 | Holmes et al. | |
| 5,261,275 A | | 11/1993 | Davis | |
| 5,267,587 A | | 12/1993 | Brown | |
| 5,272,646 A | | 12/1993 | Farmer | |
| 5,279,160 A | | 1/1994 | Koch | |
| 5,287,884 A | | 2/1994 | Cohen | |
| 5,298,894 A | | 3/1994 | Cerny et al. | |
| 5,301,985 A | | 4/1994 | Terzini | |
| 5,303,592 A | | 4/1994 | Livingston | |
| 5,319,956 A | | 6/1994 | Bogle et al. | |
| 5,333,501 A | | 8/1994 | Okada et al. | |
| 5,335,547 A | | 8/1994 | Nakajima et al. | |
| 5,343,737 A | | 9/1994 | Baumoel | |
| 5,349,568 A | | 9/1994 | Kupperman et al. | |
| 5,351,655 A | | 10/1994 | Nuspl | |
| 5,361,636 A | | 11/1994 | Farstad et al. | |
| 5,367,911 A | | 11/1994 | Jewell et al. | |
| 5,381,136 A | | 1/1995 | Powers et al. | |
| 5,385,049 A | | 1/1995 | Hunt et al. | |
| 5,396,800 A | | 3/1995 | Drinon et al. | |
| 5,408,883 A | | 4/1995 | Clark et al. | |
| 5,416,724 A | | 5/1995 | Savic | |
| 5,434,911 A | | 7/1995 | Gray et al. | |
| 5,437,481 A | | 8/1995 | Spears et al. | |
| 5,438,329 A | | 8/1995 | Gastouniotis et al. | |
| 5,451,938 A | | 9/1995 | Brennan, Jr. | |
| 5,459,459 A | | 10/1995 | Lee | |
| 5,461,906 A | | 10/1995 | Bogle et al. | |
| 5,481,259 A | | 1/1996 | Bane | |
| 5,493,287 A | | 2/1996 | Bane | |
| 5,509,567 A | | 4/1996 | Lindahl | |
| 5,519,184 A | | 5/1996 | Umlas | |
| 5,519,387 A | | 5/1996 | Besier et al. | |
| 5,525,898 A | | 6/1996 | Lee et al. | |
| 5,526,691 A | | 6/1996 | Latimer et al. | |
| 5,531,099 A | | 7/1996 | Russo | |
| 5,548,530 A | | 8/1996 | Baumoel | |
| 5,553,094 A | | 9/1996 | Johnson et al. | |
| 5,581,037 A | | 12/1996 | Kwun et al. | |
| 5,590,179 A | | 12/1996 | Shincovich et al. | |
| 5,591,912 A | | 1/1997 | Spisak et al. | |
| 5,594,740 A | | 1/1997 | Ladue | |
| 5,594,776 A | | 1/1997 | Dent | |
| 5,602,327 A | | 2/1997 | Torizuka et al. | |
| 5,611,948 A | | 3/1997 | Hawkins | |
| 5,617,084 A | | 4/1997 | Sears | |

(56) References Cited

U.S. PATENT DOCUMENTS 5,619,423 A 4/1997 Scrantz
5,623,203 A 4/1997 Hosohara et al.
5,631,554 A 5/1997 Briese et al.
5,633,467 A 5/1997 Paulson
5,639,958 A 6/1997 Lange
5,654,692 A 8/1997 Baxter, Jr. et al.
5,655,299 A 8/1997 Lindahl
5,655,561 A 8/1997 Wendel et al.
5,666,655 A 9/1997 Ishikawa et al.
5,673,252 A 9/1997 Johnson et al.
5,686,828 A 11/1997 Peterman et al.
5,708,195 A 1/1998 Kurisu et al.
5,708,211 A 1/1998 Jepson et al.
5,714,931 A 2/1998 Petite
5,746,344 A 5/1998 Syler et al.
5,746,611 A 5/1998 Brown et al.
5,748,104 A 5/1998 Argyroudis et al.
5,751,797 A 5/1998 Saadeh
5,754,101 A 5/1998 Tsunetomi et al.
5,760,306 A 6/1998 Wyatt et al.
5,767,790 A 6/1998 Jovellana
5,787,358 A 7/1998 Takahashi
5,789,720 A 8/1998 Lagally et al.
5,798,457 A 8/1998 Paulson
5,801,643 A 9/1998 Williams et al.
5,815,086 A 9/1998 Ivie et al.
5,838,633 A 11/1998 Sinha
5,852,658 A 12/1998 Knight et al.
5,866,820 A 2/1999 Camplin et al.
5,877,703 A 3/1999 Bloss et al.
5,892,163 A 4/1999 Johnson
5,892,441 A 4/1999 Woolley et al.
5,892,758 A 4/1999 Argyroudis
5,898,412 A 4/1999 Jones et al.
5,907,100 A 5/1999 Cook
5,907,491 A 5/1999 Canada et al.
5,917,454 A 6/1999 Hill et al.
5,924,051 A 7/1999 Provost et al.
5,926,103 A 7/1999 Petite
5,926,531 A 7/1999 Petite
5,940,009 A 8/1999 Loy et al.
5,963,146 A 10/1999 Johnson et al.
5,963,557 A 10/1999 Eng
5,965,818 A 10/1999 Wang
5,970,434 A 10/1999 Brophy et al.
5,971,011 A 10/1999 Price
5,974,862 A 11/1999 Lander et al.
5,979,863 A 11/1999 Lousberg
5,986,573 A 11/1999 Franklin et al.
5,987,990 A 11/1999 Worthington et al.
5,994,892 A 11/1999 Turino et al.
5,996,608 A 12/1999 Hunter et al.
6,000,277 A 12/1999 Smith
6,000,288 A 12/1999 Kwun et al.
6,003,376 A 12/1999 Burns et al.
6,006,212 A 12/1999 Schleich et al.
6,009,897 A 1/2000 Hill et al.
6,023,986 A 2/2000 Smith et al.
6,028,522 A 2/2000 Petite
6,028,855 A 2/2000 Hirsch
6,031,455 A 2/2000 Grube et al.
6,031,466 A 2/2000 Leshets et al.
6,035,717 A 3/2000 Carodiskey
6,044,062 A 3/2000 Brownrigg et al.
6,058,374 A 5/2000 Guthrie et al.
6,058,957 A 5/2000 Honigsbaum
6,060,994 A 5/2000 Chen
6,069,571 A 5/2000 Tell
6,076,407 A 6/2000 Levesque et al.
6,081,204 A 6/2000 Lavoie et al.
6,082,193 A 7/2000 Paulson
6,089,253 A 7/2000 Stehling et al.
6,102,444 A 8/2000 Kozey
6,104,349 A 8/2000 Cohen
6,115,677 A 9/2000 Perthold et al.
6,125,703 A 10/2000 Maclauchlan et al.
6,127,823 A 10/2000 Atherton
6,127,987 A 10/2000 Maruyama et al.
6,133,885 A 10/2000 Luniak et al.
6,138,512 A 10/2000 Roberts et al.
6,138,514 A 10/2000 Iwamoto et al.
6,150,955 A 11/2000 Tracy et al.
6,152,173 A 11/2000 Makowan
6,163,276 A 12/2000 Irving et al.
6,164,137 A 12/2000 Hancock et al.
6,170,334 B1 1/2001 Paulson
6,172,616 B1 1/2001 Johnson et al.
6,175,380 B1 1/2001 Van Den Bosch
6,178,816 B1 1/2001 Katzman et al.
6,181,294 B1 1/2001 Porter et al.
6,192,352 B1 2/2001 Alouani et al.
6,195,018 B1 2/2001 Ragle et al.
6,208,266 B1 3/2001 Lyons et al.
6,218,953 B1 4/2001 Petite
6,233,327 B1 5/2001 Petite
6,243,657 B1 6/2001 Tuck et al.
6,246,677 B1 6/2001 Nap et al.
6,249,516 B1 6/2001 Brownrigg et al.
6,267,000 B1 7/2001 Harper et al.
6,276,213 B1 8/2001 Lee et al.
6,288,641 B1 9/2001 Casais
6,296,066 B1 10/2001 Terry
6,317,051 B1 11/2001 Cohen
6,333,975 B1 12/2001 Brunn et al.
6,343,510 B1 2/2002 Neeson et al.
6,363,788 B1 4/2002 Gorman et al.
6,373,399 B1 4/2002 Johnson et al.
6,389,881 B1 5/2002 Yang et al.
6,392,538 B1 5/2002 Shere
6,401,525 B1 6/2002 Jamieson
6,404,343 B1 6/2002 Andou et al.
6,405,047 B1 6/2002 Moon
6,424,270 B1 7/2002 Ali
6,426,027 B1 7/2002 Scarborough et al.
6,430,268 B1 8/2002 Petite
6,437,692 B1 8/2002 Petite et al.
6,442,999 B1 9/2002 Baumoel
6,450,542 B1 9/2002 McCue
6,453,247 B1 9/2002 Hunaidi
6,456,197 B1 9/2002 Lauritsen et al.
6,470,749 B1 10/2002 Han et al.
6,470,903 B2 10/2002 Reyman
6,493,377 B2 12/2002 Schilling et al.
6,512,463 B1 1/2003 Campbell et al.
6,528,957 B1 3/2003 Luchaco
6,530,263 B1 3/2003 Chana
6,536,469 B2 3/2003 Dilger et al.
6,538,577 B1 3/2003 Ehrke et al.
6,560,543 B2 5/2003 Wolfe et al.
6,561,032 B1 5/2003 Hunaidi
6,564,159 B1 5/2003 Lavoie et al.
6,567,006 B1 5/2003 Lander et al.
6,568,416 B2 5/2003 Tucker
6,577,961 B1 6/2003 Hubbard et al.
6,578,422 B2 6/2003 Lam et al.
6,581,458 B1 6/2003 Hathaway et al.
6,595,038 B2 7/2003 Williams et al.
6,606,059 B1 8/2003 Barabash
6,618,578 B1 9/2003 Petite
6,618,709 B1 9/2003 Sneeringer
6,624,628 B1 9/2003 Kwun et al.
6,624,750 B1 9/2003 Marman et al.
6,628,207 B1 9/2003 Hemminger et al.
6,628,764 B1 9/2003 Petite
6,633,781 B1 10/2003 Lee et al.
6,639,562 B2 10/2003 Suganthan et al.
6,647,762 B1 11/2003 Roy
6,651,503 B2 11/2003 Bazarov et al.
6,653,945 B2 11/2003 Johnson et al.
6,657,552 B2 12/2003 Belski et al.
6,666,095 B2 12/2003 Thomas et al.
6,667,709 B1 12/2003 Hansen et al.
6,675,071 B1 1/2004 Griffin, Jr. et al.
6,677,861 B1 1/2004 Henry et al.

(56) References Cited

U.S. PATENT DOCUMENTS 6,701,956 B1 3/2004 Berger
6,707,762 B1 3/2004 Goodman et al.
6,710,600 B1 3/2004 Kopecki et al.
6,710,721 B1 3/2004 Holowick
6,725,705 B1 4/2004 Huebler et al.
6,734,674 B1 5/2004 Struse
6,745,136 B2 6/2004 Lam et al.
6,747,557 B1 6/2004 Petite et al.
6,751,560 B1 6/2004 Tingley et al.
6,763,730 B1 7/2004 Wray
6,772,636 B2 8/2004 Lam et al.
6,772,637 B2 8/2004 Bazarov et al.
6,772,638 B2 8/2004 Matney et al.
6,781,369 B2 8/2004 Paulson et al.
6,782,751 B2 8/2004 Linares et al.
6,789,427 B2 9/2004 Batzinger et al.
6,791,318 B2 9/2004 Paulson et al.
6,798,352 B2 9/2004 Holowick
6,799,455 B1 10/2004 Neefeldt et al.
6,799,466 B2 10/2004 Chinn
6,813,949 B2 11/2004 Masaniello et al.
6,813,950 B2 11/2004 Glascock et al.
6,816,072 B2 11/2004 Zoratti
6,820,016 B2 11/2004 Brown et al.
6,822,742 B1 11/2004 Kalayeh et al.
6,836,737 B2 12/2004 Petite et al.
6,843,131 B2 1/2005 Graff et al.
6,847,300 B2 1/2005 Yee et al.
6,848,303 B2 2/2005 Oeder et al.
6,848,313 B2 2/2005 Krieg et al.
6,851,319 B2 2/2005 Ziola et al.
6,880,567 B2 4/2005 Klaver
6,889,703 B2 5/2005 Bond
6,891,838 B1 5/2005 Petite et al.
6,904,818 B2 6/2005 Harthorn et al.
6,912,472 B2 6/2005 Mizushina et al.
6,914,533 B2 7/2005 Petite
6,914,893 B2 7/2005 Petite
6,920,792 B2 7/2005 Flora et al.
6,931,445 B2 8/2005 Davis
6,931,931 B2 8/2005 Graff et al.
6,935,178 B2 8/2005 Prause
6,945,113 B2 9/2005 Siverling et al.
6,946,972 B2 9/2005 Mueller et al.
6,952,970 B1 10/2005 Furmidge et al.
6,954,701 B2 10/2005 Wolfe
6,954,814 B1 10/2005 Leach
6,957,157 B2 10/2005 Lander
6,968,727 B2 11/2005 Kwun et al.
6,972,677 B2 12/2005 Coulthard
6,978,210 B1 12/2005 Suter et al.
6,978,832 B2 12/2005 Gardner et al.
6,980,079 B1 12/2005 Shintani et al.
6,982,651 B2 1/2006 Fischer
7,008,239 B1 3/2006 Ju
7,009,530 B2 3/2006 Zigdon et al.
7,012,546 B1 3/2006 Zigdon et al.
7,042,368 B2 5/2006 Patterson et al.
7,051,577 B2 5/2006 Komninos
7,053,767 B2 5/2006 Petite et al.
7,054,271 B2 5/2006 Brownrigg
7,061,924 B1 6/2006 Durrant et al.
7,072,945 B1 7/2006 Nieminen et al.
7,079,810 B2 7/2006 Petite et al.
7,080,557 B2 7/2006 Adnan
7,088,239 B2 8/2006 Basinger et al.
7,089,125 B2 8/2006 Sonderegger
7,099,781 B1 8/2006 Heidl et al.
7,103,511 B2 9/2006 Petite
7,109,929 B1 9/2006 Ryken, Jr.
7,111,516 B2 9/2006 Bazarov et al.
7,111,817 B2 9/2006 Teti et al.
7,117,051 B2 10/2006 Landry et al.
7,123,628 B1 10/2006 Hwang
7,124,184 B2 10/2006 Chung et al.
7,128,083 B2 10/2006 Fleury, Jr. et al.
7,137,550 B1 11/2006 Petite
7,140,253 B2 11/2006 Merki et al.
7,142,107 B2 11/2006 Kates
7,143,645 B2 12/2006 Benson et al.
7,143,659 B2 12/2006 Stout et al.
7,171,854 B2 2/2007 Nagashima et al.
7,228,726 B2 6/2007 Kates
7,231,331 B2 6/2007 Davis
7,234,355 B2 6/2007 Dewangan et al.
7,240,574 B2 7/2007 Sapelnikov
7,248,179 B2 7/2007 Smit
7,248,181 B2 7/2007 Patterson et al.
7,250,874 B2 7/2007 Mueller et al.
7,255,007 B2 8/2007 Messer et al.
7,256,704 B2 8/2007 Yoon et al.
7,261,002 B1 8/2007 Gysling et al.
7,263,073 B2 8/2007 Petite et al.
7,266,992 B2 9/2007 Shamout et al.
7,267,014 B2 9/2007 Winter
7,272,635 B1 9/2007 Longtin et al.
7,274,996 B2 9/2007 Lapinski
7,283,063 B2 10/2007 Salser, Jr.
7,284,433 B2 10/2007 Ales et al.
7,292,143 B2 11/2007 Drake et al.
7,293,461 B1 11/2007 Girndt
7,295,128 B2 11/2007 Petite
7,299,697 B2 11/2007 Siddu et al.
7,301,456 B2 11/2007 Han
7,304,587 B2 12/2007 Boaz
7,310,877 B2 12/2007 Cao et al.
7,315,257 B2 1/2008 Patterson et al.
7,328,618 B2 2/2008 Hunaidi et al.
7,331,215 B2 2/2008 Bond
7,342,504 B2 3/2008 Crane et al.
7,346,030 B2 3/2008 Cornwall
7,349,766 B2 3/2008 Rodgers
7,353,280 B2 4/2008 Chiles et al.
7,356,444 B2 4/2008 Blemel
7,356,614 B2 4/2008 Kim et al.
7,360,462 B2 4/2008 Nozaki et al.
7,363,031 B1 4/2008 Aisa
7,373,808 B2 5/2008 Zanker et al.
7,380,466 B2 6/2008 Deeg
7,383,721 B2 6/2008 Parsons et al.
7,385,524 B1 6/2008 Orlosky
7,392,709 B2 7/2008 Eckert
7,397,907 B2 7/2008 Petite
7,405,391 B2 7/2008 Ogisu et al.
7,412,882 B2 8/2008 Lazar et al.
7,412,890 B1 8/2008 Johnson et al.
7,414,395 B2 8/2008 Gao et al.
7,417,557 B2 8/2008 Osterloh et al.
7,423,985 B1 9/2008 Hill
7,424,527 B2 9/2008 Petite
7,426,879 B2 9/2008 Nozaki et al.
7,443,313 B2 10/2008 Davis et al.
7,444,401 B1 10/2008 Keyghobad et al.
7,453,373 B2 11/2008 Cumeralto et al.
D583,692 S 12/2008 Ball et al.
7,458,267 B2 12/2008 McCoy
7,468,661 B2 12/2008 Petite et al.
7,475,596 B2 1/2009 Hunaidi et al.
7,478,108 B2 1/2009 Townsend et al.
7,480,501 B2 1/2009 Petite
7,493,817 B2 2/2009 Germata
7,523,666 B2 4/2009 Thompson et al.
7,526,539 B1 4/2009 Hsu
7,526,944 B2 5/2009 Sabata et al.
7,530,270 B2 5/2009 Nozaki et al.
7,533,693 B2 5/2009 Colton et al.
7,543,500 B2 6/2009 Litzenberg et al.
7,549,439 B2 6/2009 Kimura et al.
7,554,345 B2 6/2009 Vokey
7,564,540 B2 7/2009 Paulson
7,587,942 B2 9/2009 Smith et al.
7,590,496 B2 9/2009 Blemel
7,596,458 B2 9/2009 Lander
7,604,216 B2 10/2009 Gebler

(56) References Cited

U.S. PATENT DOCUMENTS 7,607,351 B2 10/2009 Allison et al.
7,623,427 B2 11/2009 Jann et al.
7,647,829 B2 1/2010 Junker et al.
7,650,425 B2 1/2010 Davis
7,650,790 B2 1/2010 Wright
7,657,403 B2 2/2010 Stripf et al.
7,668,670 B2 2/2010 Lander
7,671,480 B2 3/2010 Pitchford et al.
7,680,625 B2 3/2010 Trowbridge et al.
7,690,258 B2 4/2010 Minagi et al.
7,690,393 B2 4/2010 Nagle et al.
7,694,564 B2 4/2010 Brignac et al.
7,694,934 B2 4/2010 Irwin
7,696,940 B1 4/2010 Macdonald
7,697,492 B2 4/2010 Petite
7,711,217 B2 5/2010 Takahashi et al.
7,739,378 B2 6/2010 Petite
7,740,024 B2 6/2010 Brodeur
7,746,246 B2 6/2010 Salser
7,751,989 B2 7/2010 Owens et al.
7,752,309 B2 7/2010 Keyghobad et al.
7,756,086 B2 7/2010 Petite
7,760,703 B2 7/2010 Kubler et al.
7,775,422 B2 8/2010 Winter et al.
7,783,738 B2 8/2010 Keyghobad et al.
7,792,946 B2 9/2010 Keyghobad et al.
7,806,382 B1 10/2010 Palumbo et al.
7,810,378 B2 10/2010 Hunaidi et al.
7,817,063 B2 10/2010 Hawkins et al.
7,825,793 B1 11/2010 Spillman et al.
7,843,379 B2 11/2010 Menzer et al.
7,854,165 B2 12/2010 Ball et al.
7,870,080 B2 1/2011 Budike, Jr.
7,880,641 B2 2/2011 Parris et al.
7,962,101 B2 6/2011 Vaswani et al.
7,980,317 B1 7/2011 Preta et al.
8,009,108 B2 8/2011 Eisenbeis et al.
8,014,791 B2 9/2011 Guigne et al.
8,020,579 B2 9/2011 Ruhs
8,047,072 B2 11/2011 Ball
8,109,131 B2 2/2012 Winter
8,140,667 B2 3/2012 Keyghobad et al.
8,249,042 B2 8/2012 Sparr et al.
8,281,654 B2 10/2012 Ball et al.
8,300,626 B2 10/2012 Thubert et al.
8,319,508 B2 11/2012 Vokey
8,351,409 B2 1/2013 Albert et al.
8,353,309 B1 1/2013 Embry et al.
8,391,177 B2 3/2013 Picard
8,407,333 B2 3/2013 Keyghobad
8,549,131 B2 10/2013 Keyghobad et al.
8,589,092 B2 11/2013 Plouffe et al.
8,614,745 B1 12/2013 Al Azemi
8,657,021 B1 2/2014 Preta et al.
8,660,134 B2 2/2014 Splitz
8,668,206 B2 3/2014 Ball
8,674,830 B2 3/2014 Lanham et al.
8,823,509 B2 9/2014 Hyland et al.
8,833,390 B2 9/2014 Ball et al.
8,843,241 B2 9/2014 Saberi et al.
8,855,569 B2 10/2014 Splitz
8,931,337 B2 1/2015 Renoud
8,931,505 B2 1/2015 Hyland et al.
9,053,519 B2 6/2015 Scolnicov et al.
9,202,362 B2 12/2015 Hyland et al.
9,291,520 B2 3/2016 Fleury, Jr. et al.
9,315,973 B2 4/2016 Varman et al.
9,496,943 B2 11/2016 Parish et al.
9,528,903 B2 12/2016 Zusman
9,562,623 B2 2/2017 Clark
9,593,999 B2 3/2017 Fleury
9,670,650 B2 6/2017 Pinney et al.
9,772,250 B2 9/2017 Richarz et al.
9,780,433 B2 10/2017 Schwengler et al.
9,799,204 B2 10/2017 Hyland et al.
9,849,322 B2 12/2017 Hyland et al.
9,861,848 B2 1/2018 Hyland et al.
9,970,805 B2 5/2018 Cole et al.
10,175,135 B2 1/2019 Dintakurt et al.
10,283,857 B2 5/2019 Ortiz et al.
10,305,178 B2 5/2019 Gibson et al.
10,317,384 B2 6/2019 Morrow et al.
10,386,257 B2 8/2019 Fleury, Jr. et al.
10,857,403 B2 12/2020 Hyland et al.
10,859,462 B2 12/2020 Gibson et al.
10,881,888 B2 1/2021 Hyland et al.
11,047,761 B1 6/2021 Frackelton et al.
11,067,464 B2 7/2021 Moreno et al.
11,336,004 B2 5/2022 Gibson et al.
11,342,656 B2 5/2022 Gibson et al.
11,422,054 B2 8/2022 Gibson et al.
11,469,494 B2 10/2022 Ortiz et al.
11,473,993 B2 10/2022 Gibson et al.
11,527,821 B2 12/2022 Ortiz et al.
11,542,690 B2 1/2023 Gibson et al.
11,590,376 B2 2/2023 Hyland et al.
11,624,674 B2 4/2023 Gibson et al.
11,630,021 B2 4/2023 Fleury, Jr. et al.
11,652,284 B2 5/2023 Ortiz et al.
11,680,865 B2 6/2023 Fleury, Jr. et al.
11,692,901 B2 7/2023 Gibson et al.
11,837,782 B2 12/2023 Ortiz et al.
12,078,572 B2 9/2024 Gibson et al.
12,084,844 B2 9/2024 Gibson et al.
12,212,053 B2 1/2025 Gibson et al.
12,489,202 B2 12/2025 Gibson et al.
12,539,437 B2 2/2026 Hyland et al.
12,578,245 B2 3/2026 Sobhani et al.
2001/0010032 A1 7/2001 Ehlers et al.
2001/0013488 A1 8/2001 Fukunaga et al.
2001/0024163 A1 9/2001 Petite
2001/0045129 A1 11/2001 Williams et al.
2001/0048030 A1 12/2001 Sharood et al.
2002/0013679 A1 1/2002 Petite
2002/0019725 A1 2/2002 Petite
2002/0031101 A1 3/2002 Petite
2002/0043549 A1 4/2002 Taylor et al.
2002/0051546 A1 5/2002 Bizjak
2002/0062392 A1 5/2002 Nishikawa et al.
2002/0067717 A1 6/2002 Raschke et al.
2002/0073183 A1 6/2002 Yoon et al.
2002/0089802 A1 7/2002 Beckwith
2002/0124633 A1 9/2002 Yang et al.
2002/0130768 A1 9/2002 Che et al.
2002/0159434 A1 10/2002 Gosior et al.
2002/0159584 A1 10/2002 Sindalovsky et al.
2002/0169643 A1 11/2002 Petite et al.
2002/0190956 A1 12/2002 Klein et al.
2003/0009515 A1 1/2003 Lee et al.
2003/0018733 A1 1/2003 Yoon et al.
2003/0018776 A1 1/2003 Yoon et al.
2003/0034900 A1 2/2003 Han
2003/0036810 A1 2/2003 Petite
2003/0046377 A1 3/2003 Daum et al.
2003/0074109 A1 4/2003 Jeong et al.
2003/0076241 A1 4/2003 Middleton
2003/0093484 A1 5/2003 Petite
2003/0107485 A1 6/2003 Zoratti
2003/0150488 A1 8/2003 Fleury, Jr. et al.
2003/0174070 A1 9/2003 Garrod et al.
2003/0193193 A1 10/2003 Harrington et al.
2004/0010561 A1 1/2004 Kim et al.
2004/0054747 A1 3/2004 Breh et al.
2004/0129312 A1 7/2004 Cuzzo et al.
2004/0139210 A1 7/2004 Lee et al.
2004/0158333 A1 8/2004 Ha et al.
2004/0173006 A1 9/2004 McCoy et al.
2004/0183687 A1 9/2004 Petite et al.
2004/0187922 A1 9/2004 Fleury, Jr. et al.
2004/0201215 A1 10/2004 Steingass
2004/0264416 A1 12/2004 Robinson et al.
2005/0005680 A1 1/2005 Anderson
2005/0067022 A1 3/2005 Istre
2005/0072214 A1 4/2005 Cooper

(56) References Cited

U.S. PATENT DOCUMENTS

| | | | |
|---|---|---|---|
| 2005/0078631 | A1 | 4/2005 | Cornwell |
| 2005/0084418 | A1 | 4/2005 | Hill et al. |
| 2005/0096753 | A1 | 5/2005 | Arling |
| 2005/0104747 | A1 | 5/2005 | Silic et al. |
| 2005/0121880 | A1 | 6/2005 | Santangelo |
| 2005/0153586 | A1 | 7/2005 | Girinon |
| 2005/0159823 | A1 | 7/2005 | Hayes |
| 2005/0190784 | A1 | 9/2005 | Stine |
| 2005/0195768 | A1 | 9/2005 | Petite et al. |
| 2005/0195775 | A1 | 9/2005 | Petite et al. |
| 2005/0201379 | A1 | 9/2005 | Zhang et al. |
| 2005/0201397 | A1 | 9/2005 | Petite |
| 2005/0203647 | A1 | 9/2005 | Landry et al. |
| 2005/0246295 | A1 | 11/2005 | Cameron |
| 2005/0251367 | A1 | 11/2005 | Kahn et al. |
| 2005/0279169 | A1 | 12/2005 | Lander |
| 2006/0012491 | A1 | 1/2006 | Mahowald |
| 2006/0028355 | A1 | 2/2006 | Patterson et al. |
| 2006/0041655 | A1 | 2/2006 | Holloway et al. |
| 2006/0046664 | A1 | 3/2006 | Paradiso et al. |
| 2006/0098576 | A1 | 5/2006 | Brownrigg et al. |
| 2006/0101915 | A1 | 5/2006 | Thompson et al. |
| 2006/0158347 | A1 | 7/2006 | Roche et al. |
| 2006/0173648 | A1 | 8/2006 | Chang |
| 2006/0174707 | A1 | 8/2006 | Zhang |
| 2006/0181414 | A1 | 8/2006 | Bandy et al. |
| 2006/0201550 | A1 | 9/2006 | Blyth et al. |
| 2006/0218266 | A1 | 9/2006 | Matsumoto et al. |
| 2006/0273896 | A1 | 12/2006 | Kates |
| 2006/0283251 | A1 | 12/2006 | Hunaidi |
| 2006/0284784 | A1 | 12/2006 | Smith et al. |
| 2007/0044552 | A1 | 3/2007 | Huang |
| 2007/0051187 | A1 | 3/2007 | McDearmon |
| 2007/0059986 | A1 | 3/2007 | Rockwell |
| 2007/0063866 | A1 | 3/2007 | Webb |
| 2007/0091825 | A1 | 4/2007 | Budampati et al. |
| 2007/0113618 | A1 | 5/2007 | Yokoi et al. |
| 2007/0130317 | A1 | 6/2007 | Lander |
| 2007/0284293 | A1 | 12/2007 | Pitchford et al. |
| 2007/0293221 | A1 | 12/2007 | Hwang et al. |
| 2007/0295406 | A1 | 12/2007 | German et al. |
| 2007/0298779 | A1 | 12/2007 | Wolman et al. |
| 2008/0030319 | A1 | 2/2008 | Mckeena et al. |
| 2008/0043637 | A1 | 2/2008 | Rahman |
| 2008/0061769 | A1 | 3/2008 | Junk et al. |
| 2008/0068216 | A1 | 3/2008 | Borisov |
| 2008/0078567 | A1 | 4/2008 | Miller et al. |
| 2008/0079640 | A1 | 4/2008 | Yang |
| 2008/0084260 | A1 | 4/2008 | Swartzentruber |
| 2008/0086560 | A1 | 4/2008 | Monier et al. |
| 2008/0095403 | A1 | 4/2008 | Benhammou |
| 2008/0109090 | A1 | 5/2008 | Esmaili et al. |
| 2008/0129536 | A1 | 6/2008 | Randall et al. |
| 2008/0149180 | A1 | 6/2008 | Parris et al. |
| 2008/0150750 | A1 | 6/2008 | Parris |
| 2008/0168840 | A1 | 7/2008 | Seeley et al. |
| 2008/0169910 | A1 | 7/2008 | Greene et al. |
| 2008/0186898 | A1 | 8/2008 | Petite |
| 2008/0189056 | A1 | 8/2008 | Heidl et al. |
| 2008/0195329 | A1 | 8/2008 | Prince et al. |
| 2008/0238711 | A1 | 10/2008 | Payne et al. |
| 2008/0240078 | A1 | 10/2008 | Thubert |
| 2008/0281534 | A1 | 11/2008 | Hurley |
| 2008/0291054 | A1 | 11/2008 | Groft |
| 2008/0307623 | A1 | 12/2008 | Furukawa |
| 2008/0314122 | A1 | 12/2008 | Hunaidi |
| 2009/0018831 | A1 | 1/2009 | Morita |
| 2009/0025798 | A1 | 1/2009 | Garcia et al. |
| 2009/0044628 | A1 | 2/2009 | Lotscher |
| 2009/0058676 | A1 | 3/2009 | Orlosky |
| 2009/0066524 | A1 | 3/2009 | Yukawa et al. |
| 2009/0068947 | A1 | 3/2009 | Petite |
| 2009/0121860 | A1 | 5/2009 | Kimmel et al. |
| 2009/0133887 | A1 | 5/2009 | Garcia et al. |
| 2009/0139336 | A1 | 6/2009 | Trowbridge, Jr. et al. |
| 2009/0153357 | A1 | 6/2009 | Bushman et al. |
| 2009/0182099 | A1 | 7/2009 | Noro et al. |
| 2009/0188313 | A1 | 7/2009 | Ball |
| 2009/0214941 | A1 | 8/2009 | Buck et al. |
| 2009/0215424 | A1 | 8/2009 | Petite |
| 2009/0243840 | A1 | 10/2009 | Petite et al. |
| 2009/0255346 | A1 | 10/2009 | Hendey et al. |
| 2009/0271045 | A1 | 10/2009 | Savelle et al. |
| 2009/0278293 | A1 | 11/2009 | Yoshinaka et al. |
| 2009/0287838 | A1 | 11/2009 | Keyghobad et al. |
| 2009/0301571 | A1 | 12/2009 | Ruhs |
| 2009/0309755 | A1 | 12/2009 | Williamson et al. |
| 2009/0322453 | A1 | 12/2009 | Kawaguchi |
| 2010/0017465 | A1 | 1/2010 | Brownrigg et al. |
| 2010/0039984 | A1 | 2/2010 | Brownrigg |
| 2010/0060479 | A1 | 3/2010 | Salter |
| 2010/0077234 | A1 | 3/2010 | Das |
| 2010/0089127 | A1 | 4/2010 | Farnsworth |
| 2010/0156632 | A1 | 6/2010 | Hyland et al. |
| 2010/0194582 | A1 | 8/2010 | Petite |
| 2010/0250054 | A1 | 9/2010 | Petite |
| 2010/0259461 | A1 | 10/2010 | Eisenbeis et al. |
| 2010/0265909 | A1 | 10/2010 | Petite et al. |
| 2010/0290201 | A1 | 11/2010 | Takeuchi et al. |
| 2010/0295672 | A1 | 11/2010 | Hyland et al. |
| 2010/0302111 | A1 | 12/2010 | Kotaka et al. |
| 2010/0312881 | A1 | 12/2010 | Davis et al. |
| 2010/0329232 | A1 | 12/2010 | Tubb et al. |
| 2011/0018762 | A1 | 1/2011 | Walley et al. |
| 2011/0030482 | A1 | 2/2011 | Meeusen et al. |
| 2011/0044276 | A1 | 2/2011 | Albert et al. |
| 2011/0063124 | A1 | 3/2011 | Bartram et al. |
| 2011/0063172 | A1 | 3/2011 | Podduturi |
| 2011/0066297 | A1 | 3/2011 | Saberi |
| 2011/0079402 | A1 | 4/2011 | Darby et al. |
| 2011/0102281 | A1 | 5/2011 | Su |
| 2011/0108136 | A1 | 5/2011 | Margalit et al. |
| 2011/0140909 | A1 | 6/2011 | Olson et al. |
| 2011/0162463 | A1 | 7/2011 | Allen |
| 2011/0308638 | A1 | 12/2011 | Hyland et al. |
| 2012/0007743 | A1 | 1/2012 | Solomon |
| 2012/0007744 | A1 | 1/2012 | Pal et al. |
| 2012/0049021 | A1 | 3/2012 | Nahar |
| 2012/0068476 | A1 | 3/2012 | Bradfield |
| 2012/0068477 | A1 | 3/2012 | Bradfield |
| 2012/0079872 | A1 | 4/2012 | Schaefer et al. |
| 2012/0098710 | A1 | 4/2012 | Seal et al. |
| 2012/0106518 | A1 | 5/2012 | Albert et al. |
| 2012/0169560 | A1 | 7/2012 | Lee et al. |
| 2012/0191868 | A1 | 7/2012 | Keyghobad |
| 2012/0271686 | A1 | 10/2012 | Silverman |
| 2012/0272722 | A1 | 11/2012 | Khalifa et al. |
| 2012/0296580 | A1 | 11/2012 | Barkay |
| 2012/0305084 | A1 | 12/2012 | Ball |
| 2012/0311170 | A1 | 12/2012 | Keyghobad et al. |
| 2012/0324985 | A1 | 12/2012 | Gu et al. |
| 2013/0031974 | A1 | 2/2013 | Ball et al. |
| 2013/0036796 | A1 | 2/2013 | Fleury et al. |
| 2013/0041601 | A1 | 2/2013 | Dintakurti et al. |
| 2013/0049968 | A1 | 2/2013 | Fleury, Jr. |
| 2013/0083722 | A1 | 4/2013 | Bhargava et al. |
| 2013/0094537 | A1 | 4/2013 | Hui et al. |
| 2013/0107772 | A1 | 5/2013 | Splitz et al. |
| 2013/0109319 | A1 | 5/2013 | Splitz et al. |
| 2013/0145826 | A1 | 6/2013 | Richarz et al. |
| 2013/0181848 | A1 | 7/2013 | Picard |
| 2013/0211797 | A1 | 8/2013 | Scolnicov |
| 2013/0214883 | A1 | 8/2013 | Yano |
| 2013/0229262 | A1 | 9/2013 | Bellows |
| 2013/0281008 | A1 | 10/2013 | Parish et al. |
| 2013/0298664 | A1 | 11/2013 | Gillette, II et al. |
| 2013/0321231 | A1 | 12/2013 | Flores-Cuadras |
| 2014/0118202 | A1 | 5/2014 | Lin et al. |
| 2014/0197999 | A1 | 7/2014 | Podduturi |
| 2014/0206210 | A1 | 7/2014 | Ritner |
| 2014/0225787 | A1 | 8/2014 | Ramachandran et al. |
| 2014/0261699 | A1 | 9/2014 | Gifford |
| 2014/0373941 | A1 | 12/2014 | Varman et al. |
| 2015/0070221 | A1 | 3/2015 | Schwengler et al. |

(56) References Cited

U.S. PATENT DOCUMENTS

| | | | |
|---|---|---|---|
| 2015/0082868 | A1 | 3/2015 | Hyland |
| 2015/0128714 | A1 | 5/2015 | Moss |
| 2015/0247777 | A1 | 9/2015 | Kondou |
| 2016/0001114 | A1 | 1/2016 | Hyland |
| 2016/0013565 | A1 | 1/2016 | Ortiz |
| 2016/0018283 | A1 | 1/2016 | Fleury et al. |
| 2016/0084694 | A1 | 3/2016 | Cole |
| 2016/0097696 | A1 | 4/2016 | Zusman |
| 2016/0187157 | A1 | 6/2016 | Azulay et al. |
| 2017/0018837 | A1 | 1/2017 | Bietz |
| 2017/0072238 | A1 | 3/2017 | Silvers et al. |
| 2017/0121949 | A1 | 5/2017 | Fleury et al. |
| 2017/0130431 | A1 | 5/2017 | Pinney et al. |
| 2017/0237158 | A1 | 8/2017 | Gibson |
| 2017/0237165 | A1 | 8/2017 | Ortiz et al. |
| 2017/0358856 | A1 | 12/2017 | Elmerick et al. |
| 2018/0080849 | A1 | 3/2018 | Showcatally et al. |
| 2018/0093117 | A1 | 4/2018 | Hyland et al. |
| 2018/0224349 | A1 | 8/2018 | Fleury, Jr. et al. |
| 2019/0024352 | A1 | 1/2019 | Ozburn |
| 2019/0214717 | A1 | 7/2019 | Gibson et al. |
| 2019/0214718 | A1 | 7/2019 | Ortiz et al. |
| 2019/0316983 | A1 | 10/2019 | Fleury, Jr. et al. |
| 2020/0069987 | A1 | 3/2020 | Hyland et al. |
| 2020/0072697 | A1 | 3/2020 | Gibson et al. |
| 2020/0212549 | A1 | 7/2020 | Gibson et al. |
| 2020/0232863 | A1 | 7/2020 | Moreno et al. |
| 2020/0232864 | A1 | 7/2020 | Moreno et al. |
| 2020/0378859 | A1 | 12/2020 | Gibson et al. |
| 2021/0023408 | A1 | 1/2021 | Hyland et al. |
| 2021/0041323 | A1 | 2/2021 | Gibson et al. |
| 2021/0247261 | A1 | 8/2021 | Gibson et al. |
| 2021/0249765 | A1 | 8/2021 | Ortiz et al. |
| 2021/0302056 | A1 | 9/2021 | Eskew et al. |
| 2021/0355661 | A1 | 11/2021 | Gibson et al. |
| 2022/0082467 | A1 | 3/2022 | Fleury, Jr. et al. |
| 2022/0190471 | A1 | 6/2022 | Gibson et al. |
| 2022/0291073 | A1 | 9/2022 | Gibson et al. |
| 2022/0294104 | A1 | 9/2022 | Ortiz et al. |
| 2022/0302580 | A1 | 9/2022 | Ortiz et al. |
| 2022/0320721 | A1 | 10/2022 | Gibson et al. |
| 2023/0092513 | A1 | 3/2023 | Gibson et al. |
| 2023/0108605 | A1 | 4/2023 | Hyland et al. |
| 2023/0184617 | A1 | 6/2023 | Gibson et al. |
| 2023/0352825 | A1 | 11/2023 | Ortiz et al. |
| 2024/0142331 | A1 | 5/2024 | Sobhani et al. |
| 2024/0369438 | A1 | 11/2024 | Gibson et al. |
| 2025/0158273 | A1 | 5/2025 | Gibson et al. |

FOREIGN PATENT DOCUMENTS

| | | |
|---|---|---|
| AU | 2011265675 | 5/2015 |
| AU | 2014259545 | 11/2015 |
| AU | 2015202550 | 11/2017 |
| AU | 2017248541 | 3/2019 |
| CA | 2154433 | 1/1997 |
| CA | 2476119 | 2/2005 |
| CA | 2397174 | 8/2008 |
| CA | 2650174 | 7/2012 |
| CA | 2634739 | 6/2015 |
| CA | 3010333 | 7/2020 |
| CA | 2766850 | 8/2020 |
| CA | 3023529 | 8/2020 |
| CA | 3070690 | 11/2020 |
| CA | 2842042 | 1/2021 |
| CA | 3057167 | 3/2021 |
| CA | 3057202 | 5/2021 |
| CA | 3060512 | 6/2021 |
| CA | 3010345 | 7/2021 |
| CA | 3095465 | 9/2022 |
| CA | 3116787 | 7/2023 |
| CA | 3113517 | 8/2023 |
| CA | 3119150 | 8/2023 |
| CA | 3102529 | 9/2023 |
| CA | 3057224 | 10/2023 |
| CA | 3105683 | 10/2023 |
| CN | 1185838 | 6/1998 |
| CN | 1831478 | 6/2013 |
| DE | 4211038 | 10/1993 |
| DE | 19757581 | 7/1998 |
| EP | 0711986 | 5/1996 |
| EP | 1052492 | 11/2000 |
| EP | 1077370 | 2/2001 |
| EP | 1077371 | 2/2001 |
| EP | 3293315 | 3/2018 |
| EP | 3449062 | 6/2023 |
| EP | 3837400 | 7/2024 |
| FR | 2439990 | 5/1980 |
| FR | 2776065 | 9/1999 |
| GB | 2250820 | 6/1992 |
| GB | 2269900 | 2/1994 |
| GB | 2305333 | 4/1997 |
| GB | 2367362 | 4/2002 |
| GB | 2421311 | 6/2006 |
| GB | 2550908 | 12/2017 |
| JP | 59170739 | 9/1984 |
| JP | 60111132 | 6/1985 |
| JP | 62-295674 | 12/1987 |
| JP | 05-253316 | 10/1993 |
| JP | 06-223279 | 8/1994 |
| JP | 6300606 | 10/1994 |
| JP | 07-116285 | 5/1995 |
| JP | 07231363 | 8/1995 |
| JP | 08250777 | 9/1996 |
| JP | H10-2744 | 1/1998 |
| JP | 11-046254 | 2/1999 |
| JP | 11201859 | 7/1999 |
| JP | H11210028 | 8/1999 |
| JP | 2000131179 | 5/2000 |
| JP | 2000285356 | 10/2000 |
| JP | 2002206965 | 7/2002 |
| JP | 2002310840 | 10/2002 |
| JP | 2002352361 | 12/2002 |
| JP | 3595856 | 12/2004 |
| JP | 2005315663 | 11/2005 |
| JP | 2005321935 | 11/2005 |
| JP | 2006062414 | 3/2006 |
| JP | 2006062716 | 3/2006 |
| JP | 2006285645 | 10/2006 |
| JP | 2007047139 | 2/2007 |
| JP | 2008198044 | 8/2008 |
| JP | 2010068017 | 3/2010 |
| JP | 2012507090 | 3/2012 |
| JP | 2012527706 | 11/2012 |
| JP | 2013528732 | 7/2013 |
| JP | H5654124 | 11/2014 |
| KR | 101785664 | 11/2017 |
| TW | 201117974 | 6/2011 |
| WO | 9810299 | 3/1998 |
| WO | 9810394 | 3/1998 |
| WO | 9850771 | 11/1998 |
| WO | 0151904 | 7/2001 |
| WO | 03049528 | 6/2003 |
| WO | 2004073115 | 8/2004 |
| WO | 2005052573 | 6/2005 |
| WO | 2007069150 | 6/2007 |
| WO | 2008047159 | 4/2008 |
| WO | 2008087911 | 7/2008 |
| WO | 2009057214 | 5/2009 |
| WO | 2009067770 | 6/2009 |
| WO | 2009143287 | 11/2009 |
| WO | 2010135587 | 11/2010 |
| WO | 2011021039 | 2/2011 |
| WO | 2011058561 | 5/2011 |
| WO | 2011159403 | 12/2011 |
| WO | 2012000088 | 1/2012 |
| WO | 2012153147 | 11/2012 |
| WO | 2013025526 | 2/2013 |
| WO | 2014016625 | 1/2014 |
| WO | 2014066764 | 5/2014 |
| WO | 2017139029 | 8/2017 |

(56) References Cited

FOREIGN PATENT DOCUMENTS

| | | |
|---|---|---|
| WO | 2017139030 | 8/2017 |
| WO | 2020050946 | 3/2020 |
| WO | 2021231163 | 11/2021 |

OTHER PUBLICATIONS

US 11,309,624 B2, 04/2022, Gibson et al. (withdrawn)
US 11,378,481 B2, 07/2022, Gibson et al. (withdrawn)
US 11,378,482 B2, 07/2022, Gibson et al. (withdrawn)
US 11,404,772 B2, 08/2022, Ortiz et al. (withdrawn)
US 11,495,879 B2, 11/2022, Ortiz et al. (withdrawn)
US 11,554,278 B2, 01/2023, Hyland et al. (withdrawn)
US 11,621,483 B2, 04/2023, Ortiz et al. (withdrawn)
Tan, John; Notice of Eligibility and Examination Report for Singapore Patent Application No. 10202105366P, filed Aug. 7, 2019, mailed Nov. 15, 2024, 4 pgs.
Splitz, David Edwin; Issue Notification for U.S. Appl. No. 13/339,655, filed Dec. 29, 2011, mailed Sep. 17, 2014, 1 pg.
Splitz, David Edwin; Non-Final Office Action for U.S. Appl. No. 13/339,655, filed Dec. 29, 2011, mailed Mar. 5, 2014, 18 pgs.
Splitz, David Edwin; Non-Final Office Action for U.S. Appl. No. 13/339,655, filed Dec. 29, 2011, mailed Sep. 16, 2013, 57 pgs.
Splitz, David Edwin; Notice of Allowance for U.S. Appl. No. 13/339,655, filed Dec. 29, 2011, mailed May 23, 2014, 41 pgs.
Bracken, Marc; Non-Final Office Action for U.S. Appl. No. 14/063,334, filed Oct. 25, 2013, mailed Jul. 26, 2016, 87 pgs.
Bracken, Marc; U.S. Patent Application entitled: Detecting Leaks in a Fluid Distribution System, having U.S. Appl. No. 14/063,334, filed Oct. 25, 2013, 34 pgs.
Dukes, Brent; Non-Final Office Action for U.S. Appl. No. 14/475,050, filed Sep. 2, 2014, mailed May 19, 2016, 119 pgs.
Mccraven, Jeremy; Applicant Interview Summary for U.S. Appl. No. 14/273,823, filed May 9, 2014, mailed Jan. 12, 2016, 3 pgs.
Mccraven, Jeremy; Non-Final Office Action for U.S. Appl. No. 14/273,823, filed May 9, 2014, mailed Dec. 8, 2015, 18 pgs.
Mccraven, Jeremy; Non-Final Office Action for U.S. Appl. No. 14/273,823, filed May 9, 2014, mailed Apr. 12, 2016, 86 pgs.
Mccraven, Jeremy; Notice of Allowance for U.S. Appl. No. 14/273,823, filed May 9, 2014, mailed Jul. 7, 2016, 10 pgs.
Hunaidi, Osama; Issue Notification for U.S. Appl. No. 11/766,288, filed Jun. 21, 2007, mailed Sep. 22, 2010, 1 pg.
Hunaidi, Osama; Non-Final Office Action for U.S. Appl. No. 11/766,288, filed Jun. 21, 2007, mailed Jan. 20, 2010, 50 pgs.
Hunaidi, Osama; Notice of Allowance for U.S. Appl. No. 11/766,288, filed Jun. 21, 2007, mailed Jun. 24, 2010, 8 pgs.
Hunaidi, Osama; Non-final Office Action for U.S. Appl. No. 09/482,317, filed Jan. 14, 2000, mailed Dec. 17, 2001, 6 pgs.
Hunaidi, Osama; Notice of Allowance for U.S. Appl. No. 09/482,317, filed Jan. 14, 2000, mailed May 13, 2002, 4 pgs.
Peter, Russo Anthony; European Search Report for Patent Application No. EP95307807, filed Nov. 1, 1995, mailed Jul. 22, 1998, 5 pgs.
Zusman, George, V.; Applicant Initiated Interview Summary for U.S. Appl. No. 14/503,951, filed Oct. 1, 2014, mailed Jul. 12, 2016, 3 pgs.
Zusman, George, V.; Non-Final Office Action for U.S. Appl. No. 14/503,951, filed Oct. 1, 2014, mailed Jun. 13, 2016, 77 pgs.
Ortiz, Jorge Isaac; Final Office Action for U.S. Appl. No. 15/043,057, filed Feb. 12, 2016, mailed Dec. 12, 2018, 25 pgs.
Ortiz, Jorge Isaac; Issue Notification for U.S. Appl. No. 15/043,057, filed Feb. 12, 2016, mailed Apr. 17, 2019, 1 pg.
Ortiz, Jorge Isaac; Non-Final Office Action for U.S. Appl. No. 15/043,057, filed Feb. 12, 2016, mailed Jun. 4, 2018, 94 pgs.
Ortiz, Jorge Isaac; Notice of Allowance for U.S. Appl. No. 15/043,057, filed Feb. 12, 2016, mailed Feb. 19, 2019, 8 pgs.
Ortiz, Jorge Isaac; Supplemental Notice of Allowance for U.S. Appl. No. 15/043,057, filed Feb. 12, 2016, mailed Mar. 13, 2019, 6 pgs.
Ortiz, Jorge Isaac, Notice of Allowance for U.S. Appl. No. 16/354,939, filed Mar. 15, 2019, mailed Jun. 9, 2022, 10 pgs.
Ortiz, Jorge Isaac; Final Office Action for U.S. Appl. No. 16/354,939, filed Mar. 15, 2019, mailed Mar. 17, 2022, 40 pgs.
Ortiz, Jorge Isaac; Non-Final Office Action for U.S. Appl. No. 16/354,939, filed Mar. 15, 2019, mailed Aug. 10, 2021, 126 pgs.
Ortiz, Jorge Isaac; Notice of Allowance for U.S. Appl. No. 16/354,939, filed Mar. 15, 2019, mailed Sep. 2, 2022, 9 pgs.
Ortiz, Jorge Isaac; Final Office Action for U.S. Patent Application No. 17/245, 181, filed Apr. 30, 2021, mailed Dec. 7, 2021, 28 pgs.
Ortiz, Jorge Isaac; Non-Final Office Action for U.S. Appl. No. 17/245,181, filed Apr. 30, 2021, mailed Sep. 16, 2021, 82 pgs.
Ortiz, Jorge Isaac; Notice of Allowance for U.S. Appl. No. 17/245,181, filed Apr. 30, 2021, mailed Mar. 7, 2022, 13 pgs.
Ortiz, Jorge Isaac; Notice of Allowance for U.S. Appl. No. 17/245,181, filed Apr. 30, 2021, mailed Sep. 19, 2022, 11 pgs.
Ortiz, Jorge Isaac; Requirement for Restriction/Election for U.S. Appl. No. 17/245,181, filed Apr. 30, 2021, mailed Jul. 22, 2021, 6 pgs.
Sansei Denki KK; Translation for JP3595856(B2), published on Dec. 2, 2004, 12 pgs.
Wallace & Tiernan; Brochure for Hydraclam continuous water quality monitoring via hydrants, Allegedly Available as Early as 2008, 3 pgs.
Wallace & Tiernan; Brochure for HYDRACLAM Distribution Water Quality Monitoring SB.50.700GE, Allegedly Available as Early as 2008, 8 pgs.
Wallace & Tiernan; Product Sheet for Wallace & Tiernan Analysers and Controllers-HydraClam Water Quality Monitor with Remote Communications, Allegedly Available as Early as 2008, 4 pgs.
Ortiz, Jorge Isaac; Final Office Action for U.S. Appl. No. 17/833,230, filed Jun. 6, 2022, mailed Feb. 10, 2023, 30 pgs.
Ortiz, Jorge Isaac; Non-Final Office Action for U.S. Appl. No. 17/833,230, filed Jun. 6, 2022, mailed Oct. 25, 2022, 98 pgs.
Ortiz, Jorge Isaac; Notice of Allowance for U.S. Appl. No. 17/833,230, filed Jun. 6, 2022, mailed Apr. 10, 2023, 7 pgs.
Ortiz, Jorge Isaac; Non-Final Office Action for U.S. Appl. No. 17/829,759, filed Jun. 1, 2022, mailed Oct. 24, 2022, 92 pgs.
Ortiz, Jorge Isaac; Notice of Allowance for U.S. Appl. No. 17/829,759, filed Jun. 1, 2022, mailed Feb. 15, 2023, 17 pgs.
Splitz, David; International Preliminary Report on Patentability for PCT Application No. PCT/US11/58260, filed Oct. 28, 2011, mailed May 8, 2014, 7 pgs.
Splitz, David; International Search Report and Written Opinion for PCT Application No. PCT/US11/58260, filed Oct. 28, 2011, mailed Feb. 7, 2012, 8 pgs.
Splitz, David; International Preliminary Report on Patentability for PCT Application No. PCT/US12/22060, filed Jan. 20, 2012, mailed May 8, 2014, 6 pgs.
Splitz, David; International Search Report and Written Opinion for PCT Application No. PCT/US12/22060, filed Jan. 20, 2012, mailed Mar. 29, 2012, 8 pgs.
Splitz, David Edwin; Extended European Search Report for PCT Application No. 12844451.0, filed Jan. 20, 2012, mailed Apr. 21, 2015, 8 pgs.
Bracken, Mark; International Preliminary Report on Patentability for PCT Application No. PCT/US2013/066817, filed Oct. 25, 2013, mailed Apr. 28, 2015, 8 pgs.
Bracken, Mark; International Search Report and Written Opinion for PCT Application No. PCT/US2013/066817, filed Oct. 25, 2013, mailed Mar. 18, 2014, 9 pgs.
Bracken, Mark; PCT Application entitled: Detecting Leaks in a Fluid Distribution System, having PCT Application No. PCT/US13/66817, filed Oct. 25, 2013, 33 pgs.
Ball, Marty Scott, Notice of Allowance for U.S. Appl. No. 12/356,240, filed Jan. 20, 2009, mailed Aug. 9, 2010, 10 pgs.
Ball, Marty Scott; Issue Notification for U.S. Appl. No. 12/356,240, filed Jan. 20, 2009, mailed Dec. 1, 2010, 1 pg.
Ball, Marty Scott; U.S. Patent Application Entitled: Plastic Water Meter With Metal Threads under U.S. Appl. No. 12/356,240, filed Jan. 20, 2009, 17 pgs.
Ball, Marty Scott; Issue Notification for U.S. Patent Application No., filed Nov. 16, 2010, mailed Oct. 12, 2011, 1 pg.
Ball, Marty Scott; Non-Final Office Action for U.S. Appl. No. 12/947,272, filed Nov. 16, 2010, mailed May 2, 2011, 11 pgs.

(56) References Cited

OTHER PUBLICATIONS

Ball, Marty Scott; Notice of Allowance for U.S. Appl. No. 12/947,272, filed Nov. 16, 2010, mailed Aug. 10, 2011, 5 pgs.
Ball, Marty Scott; U.S. Patent Application Entitled: Plastic Water Meter With Metal Threads under U.S. Appl. No. 12/947,272, filed Nov. 16, 2010, 15 pgs.
Ball, Marty Scott, Notice of Allowance for U.S. Appl. No. 13/220,739, filed Aug. 30, 2011, mailed May 7, 2012, 9 pgs.
Ball, Marty Scott; Issue Notification for U.S. Appl. No. 13/220,739, filed Aug. 30, 2011, mailed Sep. 19, 20012, 1 pg.
Ball, Marty Scott; Miscellaneous Communication to Applicant for U.S. Appl. No. 13/220,739, filed Aug. 30, 2011; mailed Jun. 14, 2012, 4 pgs.
Ball, Marty Scott; Non-Final Office Action for U.S. Appl. No. 13/220,739, filed Aug. 30, 2011, mailed Nov. 15, 2011, 7 pgs.
Ball, Marty Scott; Notice of Allowance for U.S. Appl. No. 13/220,739, filed Aug. 30, 2011, mailed Feb. 17, 2012, 5 pgs.
Ball, Marty Scott; Notice of Allowance for U.S. Appl. No. 13/220,739, filed Aug. 30, 2011, mailed Aug. 23, 2012, 9 pgs.
Ball, Marty Scott; U.S. Patent Application Entitled: Plastic Water Meter With Metal Threads; under U.S. Appl. No. 13/220,739, filed Aug. 30, 2011, 14 pgs.
Ball, Marty Scott; Non-Final Office Action for U.S. Appl. No. 13/646,892, filed Oct. 8, 2012, mailed Jun. 7, 2013; 10 pgs.
Ball, Marty Scott; Notice of Allowance for U.S. Appl. No. 13/646,892, filed Oct. 8, 2012, mailed Sep. 17, 2013, 6 pgs.
Ball, Marty Scott; U.S. Continuation Application entitled: Non-Metallic Enclusure With Metal Threads, U.S. Appl. No. 13/646,892, filed Oct. 8, 2012, 14 pgs.
Ball, Marty Scott; Issue Notification for U.S. Appl. No. 13/149,720, filed May 31, 2011, mailed Aug. 27, 2014, 1 pg.
Ball, Marty Scott; Non-Final Office Action for U.S. Appl. No. 13/149,720, filed May 31, 2011, mailed Mar. 11, 2014, 75 pgs.
Ball, Marty Scott; Notice of Allowance for U.S. Appl. No. 13/149,720, filed May 31, 2011, mailed Jun. 24, 2014, 29 pgs.
Ball, Marty Scott; Supplemental Notice of Allowability for U.S. Appl. No. 13/149,720, filed May 31, 2011, mailed Aug. 12, 2014, 4 pgs.
Ball, Marty Scott; Non-Final Office Action for U.S. Appl. No. 14/451,896, filed Aug. 5, 2014, mailed Mar. 18, 2016, 98 pgs.
Ball, Marty Scott; Non-Final Office Action for U.S. Appl. No. 14/451,896, filed Aug. 5, 2014, mailed May 12, 2016; 15 pgs.
Hyland, Gregory E.; Applicant-Initiated Interview Summary for U.S. Appl. No. 12/606,957, filed Oct. 27, 2009, mailed Feb. 18, 2014, 4 pgs.
Hyland, Gregory E.; Final Office Action for U.S. Appl. No. 12/606,957, filed Oct. 27, 2009, mailed Dec. 17, 2013, 54 pgs.
Hyland, Gregory E.; Final Office Action for U.S. Appl. No. 12/606,957, filed Oct. 27, 2009, mailed Apr. 10, 2013, 80 pgs.
Hyland, Gregory E.; Final Office Action for U.S. Appl. No. 12/606,957, filed Oct. 27, 2009, mailed Sep. 22, 2014, 49 pgs.
Hyland, Gregory E.; Issue Notification for U.S. Appl. No. 12/606,957, filed Oct. 27, 2009, mailed Nov. 11, 2015, 1 pg.
Hyland, Gregory E.; Non-Final Office Action for U.S. Appl. No. 12/606,957, filed Oct. 27, 2009, mailed Oct. 18, 2012; 44 pgs.
Hyland, Gregory E.; Non-Final Office Action for U.S. Appl. No. 12/606,957, filed Oct. 27, 2009, mailed Apr. 8, 2014, 43 pgs.
Hyland, Gregory E.; Non-Final Office Action for U.S. Appl. No. 12/606,957, filed Oct. 27, 2009, mailed Sep. 6, 2013; 53 pgs.
Hyland, Gregory E.; Non-Final Office Action for U.S. Appl. No. 12/606,957, filed Oct. 27, 2009, mailed Apr. 16, 2015, 47 pgs.
Hyland, Gregory E.; Notice of Allowance for U.S. Appl. No. 12/606,957, filed Oct. 27, 2009, mailed Jul. 27, 2015, 19 pgs.
Hyland, Gregory E.; Supplemental Notice of Allowability for U.S. Appl. No. 12/606,957, filed Oct. 27, 2009, mailed Oct. 13, 2015, 4 pgs.
Hyland, Gregory E.; Final Office Action for U.S. Appl. No. 12/784,300, filed May 20, 2010, mailed Feb. 11, 2014; 44 pgs.
Hyland, Gregory E.; Final Office Action for U.S. Appl. No. 12/784,300, filed May 20, 2010, mailed May 29, 2013, 71 pgs.
Hyland, Gregory E.; Issue Notification for U.S. Appl. No. 12/784,300, filed May 20, 2010, mailed Aug. 13, 2014. 1 pg.
Hyland, Gregory E.; Non-Final Office Action for U.S. Appl. No. 12/784,300, filed May 20, 2010, mailed Sep. 10, 2012, 35 pgs.
Hyland, Gregory E.; Non-Final Office Action for U.S. Appl. No. 12/784,300, filed May 20, 2010, mailed Sep. 24, 2013; 37 pgs.
Hyland, Gregory E.; Notice of Allowance for U.S. Appl. No. 12/784,300, filed May 20, 2010, mailed Apr. 23, 2014, 20 pgs.
Hyland, Gregory E.; Supplemental Notice of Allowability for U.S. Appl. No. 12/784,300, filed May 20, 2010, mailed Aug. 1, 2014, 4 pgs.
Hyland, Gregory E.; Non-Final Office Action for U.S. Appl. No. 14/450,452, filed Aug. 4, 2014, mailed Feb. 17, 2016, 98 pgs.
Keyghobad, Seyamak; Issue Notification for U.S. Appl. No. 10/298,300, filed Nov. 18, 2002, mailed Oct. 8, 2008; 1 pg.
Keyghobad, Seyamak; Non-Final Rejection for U.S. Appl. No. 10/298,300, filed Nov. 18, 2002; mailed Oct. 26, 2007; 35 pgs.
Keyghobad, Seyamak; Non-Final Rejection for U.S. Appl. No. 10/298,300, filed Nov. 18, 2002; mailed May 18, 2006; 13 pgs.
Keyghobad, Seyamak; Non-Final Rejection for U.S. Appl. No. 10/298,300, filed Nov. 18, 2002; mailed Jun. 6, 2007; 32 pgs.
Keyghobad, Seyamak; Notice of Allowance for U.S. Appl. No. 10/298,300, filed Nov. 18, 2002; mailed Jul. 14, 2008; 4 pgs.
Keyghobad, Seyamak; Requirement for Restriction/ Election for U.S. Appl. No. 10/298,300, filed Nov. 18, 2002; mailed Feb. 27, 2006; 17 pgs.
Keyghobad, Seyamak; Requirement for Restriction/ Election for U.S. Appl. No. 10/298,300, filed Nov. 18, 2002; mailed Feb. 9, 2006; 11 pgs.
Keyghobad, Seyamak; Examiner Interview Summary Record for U.S. Appl. No. 12/243,452, filed Oct. 1, 2008; mailed Dec. 7, 2009; 3 pgs.
Gibson, Daryl Lee; Official Action for European Patent Application No. 23154819.9, filed Dec. 20, 2016, mailed Apr. 25, 2025, 7 pgs.
Gibson, D.; Notice of Allowance for Canadian Patent Application No. 3,207,167 filed Aug. 7, 2019, mailed Feb. 6, 2025, 1 pg.
Sobhani, Mohammad Hassan; Non-Final Office Action for U.S. Appl. No. 17/976,314, filed Oct. 28, 2022, mailed May 1, 2025, 145 pgs.
Hyland, Gregory E.; Non-Final Office Action for U.S. Appl. No. 15/817,172, filed Nov. 18, 2017, mailed Dec. 17, 2019, 23 pgs.
Hyland, Gregory E.; Non-Final Office Action for U.S. Appl. No. 15/817,172, filed Nov. 18, 2017, mailed Jul. 10, 2019, 74 pgs.
Hyland, Gregory E.; Notice of Allowance for U.S. Appl. No. 15/817,172, filed Nov. 18, 2017, mailed Aug. 21, 2020, 9 pgs.
Hyland, Gregory E.; Supplemental Notice of Allowance for U.S. Appl. No. 15/817,172, filed Nov. 18, 2017, mailed Oct. 28, 2020, 4 pgs.
Hyland, Gregory E.; Supplemental Notice of Allowance for U.S. Appl. No. 15/817,172, filed Nov. 18, 2017, mailed Dec. 7, 2020, 4 pgs.
Hyland, Gregory; Supplemental Notice of Allowance for U.S. Appl. No. 15/817,172, filed Nov. 18, 2017, mailed Oct. 9, 2020, 4 pgs.
Hyland, Gregory E.; Final Office Action for U.S. Appl. No. 16/675,507, filed Nov. 6, 2019, mailed Jun. 26, 2020, 70 pgs.
Hyland, Gregory E.; Non-Final Office Action for U.S. Appl. No. 16/675,507, filed Nov. 6, 2019, mailed Jan. 28, 2020, 18 pgs.
Hyland, Gregory E.; Notice of Allowance for U.S. Appl. No. 16/675,507, filed Nov. 6, 2019, mailed Oct. 23, 2020, 16 pgs.
Hyland, Gregory E.; Supplemental Notice of Allowance for U.S. Appl. No. 16/675,507, filed Nov. 6, 2019, mailed Nov. 10, 2020, 4 pgs.
Hyland, Gregory E.; Non-Final Office Action for U.S. Appl. No. 17/071,632, filed Oct. 15, 2020, mailed Mar. 30, 2022, 89 pgs.
Hyland, Gregory E.; Notice of Allowance for U.S. Appl. No. 17/071,632, filed Oct. 15, 2020, mailed Jun. 24, 2022, 11 pgs.
Hyland, Gregory E.; Notice of Allowance for U.S. Appl. No. 17/071,632, filed Oct. 15, 2020, mailed Aug. 29, 2022, 10 pgs.
Hyland, Gregory E.; Final Office Action for U.S. Appl. No. 18/070,154, filed Nov. 28, 2022, mailed Sep. 30, 2024, 30 pgs.
Hyland, Gregory E.; Non-Final Office Action of U.S. Appl. No. 18/070,154, filed Nov. 28, 2022, mailed Mar. 27, 2024, 105 pgs.

(56) References Cited

OTHER PUBLICATIONS

Fleury Jr., Leo W.; Non-Final Office Action for U.S. Appl. No. 13/492,790, filed Jun. 8, 2012, mailed Nov. 5, 2014, 30 pgs.
Fleury, Jr., Leo W.; Advisory Action for U.S. Appl. No. 13/492,790, filed Jun. 8, 2012, mailed Jul. 9, 2014, 3 pgs.
Fleury, Jr., Leo W.; Final Office Action for U.S. Appl. No. 13/492,790, filed Jun. 8, 2012, mailed Mar. 12, 2014; 19 pgs.
Fleury, Jr., Leo W.; Issue Notification for U.S. Appl. No. 13/492,790, filed Jun. 8, 2012, mailed Mar. 2, 2016, 1 pg.
Fleury, Jr., Leo W.; Non-Final Office Action for U.S. Appl. No. 13/492,790, filed Jun. 8, 2012, mailed Sep. 12, 2013; 37 pgs.
Fleury, Jr., Leo W.; Notice of Allowance for U.S. Appl. No. 13/492,790, filed Jun. 8, 2012, mailed Feb. 2, 2016, 9 pgs.
Fleury, Jr., Leo W.; Notice of Allowance for U.S. Appl. No. 13/492,790, filed Jun. 8, 2012, mailed May 12, 2015, 9 pgs.
Fleury, Jr., Leo W.; Notice of Allowance for U.S. Appl. No. 13/492,790, filed Jun. 8, 2012, mailed Sep. 23, 2015, 11 pgs.
Fleury, Jr., Leo W.; Applicant-Initiated Interview Summary for U.S. Appl. No. 14/870,070, filed Sep. 30, 2015, mailed Feb. 28, 2018, 4 pgs.
Fleury, Jr., Leo W.; Final Office Action for U.S. Appl. No. 14/870,070, filed Sep. 30, 2015, mailed Dec. 29, 2017, 24 pgs.
Fleury, Jr., Leo; Non-Final Office Action for U.S. Appl. No. 14/870,070, filed Sep. 30, 2015, mailed Jun. 21, 2017, 88 pgs.
Fleury, Jr., Leo W., Advisory Action for U.S. Appl. No. 15/939,942, filed Mar. 29, 2018, mailed Dec. 7, 2021, 2 pgs.
Fleury, Jr., Leo W.; Final Office Action for U.S. Appl. No. 15/939,942, filed Mar. 29, 2018, mailed Nov. 25, 2020, 37 pgs.
Fleury, Jr., Leo W.; Final Office Action for U.S. Appl. No. 15/939,942, filed Mar. 29, 2018, mailed Feb. 19, 2020, 29 pgs.
Fleury, Jr., Leo W.; Non-Final Office Action for U.S. Appl. No. 15/939,942, filed Mar. 29, 2018, mailed Mar. 24, 2021, 32 pgs.
Fleury, Jr., Leo W.; Non-Final Office Action for U.S. Appl. No. 15/939,942, filed Mar. 29, 2018, mailed May 27, 2020, 23 pgs.
Fleury, Jr., Leo W.; Non-Final Office Action for U.S. Appl. No. 15/939,942, filed Mar. 29, 2018, mailed Sep. 25, 2019, 92 pgs.
Fleury, Jr., Leo W.; Final Office Action for U.S. Appl. No. 15/939,942, filed Mar. 29, 2018, mailed Aug. 27, 2021, 30 pgs.
Fleury, Jr., Leo W.; Notice of Allowance for U.S. Appl. No. 17/536,292, filed Nov. 29, 2021, mailed Feb. 28, 2023, 108 pgs.
Richarz, Werner Guenther; Corrected Notice of Allowability for U.S. Appl. No. 13/492,792, filed Jun. 8, 2012, mailed Aug. 29, 2017, 6 pgs.
Richarz, Werner Guenther; Final Office Action for U.S. Appl. No. 13/492,792, filed Jun. 8, 2012, mailed Oct. 20, 2014, 17 pgs.
Richarz, Werner Guenther; Final Office Action for U.S. Appl. No. 13/492,792, filed Jun. 8, 2012, mailed Sep. 10, 2015, 20 pgs.
Richarz, Werner Guenther; Final Office Action for U.S. Appl. No. 13/492,792, filed Jun. 8, 2012, mailed Sep. 8, 2016, 36 pgs.
Richarz, Werner Guenther; Issue Notification for U.S. Appl. No. 13/492,792, filed Jun. 8, 2012, mailed Sep. 6, 2017, 1 pg.
Richarz, Werner Guenther; Non-Final Office Action for U.S. Appl. No. 13/492,792, filed Jun. 8, 2012, mailed Nov. 6, 2013, 39 pgs.
Richarz, Werner Guenther; Non-Final Office Action for U.S. Appl. No. 13/492,792, filed Jun. 8, 2012, mailed Jun. 4, 2014, 24 pgs.
Richarz, Werner Guenther; Non-Final Office Action for U.S. Appl. No. 13/492,792, filed Jun. 8, 2012, mailed Feb. 27, 2015, 15 pgs.
Richarz, Werner Guenther; Non-Final Office Action for U.S. Appl. No. 13/492,792, filed Jun. 8, 2012, mailed Mar. 8, 2016, 27 pgs.
Richarz, Werner Guenther; Notice of Allowance for U.S. Appl. No. 13/492,792, filed Jun. 8, 2012, mailed Jun. 13, 2017, 31 pgs.
Richarz, Werner Guenther; Restriction Requirement for U.S. Appl. No. 13/492,792, filed Jun. 8, 2012, mailed Sep. 27, 2013, 5 pgs.
Chou, et al.; Article entitled: "Non-invasive Acceleration-based Methodology for Damage Detection and Assessment of Water Distribution System", Mar. 2010, 17 pgs.
Dintakurti, Ganapathi Deva Varma; Corrected Notice of Allowance for U.S. Appl. No. 13/492,794, filed Jun. 8, 2012, mailed Dec. 6, 2018, 6 pgs.
Dintakurti, Ganapathi Deva Varma; Final Office Action for U.S. Appl. No. 13/492,794, filed Jun. 8, 2012, mailed Oct. 18, 2017, 38 pgs.
Dintakurti, Ganapathi Deva Varma; Final Office Action for U.S. Appl. No. 13/492,794, filed Jun. 8, 2012, mailed Nov. 8, 2016, 31 pgs.
Dintakurti, Ganapathi Deva Varma; Final Office Action for U.S. Appl. No. 13/492,794, filed Jun. 8, 2012, mailed Jun. 22, 2018, 39 pgs.
Keyghobad, Seyamak; Examiner Interview Summary Record for U.S. Appl. No. 12/243,452, filed Oct. 1, 2008, mailed Dec. 7, 2009, 3 pages.
Keyghobad, Seyamak; Issue Notification for U.S. Appl. No. 12/243,452, filed Oct. 1, 2008, mailed Jun. 16, 2010, 1 pg.
Keyghobad, Seyamak; Non-Final Rejection for U.S. Appl. No. 12/243,452, filed Oct. 1, 2008, mailed Sep. 14, 2009, 12 pgs.
Keyghobad, Seyamak; Notice of Allowance for U.S. Appl. No. 12/243,452, filed Oct. 1, 2008, mailed Mar. 22, 2010, 7 pgs.
Keyghobad, Seyamak; Non-Final Rejection for U.S. Appl. No. 12/243,452, filed Oct. 1, 2008, mailed May 1, 2009, 5 pgs.
Keyghobad, Seyamak; Issue Notification for U.S. Appl. No. 12/490,867, filed Jun. 24, 2009, mailed Feb. 29, 2012, 1 pg.
Keyghobad, Seyamak; Non Final Rejection for U.S. Appl. No. 12/490,867, filed Jun. 24, 2009, mailed Mar. 21, 2011, 9 pgs.
Keyghobad, Seyamak; Non Final Rejection for U.S. Appl. No. 12/490,867, filed Jun. 24, 2009, mailed Oct. 4, 2010, 13 pgs.
Keyghobad, Seyamak; Notice of Allowance for U.S. Appl. No. 12/490,867, filed Jun. 24, 2006, mailed Sep. 7, 2011, 6 pgs.
Keyghobad, Seyamak; Notice of Allowance for U.S. Appl. No. 12/490,867, filed Jun. 24, 2009, mailed Nov. 2, 2011, 17 pgs.
Keyghobad, Seyamak; Issue Notification for U.S. Appl. No. 12/490,925, filed Jun. 24, 2009, mailed Aug. 18, 2010, 1 pg.
Keyghobad, Seyamak; Non-final Office action for U.S. Appl. No. 12/490,925, filed Jun. 24, 2009, mailed Dec. 23, 2009, 17 pgs.
Keyghobad, Seyamak; Notice of Allowance for U.S. Appl. No. 12/490,925, filed Jun. 24, 2009, mailed Aug. 2, 2010, 8 pgs.
Keyghobad, Seyamak; Notice of Allowance for U.S. Appl. No. 12/490,925, filed Jun. 24, 2009, mailed Jul. 19, 2010, 8 pgs.
Keyghobad, Seyamak; Issue Notification for U.S. Appl. No. 12/490,957, filed Jun. 24, 2009, mailed Aug. 4, 2010, 1 pg.
Keyghobad, Seyamak; Notice of Allowance for U.S. Appl. No. 12/490,957, filed Jun. 24, 2009, mailed Jun. 24, 2010, 10 pgs.
Keyghobad, Seyamak; Non-Final Rejection for U.S. Appl. No. 12/490,957, filed Jun. 24, 2009, mailed Dec. 23, 2009, 17 pgs.
Keyghobad, Seyamak; Issue Notification for U.S. Appl. No. 13/372,408, filed Feb. 13, 2012, mailed Mar. 6, 2013, 1 pg.
Keyghobad, Seyamak; Non-final Office Action for U.S. Appl. No. 13/372,408, filed Feb. 23, 2012, mailed May 25, 2012, 17 pgs.
Keyghobad, Seyamak; Notice of Allowance for U.S. Appl. No. 13/372,408, filed Feb. 13, 2012, mailed Jul. 27, 2012, 11 pgs.
Keyghobad, Seyamak; Notice of Allowance for U.S. Appl. No. 13/372,408, filed Feb. 13, 2012, mailed Nov. 1, 2012, 18 pgs.
Keyghobad, Seyamak; Supplemental Notice of Allowance for U.S. Appl. No. 13/372,408, filed Feb. 13, 2012, mailed Aug. 2, 2012, 7 pgs.
Keyghobad, Seyamak, Issue Notification for U.S. Appl. No. 13/590,954, filed Aug. 21, 2012, mailed Sep. 11, 2013, 1 pg.
Keyghobad, Seyamak; Non-Final Office Action for U.S. Appl. No. 13/590,954, filed Aug. 21, 2012, mailed Dec. 13, 2012, 39 pgs.
Keyghobad, Seyamak; Notice of Allowance for U.S. Appl. No. 13/590,954, filed Aug. 21, 2012, mailed Mar. 21, 2013, 22 pgs.
Keyghobad, Seyamak; Notice of Allowance for U.S. Appl. No. 13/590,954, filed Aug. 21, 2012, mailed Jul. 9, 2013, 21 pgs.
Hyland, Gregory E., Non-Final Office Action for U.S. Appl. No. 13/101,235, filed May 5, 2011, mailed Jul. 31, 2013, 57 pgs.
Hyland, Gregory E.; Final Office Action for U.S. Appl. No. 13/101,235, filed May 5, 2011, mailed Feb. 20, 2014, 29 pgs.
Hyland, Gregory E.; Issue Notification for U.S. Appl. No. 13/101,235, filed May 5, 2011, mailed Dec. 23, 2014, 1 pg.
Hyland, Gregory E.; Non-Final Office Action for U.S. Appl. No. 13/101,235, filed May 5, 2011, mailed Jun. 5, 2014, 29 pgs.
Hyland, Gregory E.; Notice of Allowance for U.S. Appl. No. 13/101,235, filed May 5, 2011, mailed Sep. 11, 2014, 11 pgs.

(56) References Cited

OTHER PUBLICATIONS

Hyland, Gregory E.; Supplemental Notice of Allowability for U.S. Appl. No. 13/101,235, filed May 5, 2011, mailed Nov. 25, 2014, 5 pgs.
Hyland, Gregory E.; Applicant-Initiated Interview Summary for U.S. Appl. No. 14/557,754, filed Dec. 2, 2014, mailed Apr. 19, 2017, 4 pgs.
Hyland, Gregory E.; Final Office Action for U.S. Appl. No. 14/557,754, filed Dec. 2, 2014, mailed Apr. 5, 2017, 23 pgs.
Hyland, Gregory E.; Final Office Action for U.S. Appl. No. 14/557,754, filed Dec. 2, 2014, mailed Jun. 30, 2016, 24 pgs.
Hyland, Gregory E.; Non-Final Office Action for U.S. Appl. No. 14/557,754, filed Dec. 2, 2014, mailed Jan. 19, 2016, 101 pgs.
Hyland, Gregory E.; Non-Final Office Action for U.S. Appl. No. 14/557,754, filed Dec. 2, 2014, mailed Nov. 8, 2016, 48 pgs.
Hyland, Gregory E.; Notice of Allowance for U.S. Appl. No. 14/557,754, filed Dec. 2, 2014, mailed Jul. 17, 2017, 14 pgs.
Hyland, Gregory E.; Notice of Decision from Post-Prosecution Pilot Program (P3) Conference for U.S. Appl. No. 14/557,754, filed Dec. 2, 2014, mailed Sep. 14, 2016, 4 pgs.
Hyland, Gregory E.; Supplemental Notice of Allowability for U.S. Appl. No. 14/557,754, filed Dec. 2, 2014, mailed Oct. 20, 2017, 11 pgs.
Hyland, Gregory; Issue Notification for U.S. Appl. No. 14/557,754, filed Dec. 2, 2014, mailed Dec. 20, 2017, 1 pg.
Hyland, Gregory E.; Final Office Action for U.S. Appl. No. 14/848,676, filed Sep. 9, 2015, mailed Aug. 19, 2016, 20 pgs.
Hyland, Gregory E.; Issue Notification for U.S. Appl. No. 14/848,676, filed Sep. 9, 2015, mailed Dec. 6, 2017, 1 pg.
Hyland, Gregory E.; Non-Final Office Action for U.S. Appl. No. 14/848,676, filed Sep. 9, 2015, mailed Dec. 13, 2016, 52 pgs.
Hyland, Gregory E.; Notice of Allowance for U.S. Appl. No. 14/848,676, filed Sep. 9, 2015, mailed Sep. 6, 2017, 12 pgs.
Hyland, Gregory E.; Supplemental Notice of Allowability for U.S. Appl. No. 14/848,676, filed Sep. 9, 2015, mailed Nov. 27, 2017, 6 pgs.
Hyland, Gregory E.; Supplemental Notice of Allowability for U.S. Appl. No. 14/848,676, filed Sep. 9, 2015, mailed Sep. 19, 2017, 8 pgs.
Hyland, Gregory; Final Office Action for U.S. Appl. No. 14/848,676, filed Sep. 9, 2015, mailed Jun. 7, 2017, 25 pgs.
Hyland, Gregory; Non-Final Office Action for U.S. Appl. No. 14/848,676, filed Sep. 9, 2015, mailed Mar. 4, 2016, 94 pgs.
Hyland, Gregory E.; Final Office Action for U.S. Appl. No. 15/817,172, filed Nov. 18, 2017, mailed Jun. 11, 2020, 33 pgs.
Bracken, Marc; European Search Report for European Application No. 13849336.6, filed Oct. 15, 2013, mailed Jul. 11, 2016, 13 pgs.
Bracken, Marc; Partial Supplementary European Search Report for European Application No. 13849336.6, filed Oct. 15, 2013, mailed Mar. 11, 2016, 7 pgs.
Bracken, Marc; Written Opinion for Singapore Application No. 11201503041s, filed Oct. 25, 2013, mailed Jan. 5, 2016, 7 pgs.
Dukes, Brent; International Search Report and Written Opinion for PCT Application No. PCT/US15/44140, filed Aug. 7, 2015, mailed Dec. 30, 2015, 15 pgs.
Zusman, George V.; Extended European Search Report for serial No. 15188004.4, filed Oct. 1, 2015, mailed Feb. 22, 2016, 9 pgs.
Ortiz, Jorge Isaac; International Preliminary Report on Patentability for PCT Application No. PCT/US2016/067689, filed Dec. 20, 2016, mailed Aug. 23, 2018, 8 pgs.
Ortiz, Jorge; International Search Report and Written Opinion for PCT/US16/67689, filed Dec. 20, 2016, mailed Mar. 8, 2017, 9 pgs.
Ortiz, Jorge Isaac; Extended European Search Report for Application No. 16890114.8, filed Dec. 20, 2016, mailed Sep. 26, 2019, 11 pgs.
Ortiz, Jorge Isaac; Office Action for European Application No. 16890114.8, filed Dec. 20, 2016, mailed Oct. 4, 2021, 7 pgs.
Ortiz, Jorge Isaac; Office Action for European Application No. 16890114.8, filed Dec. 20, 2016, mailed Sep. 11, 2023, 7 pgs.
Ortiz, Jorge Isaac; Office Action for Canadian Application No. 3,010,333, filed Dec. 20, 2016, mailed Dec. 6, 2019, 4 pgs.
Ortiz, Jorge Isaac; Office Action for Canadian Application No. 3,070,690, filed Dec. 20, 2016, mailed Mar. 10, 2020, 3 pgs.
Ortiz, Jorge Isaac; Office Action for Canadian Application No. 3,095,465, filed Dec. 20, 2016, mailed Nov. 8, 2021, 4 pgs.
Ortiz, Jorge Isaac; Office Action for Canadian Application No. 3,168,445, filed Dec. 20, 2016, mailed Sep. 22, 2023, 4 pgs.
Ortiz, Jorge Isaac; Office Action for Canadian Application No. 3,168,447, filed Dec. 20, 2016, mailed Sep. 25, 2023, 4 pgs.
Bracken, Marc; U.S. Provisional Application Entitled: Detecting Leaks in Water Pipes, having U.S. Appl. No. 61/719,320, filed Oct. 26, 2012, 33 pgs.
Splitz, David Edwin; U.S. Provisional Patent Application Entitled: Automatic Discovery of Nodes in a Mesh Network, U.S. Appl. No. 61/779,896, filed Mar. 13, 2013; 110 pgs.
Gibson, Daryl Lee; Corrected Notice of Allowance for U.S. Appl. No. 15/255,795, filed Sep. 2, 2016, mailed Mar. 21, 2019, 6 pgs.
Gibson, Daryl Lee; Final Office Action for U.S. Appl. No. 15/255,795, filed Sep. 2, 2016, mailed Aug. 31, 2018, 33 pgs.
Gibson, Daryl Lee; Non-Final Office Action for U.S. Appl. No. 15/255,795, filed Sep. 2, 2016, mailed Feb. 23, 2018, 86 pgs.
Gibson, Daryl Lee; Notice of Allowance for U.S. Appl. No. 15/255,795, filed Sep. 2, 2016, mailed Jan. 17, 2019, 17 pgs.
Gibson, Daryl Lee; Final Office Action for U.S. Appl. No. 16/352,045, filed Mar. 13, 2019, mailed May 4, 2021, 33 pgs.
Gibson, Daryl Lee; Non-Final Office Action for U.S. Appl. No. 16/352,045, filed Mar. 13, 2019, mailed Nov. 25, 2020, 106 pgs.
Gibson, Daryl Lee; Non-Final Office Action for U.S. Appl. No. 16/352,045, filed Mar. 13, 2019, mailed Aug. 13, 2021, 20 pgs.
Gibson, Daryl Lee; Notice of Allowance for U.S. Appl. No. 16/352,045, filed Mar. 13, 2019, mailed Dec. 1, 2021, 24 pgs.
Gibson, Daryl Lee; Final Office Action for U.S. Appl. No. 17/683,090, filed Feb. 28, 2022, mailed Mar. 29, 2024, 18 pgs.
Gibson, Daryl Lee; Final Office Action for U.S. Appl. No. 17/683,090, filed Feb. 28, 2022, mailed Mar. 8, 2023, 16 pgs.
Gibson, Daryl Lee; Non-Final Office Action for U.S. Appl. No. 17/683,090, filed Feb. 28, 2022, mailed Dec. 13, 2022, 101 pgs.
Gibson, Daryl Lee; Non-Final Office Action for U.S. Appl. No. 17/683,090, filed Feb. 28, 2022, mailed Dec. 21, 2023, 20 pgs.
Gibson, Daryl Lee; Non-Final Office Action for U.S. Appl. No. 17/683,090, filed Feb. 28, 2022, mailed Aug. 2, 2023, 23 pgs.
Gibson, Daryl Lee; Notice of Allowance for U.S. Appl. No. 17/683,090, filed Feb. 28, 2022, mailed Sep. 26, 2024, 17 pgs.
Gibson, Daryl Lee; Requirement for Restriction/Election for U.S. Appl. No. 17/683,090, filed Feb. 28, 2022, mailed Nov. 9, 2022, 5 pgs.
Gibson, Daryl Lee; Applicant-Initiated Interview Summary for U.S. Appl. No. 16/234,715, filed Dec. 28, 2018, mailed Oct. 14, 2021, 2 pgs.
Gibson, Daryl Lee; Final Office Action for U.S. Appl. No. 16/234,715, filed Dec. 28, 2018, mailed Aug. 5, 2021, 21 pgs.
Gibson, Daryl Lee; Non-Final Office Action for U.S. Appl. No. 16/234,715, filed Dec. 28, 2018, mailed Jan. 1, 2021, 105 pgs.
Gibson, Daryl Lee; Notice of Allowance for U.S. Appl. No. 16/234,715, filed Dec. 28, 2018, mailed Dec. 7, 2021, 23 pgs.
Gibson, Daryl Lee; Final Office Action for U.S. Appl. No. 17/683,127, filed Feb. 28, 2022, mailed Jan. 19, 2024, 36 pgs.
Gibson, Daryl Lee; Non-Final Office Action for U.S. Appl. No. 17/683,127, filed Feb. 28, 2022, mailed Oct. 16, 2024, 30 pgs.
Gibson, Daryl Lee; Non-Final Office Action for U.S. Appl. No. 17/683,127, filed Feb. 28, 2022, mailed Aug. 30, 2023, 121 pgs.
Gibson, Daryl Lee; Corrected Notice of Allowance for U.S. Appl. No. 16/121,136, filed Sep. 4, 2018, mailed Nov. 9, 2020, 6 pgs.
Gibson, Daryl Lee; Non-Final Office Action for U.S. Appl. No. 16/121,136, filed Sep. 4, 2018, mailed Jun. 22, 2020, 94 pgs.
Gibson, Daryl Lee; Notice of Allowance for U.S. Appl. No. 16/121,136, filed Sep. 4, 2018, mailed Sep. 29, 2020, 15 pgs.
Gibson, Daryl Lee; Requirement for Restriction/Election for U.S. Appl. No. 16/121,136, filed Sep. 14, 2018, mailed May 7, 2020, 5 pgs.

(56) References Cited

OTHER PUBLICATIONS

Gibson, Daryl Lee; Applicant-Initiated Interview Summary for U.S. Appl. No. 17/079,642, filed Oct. 26, 2020, mailed Feb. 9, 2022, 2 pgs.
Gibson, Daryl Lee; Final Office Action for U.S. Appl. No. 17/079,642, filed Oct. 26, 2020, mailed Dec. 14, 2021, 17 pgs.
Gibson, Daryl Lee; Non-Final Office Action for U.S. Appl. No. 17/079,642, filed Oct. 26, 2020, mailed Aug. 30, 2021, 84 pgs.
Gibson, Daryl Lee; Notice of Allowance for U.S. Appl. No. 17/079,642, filed Oct. 26, 2020, mailed Mar. 1, 2022, 11 pgs.
Gibson, Daryl Lee; Notice of Allowance for U.S. Appl. No. 17/827,468, filed May 27, 2022, mailed May 15, 2023, 99 pgs.
ABT, Inc., Installation Instructions Belleville Washer springs (Year: 2014).
Gibson, Daryl Lee; Non-Final Office Action for U.S. Appl. No. 16/428,744, filed May 31, 2019, mailed Aug. 2, 2021, 121 pgs.
Hyland, Gregory E.; Non-Final Office Action for U.S. Appl. No. 18/070,154, filed Nov. 28, 2022, mailed Feb. 11, 2025, 30 pgs.
Fleury, Jr., Leo W.; Office Action for Canadian Patent Application No. 3,161,913, filed Aug. 10, 2012, mailed Mar. 12, 2025, 3 pgs.
Ortiz, Jorge Isaac; Non-Final Office Action for U.S. Appl. No. 18/219,826, filed Jul. 10, 2023, mailed Mar. 14, 2025, 125 pgs.
Gibson, Daryl Lee; Final Office Action for U.S. Appl. No. 17/683,127, filed Feb. 28, 2022, mailed Apr. 18, 2025, 23 pgs.
Hyland, Gregory E.; Australian Patent Examination Report for Application No. 2010249499, filed Nov. 17, 2011, mailed Jun. 16, 2014, 5 pgs.
Hyland, Gregory; Decision of Rejection for Japanese Application No. 2012-512048, filed May 20, 2010, mailed Apr. 22, 2014, 10 pgs.
Hyland, Gregory; Japanese Office Action for Application No. 2012-512048, filed May 20, 2010, mailed Oct. 22, 2013, 51 pgs.
Hyland, Gregory; Mexico Office Action for Application No. MX/a/2012/015236, filed Dec. 19, 2012, mailed Oct. 3, 2013, 8 pgs.
Hyland, Gregory; Mexico Office Action for Application No. MX/a/2012/015236, filed Dec. 19, 2012, mailed Dec. 3, 2013, received by foreign associate on Jan. 9, 2014, 4 pgs.
Hyland, Gregory; Mexico Office Action for Application No. MX/a/2012/015236, filed Dec. 19, 2012, mailed Jun. 13, 2013, 4 pgs.
Hyland, Gregory E.; Australian Patent Examination Report for Application No. 2015202223, filed May 20, 2010, mailed Nov. 4, 2015, 4 pgs.
Hyland; International Preliminary Report on Patentability for PCT Application No. PCT/US2011/035374, filed May 5, 2011, mailed Dec. 19, 2012, 5 pgs.
Hyland; International Search Report and Written Opinion for PCT Application No. PCT/US2011/035374, filed May 5, 2011, mailed Sep. 13, 2011, 7 pgs.
Hyland, Gregory E..; Office Action for Canadian Patent Application No. 2,766,850, filed May 5, 2011, mailed Mar. 13, 2017, 4 pgs.
Hyland, Gregory E.; Office Action for Canadian Application No. 2,766,850, filed May 5, 2011, mailed Aug. 16, 2018, 4 pgs.
Hyland, Gregory E.; Office Action for Canadian Application No. 2,766,850, filed May 5, 2011, mailed Jun. 19, 2019, 4 pgs.
Hyland, Gregory E.; Mexico Office Action for Application No. MX/a/2012/000347, filed May 5, 2011, mailed Dec. 13, 2016, 5 pgs.
Hyland, Gregory E.; Mexico Office Action for Application No. MX/a/2012/000347, filed May 5, 2011, mailed May 30, 2016, 4 pgs.
Hyland, Gregory E.; Mexico Office Action for Application No. MX/a/2012/000347, filed May 5, 2011, mailed Aug. 31, 2016, 4 pgs.
Hyland, Gregory E.; Office Action for European Application No. 11796120.1, filed May 5, 2011, mailed Feb. 9, 2018, 4 pgs.
Hyland, Gregory; Extended European Search Report for Application No. 11796120.1, filed May 5, 2011, mailed Nov. 4, 2016, 8 pgs.
Hyland, Gregory E.; Australian Patent Examination Report for Application No. 2011265675, filed Jan. 21, 2012, mailed Oct. 1, 2014, 3 pgs.
Hyland, Gregory E.; Japanese Office Action for Application No. 2013515338, filed Jan. 30, 2012, mailed Jun. 10, 2014, 8 pgs.
Hyland, Gregory E.; Japanese Office Action for Application No. 2014-234642, filed May 5, 2011, mailed Nov. 4, 2015,9 pgs.
Hyland, Gregory E.; Japanese Office Action for Application No. 2014-234642, filed May 5, 2011, mailed Jul. 7, 2015, 9 pgs.
Hyland, Gregory E.; Australian Examination Report for Application No. 2015202550, filed May 5, 2011, mailed Feb. 9, 2017, 4 pgs.
Hyland, Gregory E.; Australian Examination Report for Application No. 2015202550, filed May 5, 2011, mailed May 16, 2017, 5 pgs.
Hyland, Gregory E.; Australian Examination Report for Application No. 2015202550, filed May 5, 2011, mailed Jul. 5, 2017, 4 pgs.
Hyland, Gregory E.; Australian Examination Report for Application No. 2015202550, filed May 5, 2011, mailed Aug. 12, 2016, 4 pgs.
Hyland, Gregory E.; Office Action for Mexico Application No. MX/a/2017/006090, filed May 5, 2011, mailed Sep. 26, 2018, 4 pgs.
Hyland, Gregory E.; Examination Report for Australian Application No. 2017248541, filed Oct. 20, 2017, mailed Apr. 20, 2018, 5 pgs.
Hyland, Gregory E.; Office Action for Canadian Application No. 3,023,529, filed May 5, 2011, mailed Nov. 26, 2019, 4 pgs.
Keefe, Robert Paul, Office Action for Canadian Application No. 3,060,512, filed May 5, 2011, mailed Apr. 22, 2020, 5 pgs.
Keefe, Robert Paul, Office Action for Canadian Application No. 3,060,512, filed May 5, 2011, mailed Jul. 13, 2020, 6 pgs.
Hyland, Gregory E .; Office Action for Canadian Application No. 3,116,787, filed Apr. 29, 2020, mailed Aug. 15, 2022, 4 pgs.
Hyland, Gregory E.; Office Action for Canadian Application No. 3,177,996, filed Apr. 29, 2020, mailed Apr. 9, 2024, 4 pgs.
Fleury, Jr., Leo W.; International Preliminary Report on Patentability for PCT Application No. PCT/US12/50390 filed Aug. 10, 2012, mailed Feb. 18, 2014, 14 pgs.
Fleury, Jr., Leo W.; International Search Report and Written Opinion for PCT Application No. PCT/US12/50390 filed Aug. 10, 2012, mailed Dec. 17, 2012, 18 pgs.
Fleury, Jr., Leo W.; European Search Report for U.S. Appl. No. 12/823,594, filed Aug. 10, 2012, mailed Dec. 21, 2017, 4 pgs.
Fleury, Jr., Leo W.; European Search Report for U.S. Appl. No. 12/823,594, filed Aug. 10, 2012, mailed May 10, 2017, 4 pgs.
Fleury, Jr., Leo W.; European Search Report for U.S. Appl. No. 12/823,594, filed Aug. 10, 2012, mailed Jun. 8, 2015, 11 pgs.
Fleury, Jr., Leo W.; Office Action for Canadian Application No. 2,842,042, filed Aug. 10, 2012, mailed Feb. 28, 2019, 3 pgs.
Fleury, Jr., Leo W.; Office Action for Canadian Application No. 2,842,042, filed Aug. 10, 2012, mailed Apr. 24, 2018, 3 pgs.
Fleury, Jr., Leo W.; Office Action for Canadian Application No. 2,842,042, filed Aug. 10, 2012, mailed Dec. 5, 82019, 3 pgs.
Fleury, Jr., Leo W., Jr.; Office Action for Canadian Application No. 3,102,529, filed Aug. 10, 2012, mailed Oct. 25, 2022, 4 pgs.
Fleury, Jr., Leo W., Jr.; Office Action for Canadian Application No. 3,102,529, filed Aug. 10, 2012, mailed Mar. 16, 2022, 4 pgs.
Fleury, Jr., Leo W.; Office Action for Canadian Application No. 3,161,900, filed Aug. 10, 2012, mailed Aug. 28, 2023, 3 pgs.
Fleury, Jr., Leo W. Jr.; Office Action for Canadian Application No. 3,161,904, filed Aug. 10, 2012, mailed Aug. 22, 2023, 4 pgs.
Fleury, Jr., Leo W.; Office Action for Canadian Application No. 3,161,913, filed Aug. 10, 2012, mailed Jun. 17, 2024, 3 pgs.
Fleury, Jr., Leo W.; Office Action for Canadian Application No. 3,161,913, filed Aug. 10, 2012, mailed Aug. 22, 2023, 4 pgs.
Ball, Marty Scott; U.S. Provisional Patent Application Entitled: Plastic Water Meter, under U.S. Appl. No. 61/022,088, filed Jan. 18, 2008, 10 pgs.
Splitz, David Edwin; Issue Notification for U.S. Appl. No. 13/283,526, filed Oct. 27, 2011, mailed Feb. 5, 2014, 1 pg.
Splitz, David Edwin; Non-Final Office Action for U.S. Appl. No. 13/283,526, filed Oct. 27, 2011, mailed Jun. 18, 2013, 67 pgs.
Splitz, David Edwin; Notice of Allowance for U.S. Appl. No. 13/283,526, filed Oct. 27, 2011, mailed Oct. 9, 2013, 16 pgs.
"Landis & Gyr Utilities: Service Partnership Helps Utilities Use Available Resources More Effectively," www.landisgyr.com/utilities/e/fr_press1_e.htm (archived Feb. 6, 1998) http://web.archive.org/web/19980206060801/http://www.landisgyr.com/utilities.
AMCO; "Pit Water-Meter Transponder (PWT)"; AMCO Automated Systems, LLC; PDB-14611; Sep. 2002; 2 pgs.
AMCO; Remote Water-Meter Transponder (RWT); AMCO Automated Systems, LLC; PDB-14610; Sep. 2002; 2 pgs.
AMCO; "Short-Range Programmer (SRP) VRT"; AMCO Automated Systems, LLC; PDB-14555.1; Sep. 2002; 2 pgs.

(56) References Cited

OTHER PUBLICATIONS

ANSI; "Protocol Specification for ANSI Type 2 Optical Port", American National Standard, ANSI C.12.18-2006, 11 pgs.
Antenna. Merriam-Webster Dictionary, 2014 [retrieved on Jun. 1, 2014]. Retrieved from the Internet: <URL: www.merriam-webster.com/dictionary/antenna>.
Article entitled, "GF Piping Systems' New Metal-to-Plastic Transition Fittings Provide Strong, Leak-Proof Seals", Nov. 13, 2007, pp. 1-6; http://news.thomasnet.com/fullstory/536342.
Article entitled: "Datamatic, Badger Connect for AMR Solutions", http://www.datamatic.com/badger_partnership.html; accessed on Jul. 27, 2012, 1 pg.
Article entitled: "OET Exhibits List", https://apps.fcc.gov/oetcf/eas/reports/ViewExhibitReport.cfm?mode=Exhibits&RequestTimeout=500&calledFromFrame=N&application_id=194044&fcc_id=; Feb. 20, 2001, 2 pgs.
Article entitled: "Remote Meter Reading", http://www.meter.co.uk/RMR.html; accessed on Jul. 30, 2012, 2 pgs.
Brochure entitled, "DoubleSafe tm Transition Fittings from GF Piping Systems" Georg Fischer Piping Systems; date unknown when published: accessed on Oct. 1, 2008; pp. 1-2 http://www.us.piping.georgefischer.com/go/F017C7DA19993E1D340739AFBC4B677E?action=GF_Docu.
Brochure entitled, "POLYRAC and POLYFAST", date unknown when published; accessed on Jun. 1, 2009; pp. 1-8; http://www.cn.piping.georgfischer.com/doc/doc_download.cfm?B81010EAD60EB5F06E54F6B04231161F.
Brochure entitled, "Section 1, Schedule 80 PVC Piping System," Mar. 27, 2006, p. 1.1-1.32; http://web.archive.org/web/20060816045129/http://www.gfpiping.com/downloads/vinyls/01-Sch80PVC.pdf.
Brochure entitled, "Section 2, Schedule 80 CPVC Piping System," Mar. 27, 2006, p. 2.1-2.28; http://web.archive.org/web/20060816045129/http://www.gfpiping.com/downloads/vinyls/02-Sch80CPVC.pdf.
Brochure entitled, "The World Needs Solutions, We Have Them!," date unknown when published accessed on Oct. 1, 2008; pp. 1-12; http://www.plasticsystems.co.nz/booklets/Civil%20Infrastructure/+GF+%20Utilities%20Brochure.pdf.
Brochure entitled, "Transition Fittings, Strong and Reliable Metal-to-Plastic Transitions", BR-2-0305; date unknown when published; accessed on Oct. 1, 2008; pp. 1-2 http://plascowelding.com/pdf2007/PVC&CPVCPipeandFittings/Thermoplastic-Fittings/PVC&CPVC-Metal.
De Almeida et al. "Advanced Monitoring Technologies for the Evaluation of Demand-Side Management Programs," IEEE Transactions on Power Systems, Aug. 1994. vol. 9, No. 3. [Accessed Dec. 29, 2011] http://ieeexplore.ieee.org/xpls/abs_all.jsp?arnumber=336086.
Dolezilek. "Microprocessor Based Relay Information Improves the Power System," Rural Electric Power Conference, May 1999. p. B5/1-B5/9. [Accessed Dec. 29, 2011] http://ieeexplore.ieee.org/xpls/abs_all.jsp?arnumber=768685.
English Translation: Von Roll Hydro—HYRDOJOURNAL, VonRoll Hydroalert—Provides a Warning in the Event of Any Tampering with the Water Supply, p. 3, Nov. 2008.
English Translation: VonRoll Hydro—HYRDOJOURNAL, Technology with a Future for Shut-off Systems—p. 4, VonRoll Hydro (shop) GmbH—New Concepts for Apprentice Training—p. 12, May 2008.
Federal Communications Commission; "Understanding the FCC Regulations for Low-Power, Non-Licensed Transmitters", Office of Engineering and Technology; Oct. 1993; 34 pgs.
Fleury, et al.; Supplemental European Search Report for Application 12823594.2, filed Aug. 20, 2012, mailed Feb. 18, 2015, 6 pgs.
Gehami et al. "Electronic Control System | Salient Feature in Substation," Transmission & Distrubition, Mar. 1991. vol. 43, No. 3, p. 48. [Accessed Dec. 29, 2011—ProQuest].
General Electric; "GEH-5081 Kv Meter Product Manual", Nov. 1997, 137 pgs.
General Electric; "KV RSX—RS232/RS485 Communications Options: Instructions Manual"; Mar. 1999, 33 pgs.
Horlent. "New Metering And Reading Techniques Based on a Modular Design Concept," 10th International Conference on Electricity Distribution, May 1989. vol. 5, p. 455-459. [Accessed Dec. 29, 2011—IEEExplore].
J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271.
Non-Patent Literature "Radiodetection Water Leak Detection Products", 2008, Radiodetection Ltd.—SPX Corporation.
Non-Patent Literature Bimorph (entitled "Bimoprh actuators"), accessed at http://web.archive.org/web/20080122050424/http://www.elpapiezo.ru/eng/curve_e.shtml, archived on Jan. 22, 2008.
Non-Patent Literature Murata (entitled "Piezoelectric Sounds Components"), accessed at http://web.archive.org/web/20030806141815/http://www.murata.com/catalog/p37e17.pdf, archived on Aug. 6, 2003.
Non-Patent Literature NerdKits, accessed at http://web.archive.org/web/20090510051850/http://www.nerdkits.com/videos/sound_meter/, archived on May 10, 2009.
Orfield; "Badger® ORION® System Helps Lemmon, South Dakota Reduce Read Time, Billing Cycles", Badger Connect Publication, 2004, 2 pgs.
Patterson, Tim; Request for Ex Parte Reexamination under U.S. Appl. No. 90/012,449, filed Aug. 23, 2012; 51 pgs.
Patterson, Tim; Request for Ex Parte Reexamination under U.S. Appl. No. 90/012,468, filed Sep. 6, 2012; 52 pgs.
Radix Corporation; "Automatic Meter Reading", 2 pgs.
RFM; "HX 2000 Datasheet: 916.5 MHz: Hybrid Transmitter", RF Monolithics, Inc., Dallas, TX, USA, 1998; 2 pgs.
Semtech; "TN1200.4, Calculating Radiated Power and Field Strength for Conducted Power Measurements", Semtech Corporation, Camarillo, CA, 2007, 9 pgs.
Tamarkin. "Automated Meter Reading", Sep.-Oct. 1992, vol. 50, No. 5/ [Accessed Dec. 29, 2011] http://www.usclcorp.com/news/Automatic_Power_reading.pdf.
Trace; "Pit Water—Meter Transponder"; User Guide; Jan. 2003 16 pgs.
Von Roll Hydro—HYDROJOURNAL, pp. 1-16, Nov. 2008.
VonRoll Hydro—HYDROJOURNAL, pp. 1-16, May 2008.
Young et al. "Real-Time Intranet-Controlled Virtual Instrument Multiple-Circuit Power Monitoring," IEEE Transactions on Instrumentation and Measurement, Jun. 2000. vol. 49, No. 3, p. 570. [Accessed Dec. 29, 2011] http://ieeexplore.ieee.org/xpls/abs_all.jsp?
Keyghobad, Seyamak; Certificate of Correction for U.S. Appl. No. 10/298,300, filed Nov. 18, 2002; mailed Mar. 31, 2009; 1 pg.
Keyghobad, Seyamak; Notice of Allowance for U.S. Appl. No. 12/490,925, filed Jun. 24, 2009; mailed Jun. 28, 2010; 10 pgs.
Gibson, Daryl Lee; International Preliminary Report on Patentability for PCT Application No. PCT/US21/31033, filed May 6, 2021, mailed Nov. 24, 2022, 9 pgs.
Dintakurti, Ganapathi Deva Varma; Issue Notification for U.S. Appl. No. 13/492,794, filed Jun. 8, 2012, mailed Dec. 19, 2018, 1 pg.
Dintakurti, Ganapathi Deva Varma; Non-Final Office Action for U.S. Appl. No. 13/492,794, filed Jun. 8, 2012, mailed Mar. 16, 2017, 30 pgs.
Dintakurti, Ganapathi Deva Varma; Non-Final Office Action for U.S. Appl. No. 13/492,794, filed Jun. 8, 2012, mailed May 17, 2016, 48 pgs.
Dintakurti, Ganapathi Deva Varma; Non-Final Office Action for U.S. Appl. No. 13/492,794, filed Jun. 8, 2012, mailed Jan. 11, 2018, 38 pgs.
Dintakurti, Ganapathi Deva Varma; Non-Final Office Action for U.S. Appl. No. 13/492,794, filed Jun. 8, 2012, mailed Jan. 16, 2015, 60 pgs.
Dintakurti, Ganapathi Deva Varma; Notice of Allowance for U.S. Appl. No. 13/492,794, filed Jun. 8, 2012, mailed Sep. 24, 2018, 21 pgs.
Fleury Jr, Leo W.; Non-Final Office Action for U.S. Appl. No. 13/492,795, filed Jun. 8, 2012, mailed Sep. 23, 2013; 35 pgs.
Fleury, Jr., Leo W.; Advisory Action for U.S. Appl. No. 13/492,795, filed Jun. 8, 2012, mailed Jun. 18, 2014, 4 pgs.

(56) References Cited

OTHER PUBLICATIONS

Fleury, Jr., Leo W.; Advisory Action for U.S. Appl. No. 13/492,795, filed Jun. 8, 2012, mailed Sep. 9, 2015, 3 pgs.
Fleury, Jr., Leo W.; Corrected Notice of Allowability for U.S. Appl. No. 13/492,795, filed Jun. 8, 2012, mailed Feb. 14, 2017; 8 pgs.
Fleury, Jr., Leo W.; Final Office Action for U.S. Appl. No. 13/492,795, filed Jun. 8, 2012, mailed Apr. 23, 2014, 19 pgs.
Fleury, Jr., Leo W.; Final Office Action for U.S. Appl. No. 13/492,795, filed Jun. 8, 2012, mailed May 22, 2015, 28 pgs.
Fleury, Jr., Leo W.; Issue Notification for U.S. Appl. No. 13/492,795, filed Jun. 8, 2012, mailed Feb. 22, 2017; 1 page.
Fleury, Jr., Leo W.; Non-Final Office Action for U.S. Appl. No. 13/492,795, filed Jun. 8, 2012, mailed Oct. 21, 2014, 37 pgs.
Fleury, Jr., Leo W.; Non-Final Office Action for U.S. Appl. No. 13/492,795, filed Jun. 8, 2012, mailed Mar. 1, 2016, 42 pgs.
Fleury, Jr., Leo W.; Notice of Allowability for U.S. Appl. No. 13/492,795, filed Jun. 8, 2012, mailed Oct. 24, 2016, 13 pgs.
Fleury, Jr., Leo W.; Notice of Allowance for U.S. Appl. No. 13/492,795, filed Jun. 8, 2012, mailed Sep. 21, 2016, 18 pgs.
Fleury, Jr., Leo W.; Supplemental Notice of Allowance for U.S. Appl. No. 13/492,795, filed Jun. 8, 2012, mailed Nov. 22, 2016; 8 pgs.
Fleury, Jr., Leo W.; Corrected Notice of Allowance for U.S. Appl. No. 15/401,457, filed Jan. 9, 2017, mailed Jun. 26, 2019, 55 pgs.
Fleury, Jr., Leo W.; Notice of Allowance for U.S. Appl. No. 15/401,457, filed Jan. 9, 2017, mailed Apr. 16, 2019, 88 pgs.
Fleury Jr., Leo W.; Final Office Action for U.S. Appl. No. 16/453,318, filed Jun. 26, 2019, mailed Aug. 8, 2022, 53 pgs.
Fleury Jr., Leo W.; Notice of Allowance for U.S. Appl. No. 16/453,318, filed Jun. 26, 2019, mailed Oct. 25, 2022, 43 pgs.
Fleury Jr., Leo W.; Notice of Allowance for U.S. Appl. No. 16/453,318, filed Jun. 26, 2019, mailed Dec. 5, 2022, 146 pgs.
Fleury, Jr.; Non-Final Office Action for U.S. Appl. No. 16/453,318, filed Jun. 26, 2019, mailed Mar. 2, 2022, 129 pgs.
Ball, Marty Scott, Office Action from Canadian Intellectual Property Office for Application No. 2,650,174, filed Jan. 19, 2009, mailed Sep. 8, 2011, 3 pgs.
Ball, Marty Scott, Office Action from Canadian Intellectual Property Office for Application No. 2,650,174, filed Jan. 19, 2009, mailed Dec. 7, 2010; 2 pages.
Ball, Marty Scott; Canadian Office Action for Application No. 2,777,585, filed Jan. 19, 2009, mailed Oct. 21, 2013, 2 pgs.
Ball, Marty Scott; Mexico Office Action for Application No. MX/a/2012/006097, filed May 25, 2012, mailed Mar. 19, 2015, 3 pgs.
Ball, Marty Scott; Mexico Office Action for Application No. MX/a/2012/006097, filed May 25, 2012, mailed May 26, 2015, 5 pgs.
Hyland, Gregory; International Preliminary Report on Patentability for PCT Application No. PCT/US2009/062247, filed Oct. 27, 2009, mailed May 3, 2011, 7 pgs.
Hyland, Gregory; International Search Report for PCT Application No. PCT/US2009/062247, filed on Oct. 27, 2009, mailed Dec. 18, 2009, 2 pgs.
Hyland, Gregory E.; Canadian Office Action for Application No. 2,741,843, filed Oct. 27, 2009, mailed Dec. 8, 2015, 5 pgs.
Hyland, Gregory; Mexico Office Action for Application No. MX/a/2011/004330, filed Apr. 25, 2011, mailed Oct. 3, 2013, 6 pgs.
Hyland, Gregory; Mexico Office Action for Application No. MX/a/2011/004330, filed Apr. 25, 2011, mailed Jul. 18, 2013, 6 pgs.
Hyland, Gregory; Mexico Office Action for Application No. MX/a/2011/004330, filed Apr. 25, 2011, mailed Mar. 21, 2013, 7 pgs.
Hyland; European Examination Report for Application No. EP09824079.9, filed Oct. 27, 2009, mailed Nov. 13, 2015; 6 pgs.
Hyland; European Search Report for Application No. EP09824079.9, filed Oct. 27, 2009, mailed May 8, 2012; 38 pages.
Hyland, Gregory; Australian Patent Examination Report for Application No. 2009308949, filed Oct. 27, 2009, mailed Nov. 12, 2013, 3 pgs.
Hyland, Gregory E.; Decision of Rejection for Japanese Application No. 2011-533427, filed Oct. 27, 2009, mailed Sep. 16, 2014, 4 pgs.
Hyland, Gregory E.; Japanese Office Action for Application No. 2011-533427, filed Oct. 27, 2009, mailed Feb. 4, 2014, 50 pgs.
Hyland, Gregory E.; Japanese Office Action for Application No. 2011-533427, filed Oct. 27, 2009, mailed Apr. 30, 2013, 15 pgs.
Hyland, Gregory E.; Australian Examination Report for Application No. 2014259545, filed Oct. 27, 2009, mailed Jun. 10, 2015; 2 pgs.
Hyland; International Search Report and Written Opinion for PCT Application No. PCT/US2010/035666, filed May 20, 2010, mailed Jul. 16, 2010, 7 pgs.
Hyland; International Preliminary Report on Patentability for PCT Application No. PCT/US2010/035666, filed May 20, 2010, mailed Nov. 22, 2011, 6 pgs.
Hyland, Gregory E.; Mexico Final Office Action for Application No. MX/A/2011/012383, filed May 20, 2010, mailed Jan. 9, 2014, 9 pgs.
Hyland, Gregory E.; Mexico Office Action for Application No. MX/A/2011/012383, filed May 20, 2010, mailed Oct. 8, 2012, 3 pgs.
Hyland, Gregory E.; Mexico Office Action for Application No. MX/A/2011/012383, filed May 20, 2010, mailed May 9, 2013, 8 pgs.
Hyland, Gregory E.; Mexico Office Action for Application No. MX/A/2011/012383, filed May 20, 2010, mailed Sep. 3, 2013, 10 pgs.
European Search Report for Application No. EP2433440, filed Nov. 18, 2011, mailed Nov. 28, 2012, 6 pgs.
Hyland, Gregory E.; Australian Patent Examination report for Application No. 2010249499, filed Nov. 17, 2011, mailed Nov. 21, 2014, 5 pgs.
Gibson, Daryl Lee; Notice of Allowance for U.S. Appl. No. 16/428,744, filed May 31, 2019, mailed Mar. 16, 2022, 34 pgs.
Gibson, Daryl Lee; Notice of Allowance for U.S. Appl. No. 16/428,744, filed May 31, 2019, mailed Sep. 14, 2022, 12 pgs.
QRFS, Storz FDCs and fire Hydrant Storz connections: Adapters or integral Storz, Mar. 2019 (Year: 2019).
Speacialinsert, Inserts for plastic (Year: 2016).
Gibson, Daryl Lee; Applicant-Initiated Interview Summary for U.S. Appl. No. 17/245,419, filed Apr. 30, 2021, mailed Dec. 2, 2021, 2 pgs.
Gibson, Daryl Lee; Applicant-Initiated Interview Summary for U.S. Appl. No. 17/245,419, filed Apr. 30, 2021, mailed Mar. 8, 2022, 2 pgs.
Gibson, Daryl Lee; Final Office Action for U.S. Appl. No. 17/245,419, filed Apr. 30, 2021, mailed Oct. 25, 2021, 27 pgs.
Gibson, Daryl Lee; Final Office Action for U.S. Appl. No. 17/245,419, filed Apr. 30, 2021, mailed Apr. 8, 2022, 31 pgs.
Gibson, Daryl Lee; Non-Final Office Action for U.S. Appl. No. 17/245,419, filed Apr. 30, 2021, mailed Jan. 14, 2022, 27 pgs.
Gibson, Daryl Lee; Non-Final Office Action for U.S. Appl. No. 17/245,419, filed Apr. 30, 2021, mailed Jul. 20, 2022, 37 pgs.
Gibson, Daryl Lee; Non-Final Office Action for U.S. Appl. No. 17/245,419, filed Apr. 30, 2021, mailed Sep. 2, 2021, 82 pgs.
Gibson, Daryl Lee; Notice of Allowance for U.S. Appl. No. 17/245,419, filed Apr. 30, 2021, mailed Nov. 4, 2022, 22 pgs.
Gibson, Daryl Lee; Notice of Allowance for U.S. Appl. No. 17/245,419, filed Apr. 30, 2021, mailed Feb. 23, 2023, 15 pgs.
ABT, Inc.; Installation Instructions for Belleville washer springs (Year: 2014), 1 pg.
Endeavour Tools; Catalogue for Security fasteners (Year: 2007), 52 pgs.
Gibson, Daryl Lee; Non-Final Office Action for U.S. Appl. No. 18/106,190, filed Feb. 6, 2023, mailed Dec. 13, 2023, 122 pgs.
Gibson, Daryl Lee; Notice of Allowance for U.S. Appl. No. 18/106,190, filed Feb. 6, 2023, mailed Apr. 12, 2024. 13 pgs.
Gibson, Daryl Lee; International Preliminary Report on Patentability for PCT Application No. PCT/US2016/067692, filed Dec. 20, 2016, mailed Aug. 23, 2018, 9 pgs.
Gibson, Daryl Lee; International Search Report and Written Opinion for PCT Application No. PCT/US2016/067692, filed Dec. 20, 2016, mailed Mar. 2, 2017,10 pgs.
Gibson, Daryl Lee; Extended European Search Report for 16890115.5, filed Dec. 20, 2016, mailed Jan. 24, 2020, 10 pgs.
Gibson, Daryl Lee; Office Action for Canadian patent application No. 3,010,345, filed Dec. 20, 2016, mailed Oct. 6, 2020, 4 pgs.

(56) References Cited

OTHER PUBLICATIONS

Gibson, Daryl Lee; Office Action for Canadian patent application No. 3,010,345, filed Dec. 20, 2016, mailed Dec. 16, 2019, 4 pgs.
Gibson, Daryl Lee; Office Action for Canadian patent application No. 3,119,150, filed Dec. 20, 2016, mailed Sep. 15, 2022, 6 pgs.
Gibson, Daryl Lee; Office Action for Canadian patent application No. 3,177,216, filed Dec. 20, 2016, mailed Apr. 2, 2024, 5 pgs.
Gibson, Daryl Lee; Extended European Search Report for application No. 23154819.9, filed Dec. 20, 2016, mailed Apr. 28, 2023, 16 pgs.
Gibson, Daryl Lee; Office Action for Canadian patent application No. 3,057,224, filed Oct. 1, 2019, mailed Nov. 10, 2020, 4 pgs.
Gibson, Daryl; Office Action for U.S. Appl. No. 3,057,224, filed Oct. 1, 2019, mailed Jun. 23, 2021, 4 pgs.
Gibson, Daryl Lee; International Preliminary Report on Patentability for PCT Application No. PCT/US19/45451, filed Aug. 7, 2019, mailed Mar. 18, 2021, 8 pgs.
Gibson, Daryl Lee; International Search Report and Written Opinion for PCT Application No. PCT/US19/45451, filed Aug. 7, 2019, mailed Feb. 3, 2020, 11 pgs.
Gibson, Daryl Lee; Invitation to Pay Additional Fees for PCT/US19/45451, filed Aug. 7, 2019, mailed Oct. 10, 2019, 2 pgs.
Gibson, Daryl Lee; Office Action for Canadian patent application No. 3,057,167, filed Aug. 7, 2019, mailed Nov. 19, 2019, 7 pgs.
Gibson, Daryl Lee; Office Action for Canadian patent application No. 3,057,167, filed Aug. 7, 2019, mailed May 25, 2020, 3 pgs.
Gibson, Daryl Lee; Office Action for Canadian patent application No. 3,105,683, filed Aug. 7, 2019, mailed Dec. 1, 2022, 3 pgs.
Gibson, Daryl Lee; Office Action for Canadian patent application No. 3,105,683, filed Aug. 7, 2019, mailed Mar. 8, 2022, 4 pgs.
Gibson, Daryl Lee; Extended European Search Report for application No. 19857477.4, filed Aug. 7, 2019, mailed Apr. 5, 2022, 7 pgs.
Gibson, Daryl Lee; Office Action for European patent application No. 19857477.4, filed Aug. 7, 2019, mailed Jul. 31, 2023, 3 pgs.
Gibson, Daryl Lee; Supplementary Examination Written Opinion for Singapore patent application No. 11202101803V, filed Jul. 8, 2019, mailed Nov. 2, 2022, 4 pgs.
Gibson, Daryl Lee; Extended European Search Report for application No. 21180958.7, filed Aug. 7, 2019, mailed Oct. 5, 2021, 8 pgs.
Gibson, Daryl Lee; Office Action for European patent application No. 21180958.7, filed Aug. 7, 2019, mailed Apr. 26, 2023, 4 pgs.
Gibson, Daryl Lee; Office Action for Canadian application No. 3,057,202, filed Oct. 1, 2019, mailed Dec. 19, 2019, 3 pgs.
Gibson, Daryl Lee; Office Action for Canadian application No. 3,057,202, filed Oct. 1, 2019, mailed Apr. 2, 2020, 4 pgs.
Gibson, Daryl Lee; Office Action for Canadian application No. 3,057,202, filed Oct. 1, 2019, mailed Aug. 31, 2020, 4 pgs.
Gibson, Daryl Lee; Office Action for Canadian patent application No. 3,113,517, filed Oct. 1, 2019, mailed Jul. 8, 2022, 5 pgs.
Gibson, Daryl Lee; Non-Final Office Action for U.S. Appl. No. 16/874,340, filed May 14, 2020, mailed May 27, 2022, 126 pgs.
Gibson, Daryl Lee; Notice of Allowance for U.S. Appl. No. 16/874,340, filed May 14, 2020, mailed Sep. 12, 2022, 16 pgs.
Gibson, Daryl Lee; Non-Final Office Action for U.S. Appl. No. 18/071,359, filed Nov. 29, 2022, mailed Feb. 8, 2024, 154 pgs.
Gibson, Daryl Lee; Notice of Allowance for U.S. Appl. No. 18/071,359, filed Nov. 29, 2022, mailed May 14, 2024, 17 pgs.
Gibson, Daryl Lee; International Search Report and Written Opinion for PCT Application No. PCT/US21/31033, filed May 6, 2021, mailed Sep. 24, 2021, 12 pgs.
Gibson, Daryl Lee; Invitation to Pay Additional Fees for PCT/US21/31033, filed May 6, 2021, mailed Jul. 15, 2021, 2 pgs.
"In Brief," Land Mobile Radio News, Jan. 16, 1998. vol. 52, No. 3, p. 1. [Accessed Dec. 29, 2011—ProQuest] http://proquest.umi.com/pqdweb?did=25435781&SID=1&Fmt=3&clientld=31810&RQT=309&VName%20=PQD.
Gibson, Daryl Lee; Office Action for Canadian Application No. 3202215, filed Jun. 6, 2023, mailed Aug. 28, 2025, 3 pgs.
Gibson, Daryl Lee; Conditional Notice of Allowance for Canadian Application No. 3,178,637, filed Nov. 11, 2022, mailed Sep. 3, 2025, 3 pgs.
Ortiz, Jorge Isaac; Non-Final Office Action for U.S. Appl. No. 18/219,826, filed Jul. 10, 2023, mailed Nov. 18, 2025, 15 pgs.
Sobhani, Mohammad Hassan; Notice of Allowance for U.S. Appl. No. 17/976,314, filed Oct. 28, 2022, mailed Nov. 17, 2025, 18 pgs.
Hyland, Gregory E.; Final Office Action for U.S. Appl. No. 18/070,154, filed Nov. 28, 2022, mailed Aug. 13, 2025, 10 pgs.
Ortiz, Jorge Isaac; Final Office Action for U.S. Appl. No. 18/219,826, filed Jul. 10, 2023, mailed Aug. 26, 2025, 16 pgs.
Gibson, Daryl Lee; Notice of Allowance for U.S. Appl. No. 17/683,127, filed Feb. 28, 2022, mailed Aug. 13, 2025, 75 pgs.
Gibson, Daryl Lee; Notice of Allowance for Canadian Patent Application No. 3,177,216, filed Dec. 20, 2016, mailed Sep. 5, 2025, 1 pg.
Hyland, Gregory E.; Notice of Allowance for U.S. Appl. No. 18/070,154, filed Nov. 28, 2022, mailed Oct. 15, 2025, 7 pgs.
Fleury, Jr., Leo W.; Notice of Allowance for Canadian Patent Application No. 3, 161,913, filed Aug. 10, 2012, mailed Oct. 31, 2025, 1 pg.
Ortiz, Jorge Isaac; Final Office Action for U.S. Appl. No. 18/219,826, filed Jul. 10, 2023, mailed Jun. 17, 2026, 19 pgs.

* cited by examiner

HYDRANT NOZZLE CAP ADAPTER

CROSS-REFERENCE TO RELATED APPLICATIONS

The present application is a continuation of U.S. application Ser. No. 18/071,359, filed Nov. 29, 2022, which is a continuation of U.S. application Ser. No. 16/874,340, filed May 14, 2020, and issued as U.S. Pat. No. 11,542,690 on Jan. 3, 2023, each of which is hereby specifically incorporated by reference herein in its entirety.

TECHNICAL FIELD

This disclosure relates to fire hydrants. More specifically, this disclosure relates to a nozzle cap adapter for mounting a nozzle cap to a hydrant nozzle.

BACKGROUND

Fire hydrants are commonly connected to fluid systems, such as municipal water infrastructure systems and water mains, through standpipes. Nozzle caps can be connected to nozzles of the fire hydrant to seal the nozzles when they are not in use and/or to mount various systems (e.g., a leak detection system) to the nozzles. Fire hydrants can define varying styles of nozzle connections (e.g., threaded nozzle connection, U.S. Storz nozzle connection, Canadian Storz nozzle connection, etc.) to which the nozzle cap can be connected. Nozzle caps configured to connect to a particular style of nozzle connection may be unable to connect to nozzle connections of another style.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a nozzle cap adapter comprising an adapter ring defining a first adapter ring end, a second adapter ring end opposite the first adapter ring end, and an interior void extending from the first adapter ring end to the second adapter ring end; a nozzle connector extending from the second end of the adapter ring, the nozzle connector configured to rotatably engage a fire hydrant nozzle; and a latch coupled to the adapter ring and configured to removably lock the nozzle cap adapter onto the fire hydrant nozzle.

Also disclosed is a nozzle cap assembly comprising a nozzle cap comprising an outer housing and an inner housing; and a nozzle cap adapter coupled to the inner housing, the nozzle cap adapter comprising: an adapter ring; and a nozzle connector extending from the adapter ring, the nozzle connector configured to engage a fire hydrant nozzle.

A method for mounting a nozzle cap to a fire hydrant nozzle is also disclosed, the method comprising providing a nozzle cap assembly, the nozzle cap assembly comprising a nozzle cap and a nozzle cap adapter, the nozzle cap adapter coupled to an inner housing of the nozzle cap, the nozzle cap adapter comprising an adapter ring and a nozzle connector extending from the adapter ring; engaging the nozzle connector with a fire hydrant nozzle; and rotating the nozzle cap assembly relative to the fire hydrant nozzle to secure the nozzle cap assembly to the fire hydrant nozzle.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
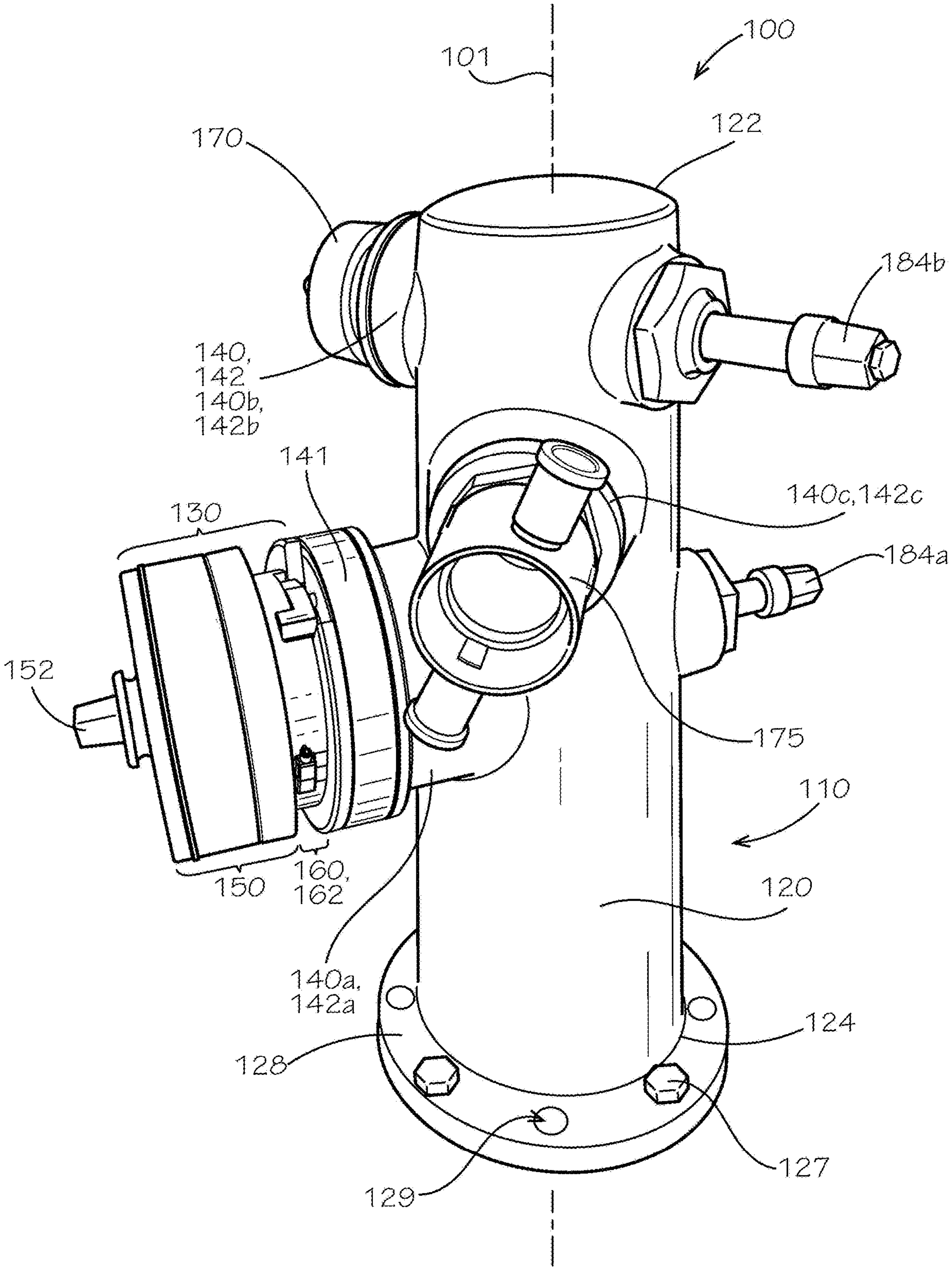
FIG. 1A is a top perspective view of a fire hydrant comprising a nozzle cap assembly, in accordance with another aspect of the present disclosure, wherein the nozzle cap assembly comprises a nozzle cap and a nozzle cap adapter.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a nozzle cap adapter and associated methods, systems, devices, and various apparatus. Example aspects of the nozzle cap adapter can be configured to mount a nozzle cap to a nozzle of a fire hydrant. The nozzle cap can comprise an adapter ring defining one or more nozzle connectors. In some aspects, the nozzle cap adapter can be a U.S. Storz adapter configured to attach to a U.S. Storz nozzle. It would be understood by one of skill in the art that the disclosed nozzle cap adapter is described in but a few exemplary aspects among many. No particular terminology or description should be considered limiting on the disclosure or the scope of any claims issuing therefrom.

FIG. 1A is a perspective view of a hydrant assembly 100 comprising a fire hydrant 110 and a nozzle cap assembly 130, in accordance with one aspect of the present disclosure. The nozzle cap assembly 130 can comprise a nozzle cap 150 and a nozzle cap adapter 160. Example aspects of the fire hydrant 110 can be a wet barrel hydrant, as shown; however, in other aspects, the fire hydrant 110 can be any other type of hydrant known in the art, such as, for example, a dry barrel hydrant. The fire hydrant 110 can comprise a barrel 120 and one or more nozzles 140 (such as nozzles 140*a,b,c*). In some aspects, some or all of the nozzles 140*a,b,c* can comprise a U.S. Storz nozzles 142*a,b,c*. The U.S. Storz nozzles 142 can be non-threaded nozzles that can provide a quarter-turn connection. Furthermore, in some aspects, the nozzle cap adapter 160 can be, for example, a U.S. Storz adapter 162 configured to mount the nozzle cap 150 to a U.S. Storz connector 141 of the U.S. Storz nozzle 142*a*. The U.S. Storz connector 141 is shown in further detail in FIG. 1B. In the present aspect, the barrel 120 can be closed at a top barrel end 122 of the barrel 120, as shown. However, other aspects may comprise a hydrant cap or bonnet (not shown) at the top barrel end 122. In a wet barrel hydrant, water can be present and fill the barrel 120 at all times, even when the fire hydrant 110 is not in use. Each of the nozzles 140*a,b,c* can house its own independent valve (not shown) to prevent or allow water flow to the respective nozzle 140*a,b,c*. In a dry barrel hydrant, the barrel 120 can be drained of water when the fire hydrant 110 is not in use, and a valve for preventing or allowing water flow to the nozzles 140*a,b,c* can be housed below ground, such that water will not freeze in the barrel 120 in cold conditions. As shown, example aspects of the barrel 120 can define the top barrel end 122 and a bottom barrel end 124 disposed opposite from the top barrel end 122. Example aspects of the barrel 120 can be substantially tubular and can define a barrel axis 101 extending from the top barrel end 122 to the bottom barrel end 124. In the present aspect, the barrel axis 101 can be substantially vertically aligned.

According to example aspects, the barrel 120 can comprise a base flange 128 disposed at the bottom barrel end 124. The base flange 128 can be fastened to a fluid system (not shown), such as a water main. In one aspect, the base flange 128 can be fastened to a standpipe flange of a standpipe, for example and without limitation. The base flange 128 of the barrel 120 can define a plurality of fastener openings 129 and can be fastened to the fluid system (e.g., to the standpipe flange) by one or more fasteners 127, such as bolt and nut assemblies, engaged with the fastener openings 129. In other aspects, the base flange 128 can be fastened to the standpipe flange by any other suitable connection method known in the art, such as, for example and without limitation, threading, adhesives, welding, any suitable mechanical fasteners, or the like. As shown, example aspects of the barrel 120 can comprise a first operation nut 184*a*, or "op nut", positioned opposite the nozzle 140*a* and nozzle cap 150, which can be rotated to open and close a first valve (not shown) mounted in the nozzle 140*a* in order to respectively supply or cut off pressurized water flow through the nozzle 140*a* from the barrel 120. Example aspects of the barrel 120 can further comprise a second operation nut 184*b* positioned opposite the nozzle 140*b*, which can be operated to open and close a second valve (not shown) mounted in the nozzle 140*b*, and a third operation nut (not shown) positioned opposite the nozzle 140*c*, which can be operated to open and close a third valve (not shown) mounted in the nozzle 140*c*.

According to example aspects, the nozzle cap 150 can be screwed onto the nozzle 140*a* to seal the nozzle 140*a* in a sealed orientation. With the nozzle cap 150 sealing the nozzle 140*a*, pressurized water from the fluid system cannot escape through the nozzle 140*a*. As shown, the nozzle cap 150 can define a cap nut 152 that can be turned, such as with a wrench or another suitable tool, to tighten or loosen the nozzle cap 150 on the nozzle 140*a*. Furthermore, in some aspects, a hose cap 170 can be screwed onto the nozzle 140*b* to seal the nozzle 140*b* in a sealed orientation. Some aspects, such as the present aspect, can further comprise a quick connect adapter 175 attached to the nozzle 140*c* for to facilitate the attachment of a fire hose (not shown) to the nozzle 140*c*. According to example aspects, the fire hydrant 110 can be formed from a metal material, such as, for example, cast or ductile iron, and some or all of the nozzles 140*a,b,c* can be formed from a metal material, such as cast or ductile iron. In other aspects, however, the fire hydrant 110 and/or the nozzles 140*a,b,c* can be formed from any other suitable material or combination of materials known in the art.

In example aspects, the nozzle cap 150 can comprise a leak detection system (not shown). For example, the nozzle cap 150 may comprise a vibration sensor, which can be configured to detect leaks within the fluid system by monitoring vibrations travelling up the standpipe and through the fire hydrant 110 when the nozzle cap 150 is mounted on the nozzle 140*a*. Vibration patterns within the fluid system can indicate the presence of leaks within the fluid system. According to example aspects, the nozzle cap 150 can further comprise an antenna (not shown), which can be configured to transmit a signal outwards from the nozzle cap 150 to convey whether leaks have been identified within the fluid system.

Figure 1B:
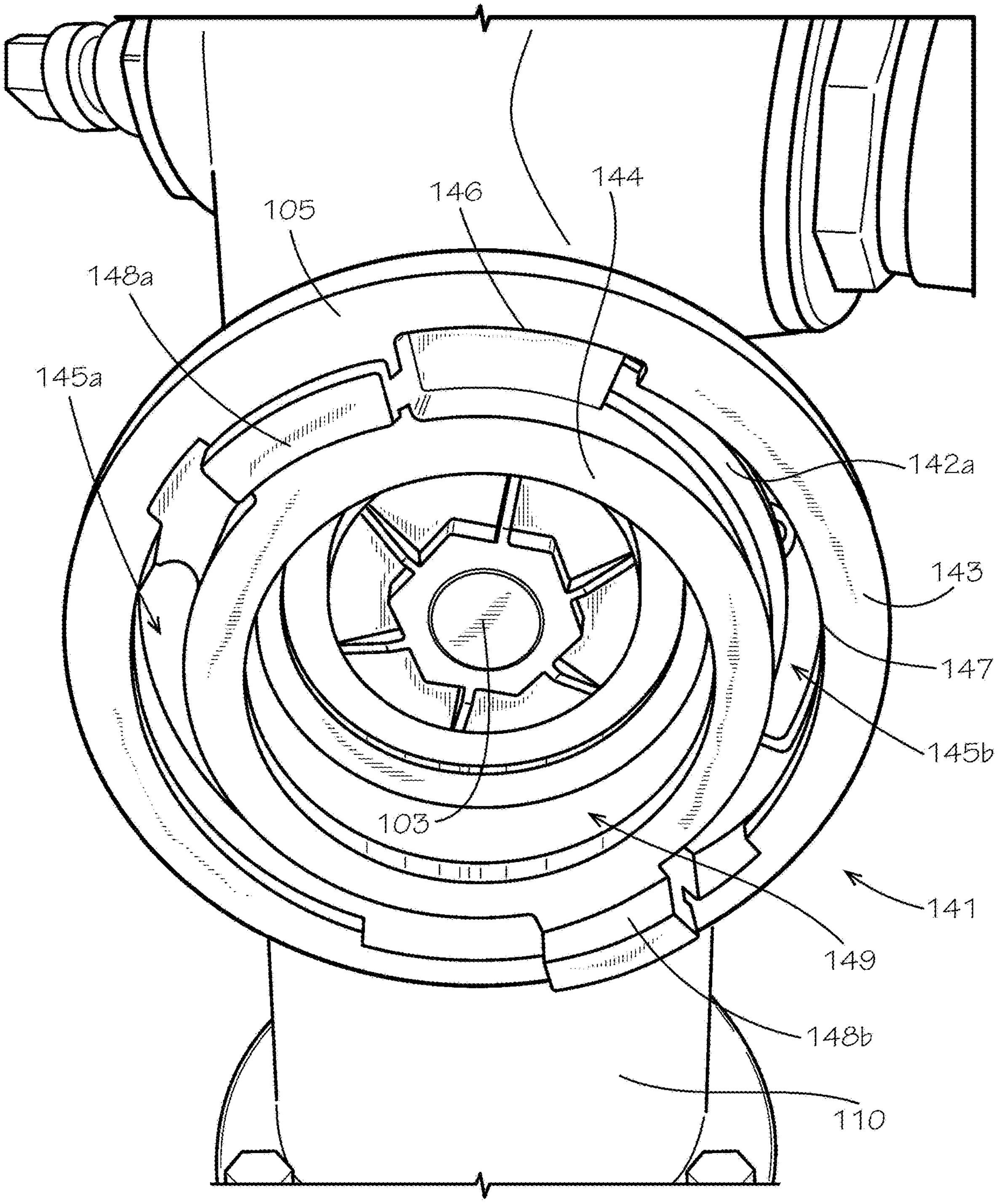
FIG. 1B is a front view of the fire hydrant of FIG. 1A with the nozzle cap assembly removed.

FIG. 1B illustrates the U.S. Storz connector 141 of the U.S. Storz nozzle 142*a* with the nozzle cap assembly 130 (shown in FIG. 1A) removed. As shown, the U.S. Storz connector 141 can generally comprise an outer ring 143 and an inner ring 144 connected to the outer ring 143, and can define a substantially circular shape. The U.S. Storz connector 141 can further define an opening 149 formed through a center thereof in some aspects, and the opening 149 can define a connector axis 103 (extending substantially into the page in the present view). A first arcuate slot 145*a* can be defined between the outer and inner rings 143,144. A second arcuate slot 145*b* can also be defined between the outer and inner rings 143,144 opposite the first arcuate slot 145*a*. The first and second arcuate slots 145*a,b* can be substantially concentric to the connector axis 103 in some aspects, as shown. Each of the first and second arcuate slots 145*a,b* can define an insertion region 146 and a locking region 147 extending from the insertion region 146, wherein the insertion region 146 can define a width greater than a width of the locking region 147. According to example aspects, the U.S. Storz connector 141 can further comprise a first connector arm 148*a* and a second connector arm 148*b*, wherein each of the first and second connector arms 148*a,b* can extend substantially in the axial direction from a first end 105 of the U.S. Storz connector 141. As shown, the first end 105 of the U.S. Storz connector 141 can be distal to the fire hydrant 110. According to example aspects, the nozzle cap adapter 160 (shown in FIG. 1A), e.g., the U.S. Storz adapter 162 (shown in FIG. 1A), can comprise a pair of nozzle connectors 310 (shown in FIG. 3), wherein each of the nozzle connectors 310 can be configured to engage one of the arcuate slots 145*a,b* to couple the nozzle cap assembly 130 (shown in FIG. 1A) to the U.S. Storz nozzle 142*a*, as described in further detail below. Furthermore, each of the of the first and second connector arms 148*a*, 148*b* of the U.S. Storz connector 141 can be configured to engage a corresponding ramped surface 403 of the nozzle cap adapter 160 to tighten the nozzle cap assembly 130 with the U.S. Storz nozzle 142*a*, as described in further detail below.

Figure 2:
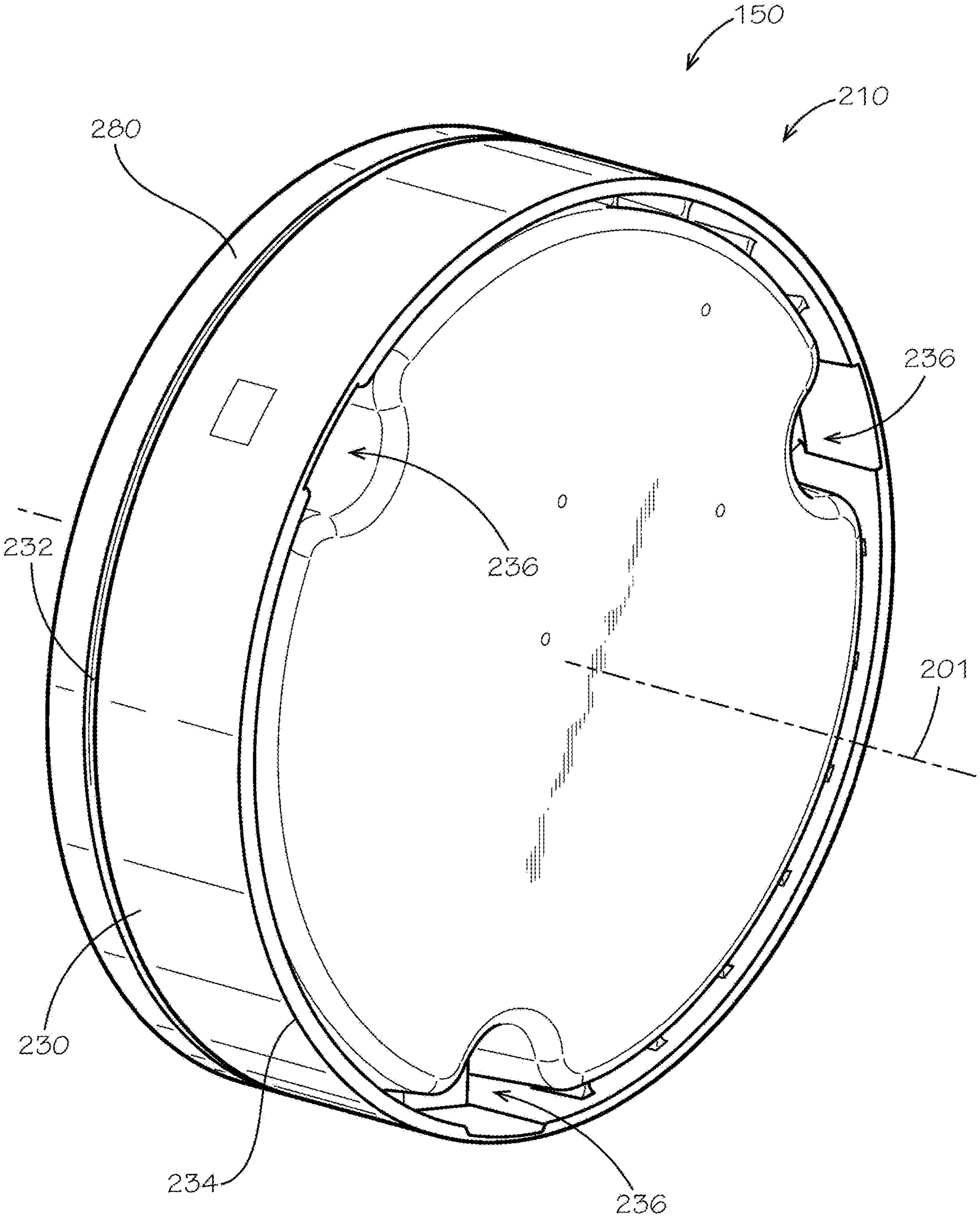
FIG. 2 is a rear perspective view of the nozzle cap of FIG. 1A, in accordance with one aspect of the present disclosure.

FIG. 2 is a rear perspective view of the nozzle cap 150 of FIG. 1A. The nozzle cap 150 can comprise a cap body 210 and a cap cover 280. Example aspects of the cap cover 280 can be formed from a metal material, such as for example, ductile iron, or can be formed from a plastic material, or any other suitable material known in the art. The cap body 210 can comprise an outer housing 230 and an inner housing 340 (shown in FIG. 3). According to example aspects, the outer housing 230 can be substantially cylindrical in shape and can define a first outer housing end 232 and a second outer housing end 234 disposed opposite from the first outer housing end 232. The cap cover 280 can be mounted to the outer housing 230 at the first outer housing end 232, and the inner housing 340 can be mounted to the outer housing 230 at the second outer housing end 234. Furthermore, the outer housing 230 can define a cap axis 201 extending generally through a center thereof, and the cap axis 201 can extend from the first outer housing end 232 to the second outer housing end 234.

According to example aspects, the outer housing 230 and/or the inner housing 340 can be formed from a substantially rigid material. For example, the inner housing 340 can be formed from a metal material, such as, for example, aluminum, and the outer housing 230 can be formed from a plastic material. Example aspects of the plastic material of the outer housing 230 can be a glass-filled plastic material to provide an improved acoustic performance for the leak detection system. In example aspects, the leak detection system can be housed, or primarily housed, in the outer housing 230. In other aspects, each of the inner housing 340 and outer housing 230 can be formed from any other suitable material known in the art.

As shown, in the present aspect, the outer housing 230 can define one or more mounting recesses 236 formed at the second outer housing end 234 thereof, wherein each of the mounting recesses 236 can be configured to receive a corresponding primary mounting leg 442 (shown in FIG. 4A) of the inner housing 340. In some example aspects, a mounting recess hole (not shown) can be formed through each mounting recess 236, and a corresponding cap cover hole (not shown) can be formed through the cap cover 280 and aligned with each of the mounting recess holes. Furthermore, a primary mounting leg hole 544 (shown in FIG. 5) can be formed through each of the primary mounting legs 442. A nozzle cap fastener (not shown), such as, for example and without limitation, a bolt or a screw, can be configured to extend through each corresponding cap cover hole, mounting recess hole, and primary mounting leg hole 544 to couple the cap cover 280, inner housing 340, and outer housing 230 together. In the present aspect, three mounting recesses 236 and three primary mounting legs 442 are present, but other aspects can comprise more or fewer mounting recesses 236 and primary mounting legs 442. Furthermore, according to example aspects, the nozzle cap 150 can be a modular system wherein various components of the nozzle cap 150, such as the outer housing 230, can be easily removed and/or replaced, as desired. For example, it may be desired to remove the outer housing 230 temporarily for repair or to replace the removed outer housing 230 with a new outer housing 230 or a different cap body module. For example, the nozzle cap 150 can be similar to the modular nozzle cap disclosed in U.S. patent application Ser. No. 16/428,744, filed May 31, 2019, which is hereby specifically incorporated by reference herein in its entirety.

Figure 3:
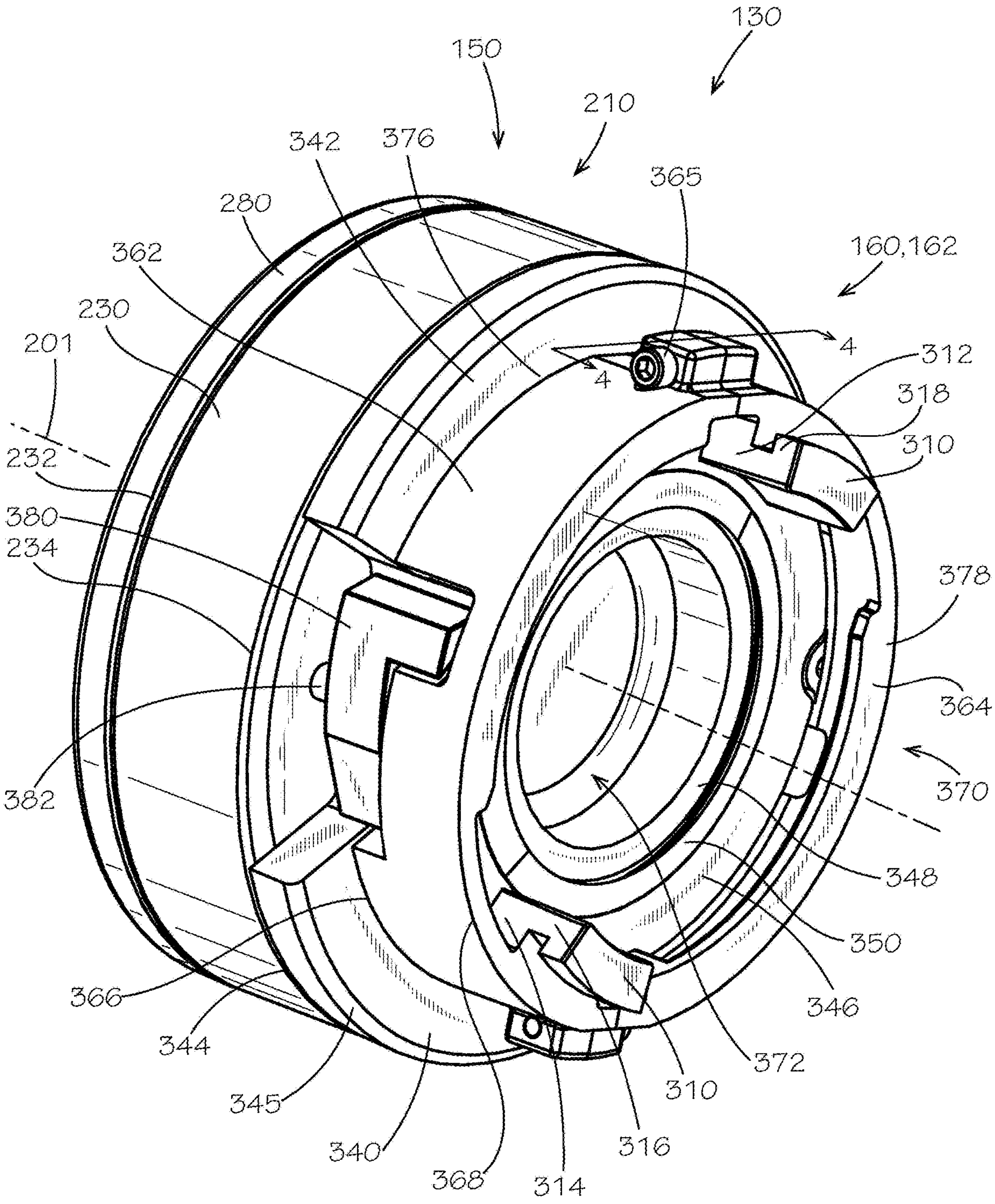
FIG. 3 is a rear perspective view of the nozzle cap of FIG. 1A coupled to the nozzle cap adapter of FIG. 1.

FIG. 3 illustrates a rear perspective view of the nozzle cap assembly 130 comprising the nozzle cap 150 and the nozzle cap adapter 160. As shown, the inner housing 340 of the cap body 210 is mounted to the outer housing 230 of the cap body 210. The inner housing 340 can comprise a housing body 342, which can be substantially disc-shaped in the present aspect. Other aspects of the housing body 342 can define any other suitable shape. The housing body 342 can generally define a first housing body end 344 and a second housing body end 345, wherein the primary mounting legs 442 (shown in FIG. 4A) can extend from the first housing body end 344. As such, in some aspects, when the primary mounting legs 442 are received within the mounting recesses 236 (shown in FIG. 2), the first housing body end 344 of the housing body 342 can be configured to abut the outer housing 230 at the second outer housing end 234 thereof. As shown, the nozzle cap adapter 160 can be coupled to the inner housing 340, wherein the nozzle cap adapter 160 can be configured to attach the nozzle cap 150 to the nozzle 140*a*. According to example aspects, the inner housing 340 can define an annular outer flange 346 and an annular inner flange 348, each of which can be substantially concentric to the cap axis 201. The annular outer flange 346 and annular inner flange 348 can extend generally axially away from the second housing body end 345 of the housing body 342, relative to the cap axis 201. According to example aspects, an annular gasket groove 460 (shown in FIG. 4A) can be defined between the annular outer flange 346 and the annular inner flange 348, and an annular gasket 350 can be received within the annular gasket groove 460, as shown. In example aspects, the gasket 350 can be configured to abut an end of the nozzle 140*a* when the nozzle cap 150 is mounted thereto, in order to create a seal between the nozzle cap 150 and the nozzle 140*a*.

Example aspects of the nozzle cap adapter 160 can comprise a first adapter segment 362 and a second adapter segment 364. Each of the first and second adapter segments 362,364 can be substantially semi-cylindrical in shape, such that the first and second adapter segments 362,364 can together define a substantially circular adapter ring 370. The circular adapter ring 370 can define an interior void 372, as shown. The first adapter segment 362 and second adapter segment 364 can be joined together by one or more adapter segment fasteners 365, as described in further detail below with respect to FIG. 4A. In example aspects, the first and second adapter segments 362,364 can be clamped around the outer flange 346 of the inner housing 340 to secure the adapter ring 370 thereto, as is also described in further detail below with respect to FIG. 4A. Example aspects of the nozzle cap adapter 160 can further comprise a latch 380 pivotally coupled to the first adapter segment 362 by a latch fastener 382. In other aspects, the latch 380 can be coupled to the second adapter segment 364. The latch 380 can be configured to engage the nozzle 140*a* (shown in FIG. 1A) to lock the nozzle cap assembly 130 onto the nozzle 140, preventing unintentional removable of the nozzle cap assembly 130 from the fire hydrant 110 (shown in FIG. 1A), as is described in further detail below with respect to FIG. 4A. In some example aspects, the latch 380 can be spring-loaded.

According to example aspects, as shown, each of the first and second adapter segments 362,364 can define a first adapter segment end 366 and a second adapter segment end 368. The first adapter segment end 366 of each of the first and second adapter segments 362,364 can be substantially aligned to generally define a first adapter ring end 376 of the adapter ring 370, and the second adapter segment end 368 of each of the first and second adapter segments 362,364 can be substantially aligned to generally define a second adapter ring end 378 of the adapter ring 370. As shown, each of the first and second adapter segments 362,364 can comprise a one of the nozzle connectors 310 extending from the corresponding second adapter segment end 368, away from the inner housing 340. In the present aspect, the nozzle connectors 310 can be oriented on substantially opposite circumferential sides of the adapter ring 370. In some aspects, as shown, each of the nozzle connectors 310 can generally define an L-shape, wherein a leg 312 of the nozzle connector 310 is coupled at a proximal end 314 thereof to the second adapter ring end 378 and extends substantially axially therefrom, and an arm 318 of the nozzle connector 310 extends from a distal end 316 of the leg 312 and extends substantially radially outward therefrom. As such, the arm 318 of the nozzle connector 310 can be oriented about perpendicular to the leg 312 of the nozzle connector 310. According to example aspects, one or both of the first and second adapter segments 362,364 can further define the ramped surface 403 extending from of the inner adapter segment surface 478 at or near the second adapter segment end 368. In example aspects, a height of each of the ramped surfaces 403 can increase along its length.

In example aspects, each of the nozzle connectors 310 can be configured to rotatably engage the U.S. Storz connector 141 (shown in FIG. 1A-1B) of the nozzle 140*a*. For example, in some aspects, each of the nozzle connectors 310 can be inserted into the insertion region 146 (shown in FIG. 1B) of a corresponding one of the arcuate slots 145*a,b* (shown in FIG. 1B) of the U.S. Storz connector 141. The nozzle cap assembly 130 can then be rotated in a first direction (e.g., clockwise) relative to the nozzle 140*a* to rotate each of the nozzle connectors 310 into the locking region 147 of the corresponding arcuate slot 145*a,b*. For example, in aspects wherein the nozzle cap adapter 160 is the U.S. Storz adapter 162, and the nozzle 140*a* is the U.S. Storz nozzle 142*a*, the nozzle cap assembly 130 can be rotated a quarter turn relative to the U.S. Storz nozzle 142*a* to engage the U.S. Storz adapter 162 therewith and to secure the nozzle cap assembly 130 thereto. As described above, the width of each locking region 147 can be lesser than the width of the corresponding insertion region 146. As such, when the nozzle connectors 310 are rotated into the corresponding locking regions 147, the arm 318 of each nozzle connector can engage the outer ring 143 of the U.S. Storz connector 141 to prohibit movement and/or removal of the nozzle cap assembly 130 in the axial direction. According to example aspects, the latch 380 can be configured to catch on one of the first and second connector arms 148*a,b* to prohibit rotation movement and/or removal of the nozzle cap assembly 130 in a reverse direction (e.g., counter-clockwise), as described in further detail below with respect to FIG. 4B. Moreover, each of the connector arms 148*a,b* of the U.S. Storz connector 141 can be configured to engage a corresponding one of the ramped surfaces 403 as the nozzle cap assembly 130 is rotated. In example aspects, as described above, the height of each of the ramped surfaces 403 can increase along its length. The rotation of the nozzle cap assembly 130 can move the connector arms 148*a,b* in the direction of the increasing height of the ramped surfaces 403, and as such, the ramped surfaces 403 can increasingly engage the connector arms 148*a,b* to tighten the nozzle cap assembly 130 onto the U.S. Storz connector 141.

Figure 4A:
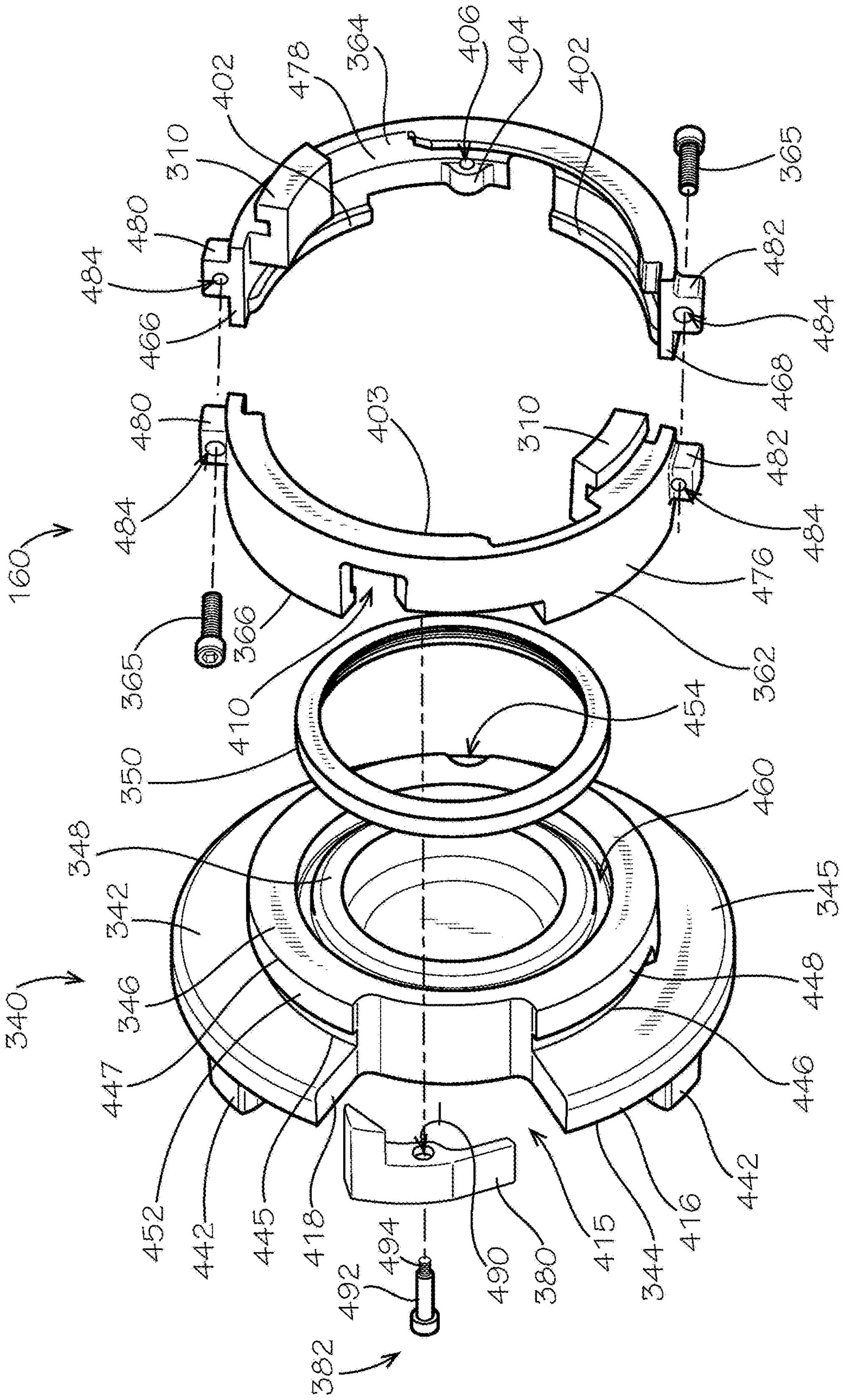
FIG. 4A is an exploded view of the nozzle cap adapter of FIG. 1A.

FIG. 4A illustrates an exploded view of the nozzle cap adapter 160 and the inner housing 340. As shown, the inner housing 340 can define the primary mounting legs 442 extending away from the first housing body end 344 of the housing body 342 in a substantially axial direction. The inner housing 340 can further define the outer flange 346 and inner flange 348 extending away from the second housing body end 345 of the housing body 342 in a substantially axial direction, and the gasket groove 460 can be defined between the outer and inner flanges 346,348. The annular gasket 350 is provided and can be received within the gasket groove 460 when assembled with the inner housing 340. In example aspects, one or more arcuate recesses 446 formed about a circumference of the outer flange 346 at a proximal flange end 445 of the outer flange 346, adjacent to the second housing body end 345. The arcuate recesses 446 can extend generally radially inward from an outer flange surface 448 of the outer flange 346, as shown, and a non-recessed portion 452 of the outer flange 346. As shown, example aspects of the outer flange 346 can further define a semi-cylindrical recess 454 formed in the outer flange surface 448 thereof. In the present aspect, the semi-cylindrical recess 454 can extend substantially along a length of the outer flange 346, from the proximal flange end 445 thereof to a distal flange end 447 thereof.

Each of the first and second adapter segments 362,364 can be substantially semicircular in shape and can define a first adapter segment circumferential end 466 and a second adapter segment circumferential end 468. Each of the first and second adapter segments 362,364 can further define an outer adapter segment surface 476 and an inner adapter segment surface 478. In the assembled configuration, the first adapter segment circumferential ends 466 of the corresponding first and second adapter segments 362,364 can be joined together and the second adapter segment circumferential ends 468 of the corresponding first and second adapter segments 362,364 can be joined together to couple the first adapter segment 362 to the second adapter segment 364. Coupling the first and second adapter segments 362,364 together can define the adapter ring 370 (shown in FIG. 3). In the present aspect, each of the first and second adapter segments 362,364 can define a first fastener block 480 at the corresponding first adapter segment circumferential end 466 thereof. Each of the first and second adapter segments 362,364 can further define a second fastener block 482 at the corresponding second adapter segment circumferential end 468 thereof. Each of the first and second fastener blocks 480,482 can extend outward from the outer adapter segment surface 476 of the corresponding first and second adapter segments 362,364. As shown, an adapter segment fastener hole 484 can be formed through each of the first and second fastener blocks 480,482. A first one of the adapter segment fasteners 365 can engage the adapter segment fastener holes 484 of the pair of first fastener blocks 480 to couple the first adapter segment circumferential ends 466 to one another, and a second one of the adapter segment fasteners 365 can engage the adapter segment fastener holes 484 of the pair of second fastener blocks 482 to couple the second adapter segment circumferential ends 468 to one another. In example aspects, each of the adapter segment fasteners 365 can define threading configured to engage mating threading formed in the corresponding adapter segment fastener holes 484. The coupling of the first adapter segment 362 to the second adapter segment 364 by the adapter segment fasteners 365 is shown and described in further detail below with respect to FIG. 4C.

One or both of the first and second adapter segments 362,364 can define one or more arcuate ribs 402 projecting generally radially inward from the corresponding inner adapter segment surface 478 and extending at least partially along a circumference of the inner adapter segment surface 478 adjacent to the first adapter segment end 366. In some aspects, one or both of the first and second adapter segments 362,364 can further define one or more substantially semi-cylindrical ribs 404 projecting generally radially inward from the corresponding inner adapter segment surface 478 and defining a substantially semi-circular cross section. In some aspects, the semi-cylindrical rib 404 can define a rib fastener hole 406 therethrough, as shown, as will be described in further detail below. Referring to the second adapter segment 364, in the present aspect, the semi-cylindrical rib 404 can be formed adjacent to the first adapter segment end 366 and can be oriented between a pair of the arcuate ribs 402.

To secure the first and second adapter segments 362,364 to the inner housing 340, each of the first and second adapter segments 362,364 can be clamped around the outer flange 346 of the inner housing 340, and each of the arcuate ribs 402 can be configured to engage the arcuate recesses 446 formed in the outer flange 346 to prevent axial movement of the first and second adapter segments 362,364 relative to the inner housing 340. For example, axial movement can be prevented by the interference of the non-recessed portion 452 of the outer flange 346 with the arcuate ribs 402. Furthermore, the semi-cylindrical rib(s) 404 can engage the corresponding semi-cylindrical recess(es) 454 formed in the outer flange 346 to prevent rotational movement of the first and/or second adapter segments 362,364 relative to the inner housing 340. The adapter segment fasteners 365 can then couple the first adapter segment 362 to the second adapter segment 364 to define the adapter ring 370 and to prevent removal of the adapter ring 370 from the inner housing 340.

As shown, the latch 380 can be a substantially L-shaped latch 380. In other aspects, the latch 380 can define any other suitable shape. The latch 380 can define a key fastener hole 490 extending therethrough. According to example aspects, the latch 380 can be configured to nest in a latch cutout 410 formed in the first adapter segment 362. In the present aspect, the latch cutout 410 can be substantially L-shaped to generally match the L-shape of the latch 380. Furthermore, example aspects of the latch cutout 410 can be formed at the first adapter segment end 366 and can extend from the outer adapter segment surface 476 to the inner adapter segment surface 478. In other aspects, the latch cutout 410 can be differently configured. In the present aspect, the first adapter segment 362 and second adapter segment 364 can be substantially the same; for example, in some aspects, the first and second adapter segments 362,364 may be formed from the same mold or an identical mold for ease of manufacturing. As such, in the present aspect, the second adapter segment 364 can also define the latch cutout 410, but the latch cutout 410 of the second adapter segment 364 can be superfluous. In other aspects, the first and second adapter segments 362,364 can differ in configuration.

The inner housing 340 can define an inner housing cutout 415 defined by a boundary 418. In example aspects, the inner housing cutout 415 can be aligned with the latch cutout 410 of the first adapter segment 362 and can be configured to receive at least a portion of the latch 380. Example aspects of the inner housing cutout 415 can extend radially inward from a peripheral edge 416 of the housing body 342, and in the present aspect, can extend from the first housing body end 344 to the second housing body end 345. In some aspects, as shown, the inner housing cutout 415 can also extend radially inward from the outer flange surface 448 of the outer flange 346 and can span the length of the outer flange 346 from the proximal flange end 445 to the distal flange end 447. As such, the inner housing cutout 415 can span a full length of the inner housing 340, from the first housing body end 344 to the distal flange end 447. In other aspects, the inner housing cutout 415 may not span the full length of the inner housing 340 and/or may not extend into the outer flange 346.

According to example aspects, the key fastener hole 490 of the latch 380 can be aligned with the rib fastener hole 406 of the semi-cylindrical rib 404 located on the first adapter segment 362. (In the present view, only the semi-cylindrical rib 404 of the second adapter segment 364 is visible.) In this configuration, the latch 380 can be received within the latch cutout 410 of the first adapter segment 362. To couple the latch 380 to the first adapter segment 362, the latch fastener 382 can extend through each of the key fastener hole 490 and the rib fastener hole 406. In the present aspect, as shown, the latch fastener 382 can define an un-threaded portion 492 configured to extend through the key fastener hole 490 and a threaded portion 494 configured to thread with mating threading (not shown) formed in the rib fastener hole 406. As such, the latch fastener 382 can be inserted through the key fastener hole 490, and then rotated to advance the engagement of the threaded portion 494 with the rib fastener hole 406, tightening the latch fastener 382 into the first adapter segment 362.

When the nozzle cap adapter 160 is assembled to the inner housing 340, the latch 380, or portions thereof, can be received within the inner housing cutout 415, as illustrated in FIG. 3. In example aspects, the latch 380 can be configured to engage the nozzle 140*a* (shown in FIG. 1A) when the nozzle cap assembly 130 (shown in FIG. 1A) is mounted thereto. For example, in a particular aspect, the spring-loaded latch 380 can be configured to slip over and catch on one of the connector arms 148*a,b* of the nozzle 140*a* to aid in securing the nozzle cap assembly 130 thereto. To remove the nozzle cap assembly 130 from the nozzle 140*a*, a user can push the latch 380 in to disengage the latch 380 from the first or second connector arms 148*a,b*, as described in further detail below, allowing for removal of the nozzle cap assembly 130.

Figure 4B:
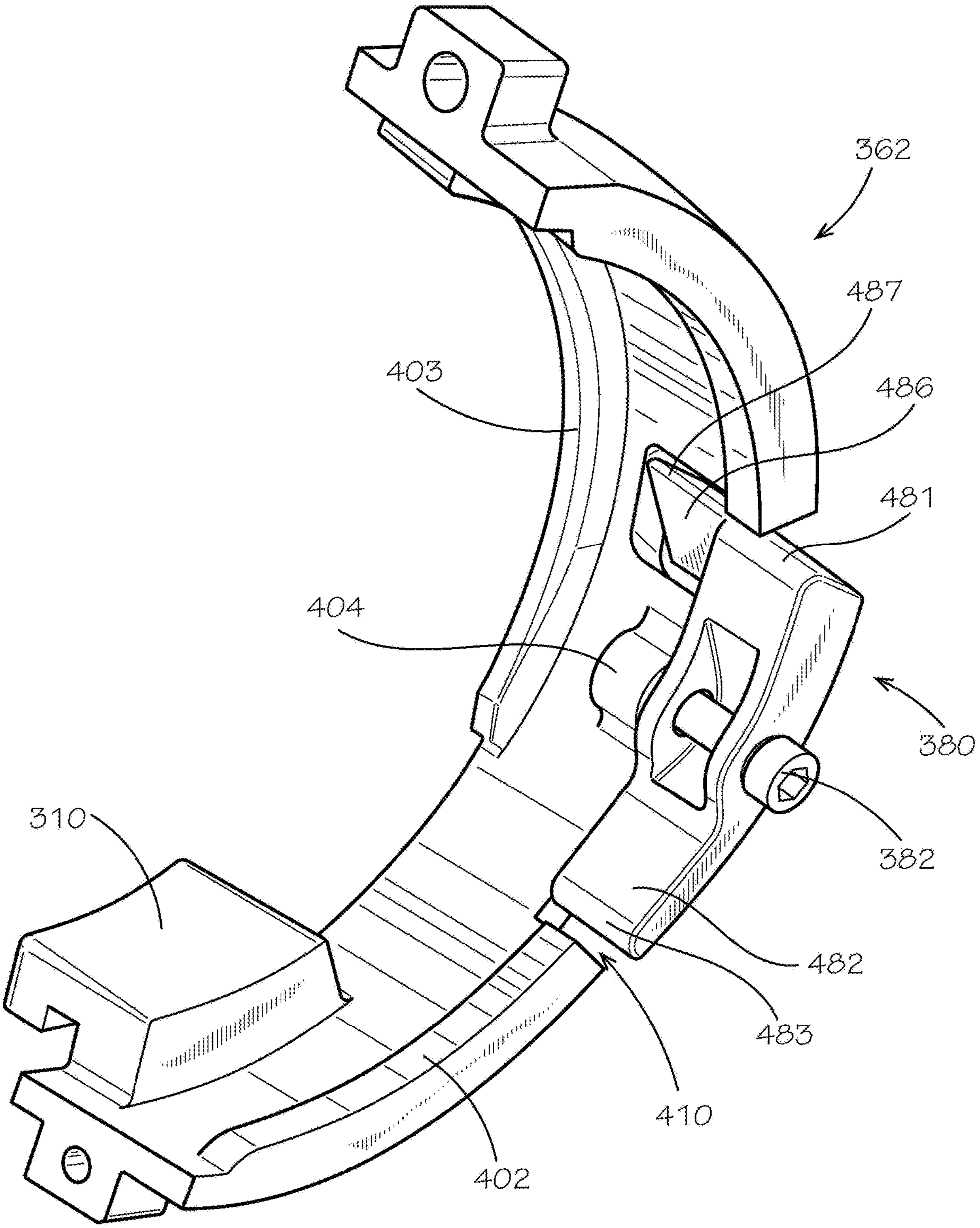
FIG. 4B is a perspective view of a first adapter segment of the nozzle cap adapter of FIG. 1A.

FIG. 4B illustrates the latch 380 in further detail. As shown, the latch 380 can be received within the latch cutout 410 and can be pivotably mounted to the first adapter segment 362 by the latch fastener 382. Example aspects of the latch 380 can be spring-biased to an engaged configuration, as shown, but can be rotatable to a disengaged configuration upon application of a sufficient force, as described in additional detail below. As shown, in the present aspect, the latch 380 can define a latch leg 482 defining a first latch leg end 481 and a second latch leg end 483. The latch 380 can further define a latch arm 486 extending from the latch leg 482 proximate to the first latch leg end 481 and oriented substantially perpendicular to the latch leg 482. According to some example aspects, the latch arm 486 may define a sloped latch surface 487, as shown. In the engaged configuration, the spring-biased latch 380 can be oriented such that the latch arm 486 can be rotated generally inward toward the cap axis 201 (shown in FIG. 3), while the second latch leg end 483 can rotated generally outward. In the disengaged configuration, a force (e.g., a manual force or a force supplied by a tool) can be applied to the second latch leg end 483 of the latch leg 482 to rotate the second latch leg end 483 inward and to rotate the latch arm 486 outward.

In example aspects, as described above, the nozzle connectors 310 of the nozzle cap adapter 160 (shown in FIG. 1A) can engage the insertion region 146 (shown in FIG. 1B) of a corresponding one of the arcuate slots 145*a,b* (shown in FIG. 1B) of the U.S. Storz connector 141 (shown in FIGS. 1A-1B), and the nozzle connectors 310 can be rotated in the first direction (e.g., clockwise) into the locking region 147 (shown in FIG. 1B) of the corresponding arcuate slot 145*a,b*. As the nozzle cap adapter 160 is rotated, the latch 380 can also be rotated towards a corresponding one of the connector arms 148*a* or 148*b*. When the latch 380 passes the corresponding connector arm 148*a,b*, the latch arm 486 of the spring-biased latch 380 can be biased inward (i.e., the latch arm 486 can pivot inward about the latch fastener 382 towards the cap axis 201), such that the latch 380 can catch against the corresponding connector arm 148*a,b*. The engagement of the latch arm 486 with the corresponding connector arm 148*a,b* can prohibit the nozzle cap adapter 160 from being rotated in the reverse direction (e.g., counter-clockwise), and thus, can prohibit removal of the nozzle cap assembly 130 (shown in FIG. 1A) from the fire hydrant 110 (shown in FIG. 1A). However, when a suitable force is applied to the second latch leg end 483 of the latch leg 482, the latch arm 486 can be pivoted outward, such that the latch 380 can clear the corresponding connector arm 148*a,b*, and the nozzle cap assembly 130 can be rotated in the reverse direction for removal from the fire hydrant 110.

Figure 4C:
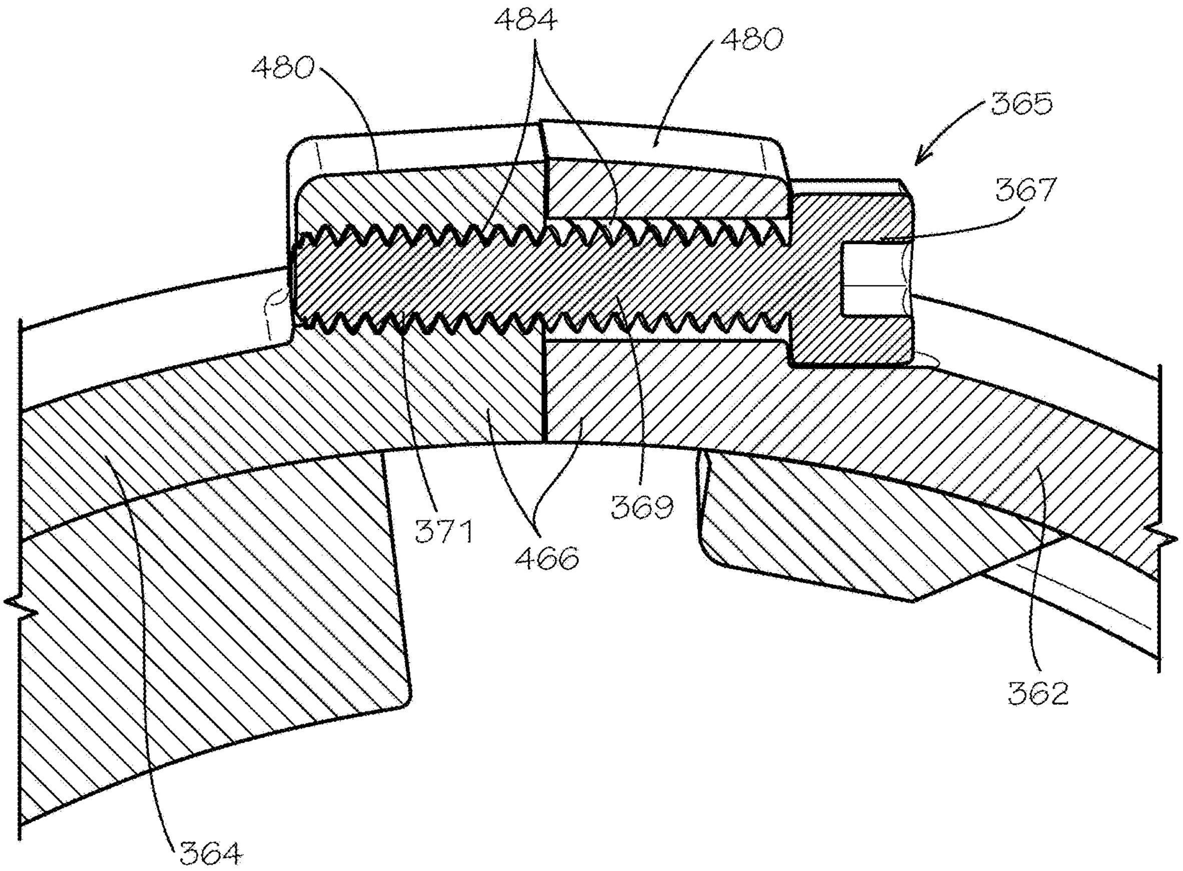
FIG. 4C is a detail cross-sectional view of a first adapter segment of the nozzle cap adapter of FIG. 1A coupled to a second adapter segment of the nozzle cap adapter of FIG. 1A, taken along line 4-4 of FIG. 3.

FIG. 4C illustrates a cross-sectional detail view of the first adapter segment circumferential ends 466 of the first and second adapter segments 362,364 joined together by the corresponding adapter segment fastener 365. As shown, in example aspects, the adapter segment fastener 365 can define a fastener head 367 and a fastener tail 369 extending from the fastener head 367. The fastener tail 369 can define fastener threading 371 in some aspects. In the present aspect, the fastener tail 369 can be inserted through the adapter segment fastener hole 484 of the first fastener block 480 of the first adapter segment 362, which can be an unthreaded hole in some aspects. The adapter segment fastener 365 can then thread into the adapter segment fastener hole 484 of the second adapter segment 364, which can be a threaded hole in the present aspect, to secure the first adapter segment 362 to the second adapter segment 364 at the first adapter segment circumferential ends 466 thereof. According to example aspects, the second adapter segment circumferential ends 468 can be secured together in substantially the same manner.

Figure 5:
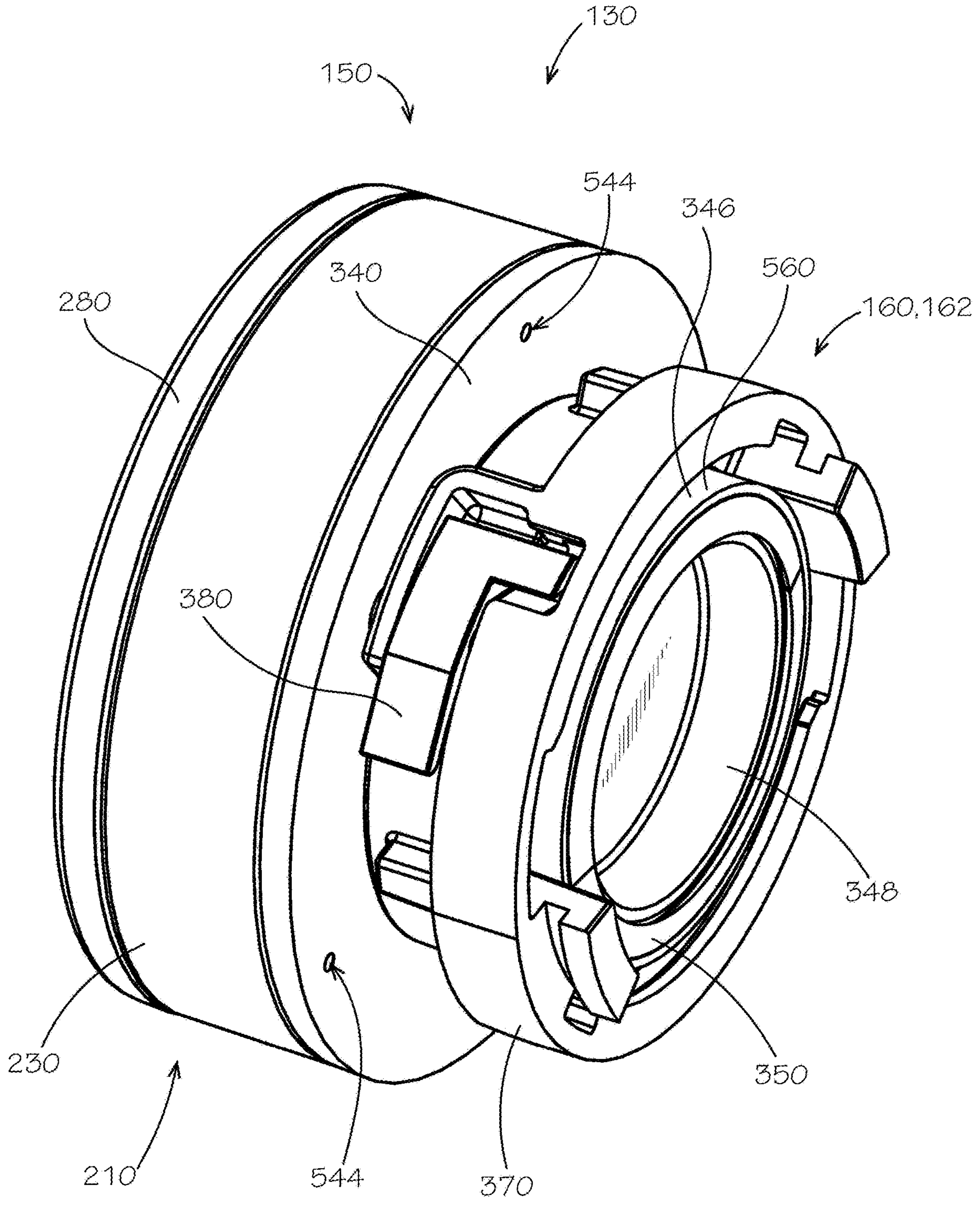
FIG. 5 is a rear perspective view of the nozzle cap coupled to the nozzle cap adapter, in accordance with another aspect of the present disclosure.

FIG. 5 illustrates the nozzle cap assembly 130 comprising the nozzle cap 150 and the nozzle cap adapter 160, in accordance with another aspect of the present disclosure. As shown, the nozzle cap 150 can comprise the cap cover 280 and the cap body 210, and the cap body 210 can comprise the outer housing 230 and the inner housing 340. The nozzle cap adapter 160 can be coupled to the inner housing 340 of the nozzle cap 150 to allow the nozzle cap 150 to be mounted to the nozzle 140*a* (shown in FIG. 1A) of the fire hydrant 110 (shown in FIG. 1A). For example, the nozzle cap adapter 160 can again be the U.S. Storz adapter 162, which can be configured to mount the nozzle cap 150 to the U.S. Storz nozzle 142*a* (shown in FIG. 1A). The nozzle cap adapter 160 can comprise the adapter ring 370, latch 380, and gasket 350, as shown. Furthermore, as shown in the present aspect, the inner housing 340 may not comprise the outer and inner flanges 346,348. Rather, the nozzle cap adapter 160 can comprise a gasket housing 560, and the gasket housing 560 can comprise the outer and inner flanges 346,348. The outer and inner flanges 346,348 of the gasket housing 560 can define the gasket groove 460 (shown in FIG. 6) therebetween, which can be configured to receive the gasket 350 therein. The gasket housing 560 can be coupled to one or both of the inner housing 340 and adapter ring 370, as described in further detail below with respect to FIG. 6. In some aspects, as shown, the inner housing 340 also may not comprise the inner housing cutout 415 (shown in FIG. 4A).

Figure 6:
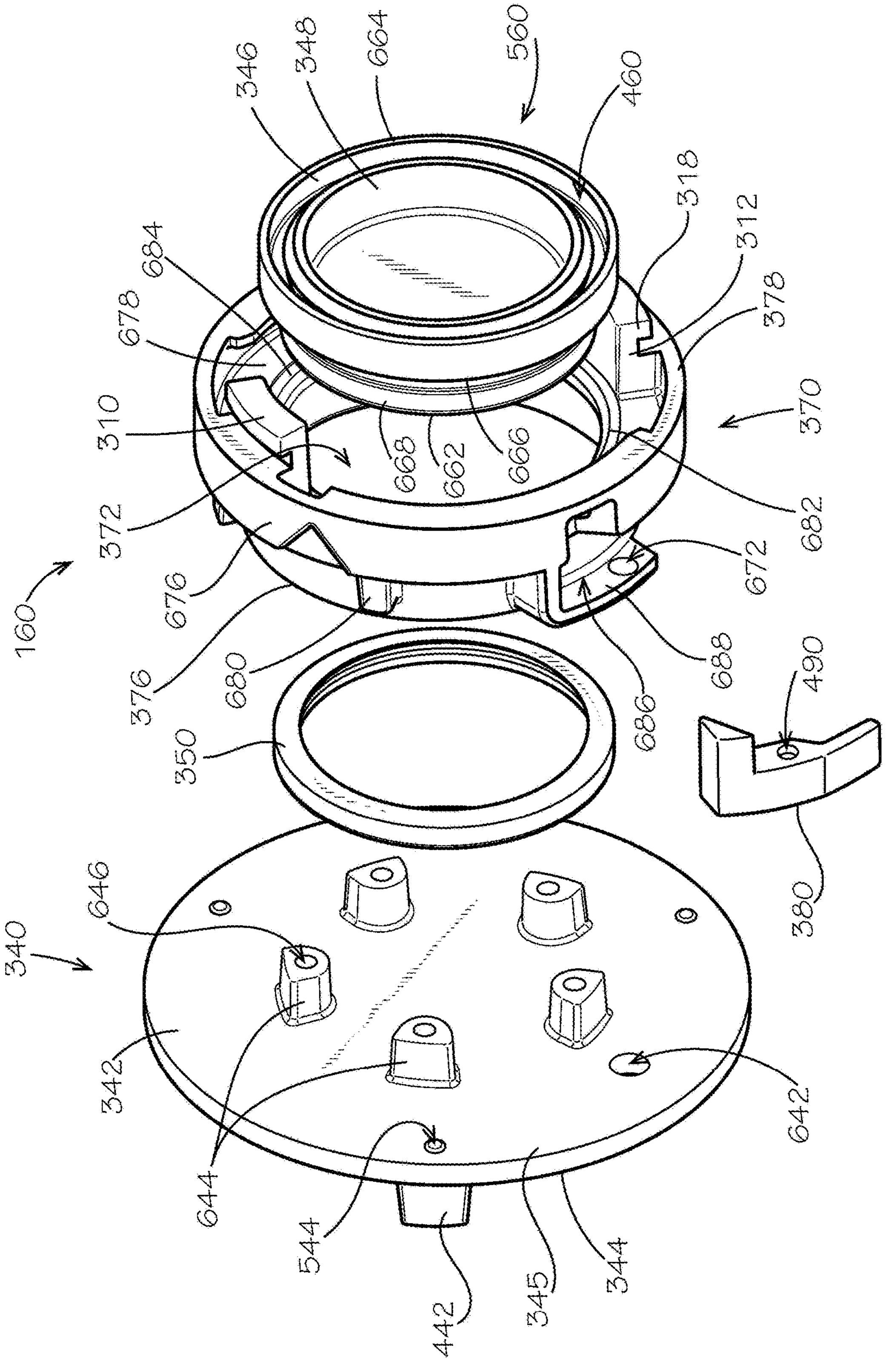
FIG. 6 is an exploded view of the nozzle cap adapter of FIG. 5.

FIG. 6 illustrates an exploded view of the inner housing 340 of FIG. 5 and the nozzle cap adapter 160 of FIG. 5. As shown, the inner housing 340 comprises the housing body 342 defining the first housing body end 344 and second housing body end 345. The primary mounting legs 442 can extend from the first housing body end 344 for mounting the inner housing 340 to the outer housing 230 (shown in FIG. 2). In some aspects, the inner housing 340 can further comprising a clearance hole 642, and the adapter ring 370 can define a first adapter ring key hole 672. The clearance hole 642 and the first adapter ring key hole 672 can be substantially aligned, as described in further detail below. Moreover, in the present aspect, the inner housing 340 can define one or more secondary mounting legs 644 extending from the second housing body end 345 generally in the axial direction. The secondary mounting legs 644 can be oriented radially inward from the primary mounting legs 442 in some aspects. As shown, each of the secondary mounting legs 644 can define a secondary mounting leg hole 646 configured to receive a gasket housing fastener (not shown) therethrough. For example and without limitation, the gasket housing fastener may be a screw or a bolt in some aspects. The gasket housing fastener(s) can be configured to engage the gasket housing 560, as described in further detail below, to couple the gasket housing 560 to the inner housing 340.

In some example aspects, as shown, the adapter ring 370 can be monolithically formed and may not comprise the first and second adapter segments 362,364 (shown in FIG. 3). The adapter ring 370 of the present aspect can be configured differently from the adapter ring 370 shown in the aspect of FIGS. 3-4C. However, similar to the aspect of FIGS. 3-4C, the present adapter ring 370 can define the first adapter ring end 376 and the second adapter ring end 378. The adapter ring 370 can further generally define an outer adapter ring surface 676 and an inner adapter ring surface 678. In the present aspect, one or more adapter ring reinforcement ribs 680 can extend from and be spaced about a circumference of the outer adapter ring surface 676. Furthermore, as shown, an annular adapter ring flange 682 can extend generally radially inward from the inner adapter ring surface 678, and can define a flange upper surface 684 and a flange lower surface (not shown). The nozzle connectors 310 can extend from the second adapter ring end 378 and can be oriented on substantially opposite sides of the adapter ring 370. The nozzle connectors 310 of the present aspect can define the L-shape, comprising the leg 312 and arm 318 as described above, and can be configured to engage the nozzle 140*a* (shown in FIG. 1A) to secure the nozzle cap assembly 130 (shown in FIG. 1A) to the nozzle 140*a*.

Moreover, the adapter ring 370 can define a latch alcove 686 formed therein for receiving the latch 380, similar to the latch cutout 410 (shown in FIG. 4A) described above. As shown, the latch 380 can be substantially similar to the latch 380 described above with respect to FIGS. 3-4A. For example, the latch 380 can be substantially L-shaped and can define the key fastener hole 490 extending therethrough. In the present aspect, the latch alcove 686 can be partially bound by a latch shelf 688 extending from the outer adapter ring surface 676, proximate to the first adapter ring end 376 thereof. The latch shelf 688 can define the first adapter ring key hole 672 formed therethrough. In some aspects, the adapter ring 370 can define a second adapter ring key hole (not shown) formed therein, wherein the second adapter ring key hole can be aligned with the first adapter ring key hole 672 and oriented at an opposing side of the latch alcove 686. As such, in example aspects, the latch fastener 382 (shown in FIG. 3) can extend through the first adapter ring key hole 672 and key fastener hole 490, and into the second adapter ring key hole, to couple the latch 380 to the adapter ring 370. In some aspects, when the nozzle cap adapter 160 is mounted to the inner housing 340, a portion of the latch fastener 382 may extend into the clearance hole 642. However, in other aspects, the latch fastener 382 may not extend into the clearance hole 642.

Example aspects of the gasket housing 560 can define a first gasket housing end 662 and a second gasket housing end 664. The outer and inner flanges 346,348 can be formed at the second gasket housing end 664, as shown. Furthermore, an annular gasket housing shoulder 666 can extend generally radially outward from an outer gasket housing surface 668 at a location between the first gasket housing end 662 and the outer and inner flanges 346,348. In some aspects, such as the present aspect, the gasket housing 560 may not be directly coupled to the adapter ring 370. However, in other aspects, the gasket housing 560 may be directly coupled to the adapter ring 370. For example, in one aspect, mechanical fasteners (e.g., screws, nuts and bolts, etc.) may be provided for coupling the gasket housing 560 to the adapter ring 370. In another example aspect, the gasket housing 560 may define external threading configured to thread into internal threading the adapter ring 370 (or vice versa) to couple the gasket housing 560 to the adapter ring 370. To mount the nozzle cap adapter 160 to the inner housing 340, the first adapter ring end 376 of the adapter ring 370 can be positioned to abut the second housing body end 345 of the housing body 342. The gasket housing 560 can then be inserted into the interior void 372 of the adapter ring 370. The annular gasket housing shoulder 666 can engage the flange upper surface 684 of the annular adapter ring flange 682 to retain the adapter ring 370 between the gasket housing 560 and the inner housing 340. Each of the secondary mounting legs 644 can extend into the interior void 372 of the adapter ring 370, and the secondary mounting leg hole 646 of each secondary mounting leg 644 can be aligned with a gasket housing hole (not shown) formed at the first gasket housing end 662. The gasket housing fastener (not shown) can be configured to extend through each of secondary mounting leg 644 holes 646 and into a corresponding one of the gasket housing holes to couple the gasket housing 560, and thus couple the nozzle cap adapter 160, to the inner housing 340.

Figure 7:
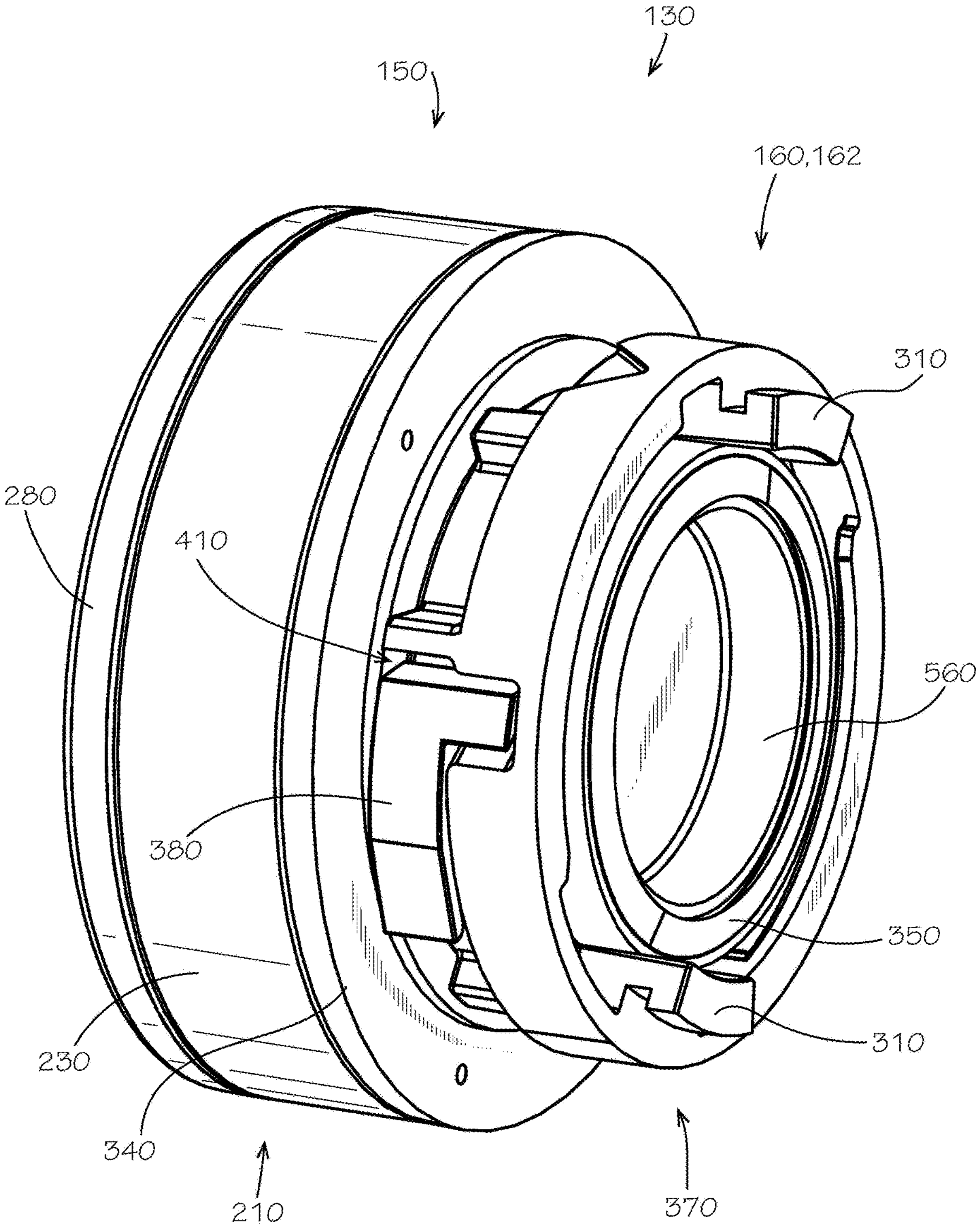
FIG. 7 is a rear perspective view of the nozzle cap coupled to the nozzle cap adapter, in accordance with another aspect of the present disclosure.

FIG. 7 illustrates the nozzle cap assembly 130 comprising the nozzle cap 150 and the nozzle cap adapter 160, in accordance with another aspect of the present disclosure. As shown, the nozzle cap 150 can comprise the cap cover 280 and the cap body 210, and the cap body 210 can comprise the outer housing 230 and the inner housing 340. The nozzle cap adapter 160, such as the U.S. Storz adapter 162, can be coupled to the inner housing 340 of the nozzle cap 150 to allow the nozzle cap 150 to be mounted to the nozzle 140*a*, such as the U.S. Storz nozzle 142*a* (both 140*a* and 142*a* shown in FIG. 1A), of the fire hydrant 110 (shown in FIG. 1A). The nozzle cap adapter 160 of the present aspect can be similar to the nozzle cap adapter 160 of FIGS. 5-6. For example, the nozzle cap adapter 160 can comprise the adapter ring 370 and the gasket housing 560. Furthermore, the latch 380 can be received in the latch cutout 410 of the adapter ring 370, and the gasket 350 can be received in the gasket groove 460 (shown in FIG. 8) of the gasket housing 560. However, in the present aspect, the inner housing 340 and portions of the adapter ring 370 can be configured differently from the aspect of FIGS. 5-6, as shown and described in further detail below with respect to FIG. 8.

Figure 8:
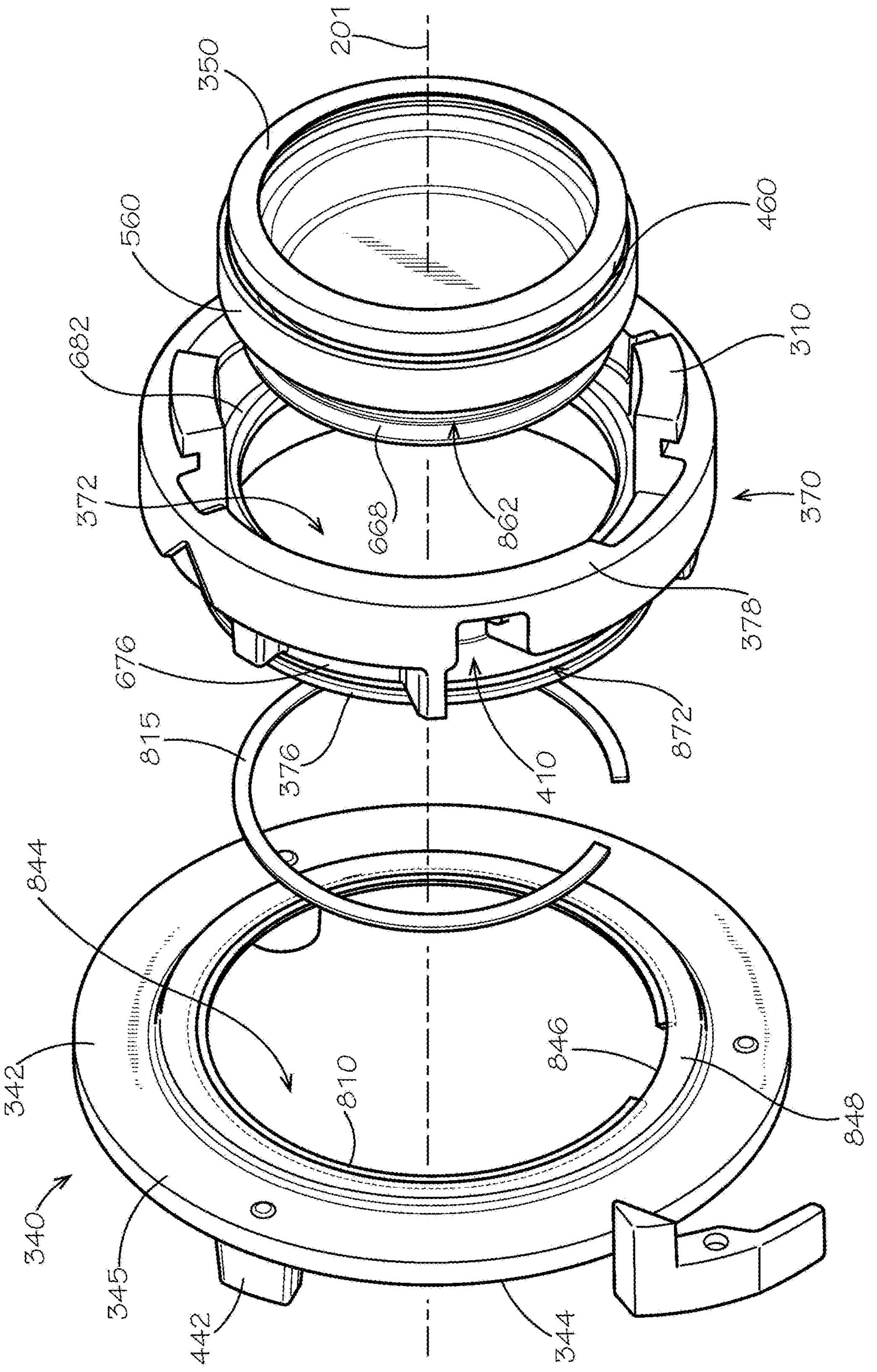
FIG. 8 is an exploded view of the nozzle cap adapter of FIG. 7.

FIG. 8 illustrates an exploded an exploded view of the inner housing 340 of FIG. 7 and the nozzle cap adapter 160 of FIG. 7. The nozzle cap adapter 160 can be similar to the nozzle cap adapter 160 of FIGS. 5-6, as described above. However, in the present aspect, the adapter ring 370 can comprise the latch cutout 410 instead of the latch alcove 686 (shown in FIG. 6). Furthermore, the inner housing 340 can define the housing body 342, and the housing body 342 can define the first housing body end 344 and the second housing body end 345. The primary mounting legs 442 can extend from the first housing body end 344 for engaging the mounting recesses 236 (shown in FIG. 2) of the outer housing 230 (shown in FIG. 2). A housing body opening 844 can be formed substantially through a center of the housing body 342, such that the housing body opening 844 is substantially concentric to the cap axis 201, and can extend from the first housing body end 344 to the second housing body end 345. In the present aspect, a first locking ring 810 can be provided for coupling the adapter ring 370 to the inner housing 340. As shown, the first locking ring 810 can abut an inner housing shoulder 848 formed at a boundary 846 of the housing body opening 844, preventing the first locking ring 810 from advancing through the housing body opening 844 in a direction towards the second housing body end 345. The first adapter ring end 376 can pass through the housing body opening 844, and the first locking ring 810 can be configured to engage an annular adapter ring slot 872 formed in the outer adapter ring surface 676 to couple the adapter ring 370 to the inner housing 340. Furthermore, in the present aspect, a second locking ring 815 can be provided for coupling the gasket housing 560 to the adapter ring 370. The second locking ring 815 can abut the flange lower surface of the annular adapter ring flange 682 to prevent the second locking ring 815 from advancing through the interior void 372 of the adapter ring 370 in a direction towards the nozzle connectors 310. The gasket housing 560 can be inserted into the interior void 372 through the second adapter ring end 378, and the second locking ring 815 can be configured to engage an annular gasket housing slot 862 formed in the outer gasket housing surface 668 of the gasket housing 560 to couple the gasket housing 560 to the adapter ring 370.

Figure 9:
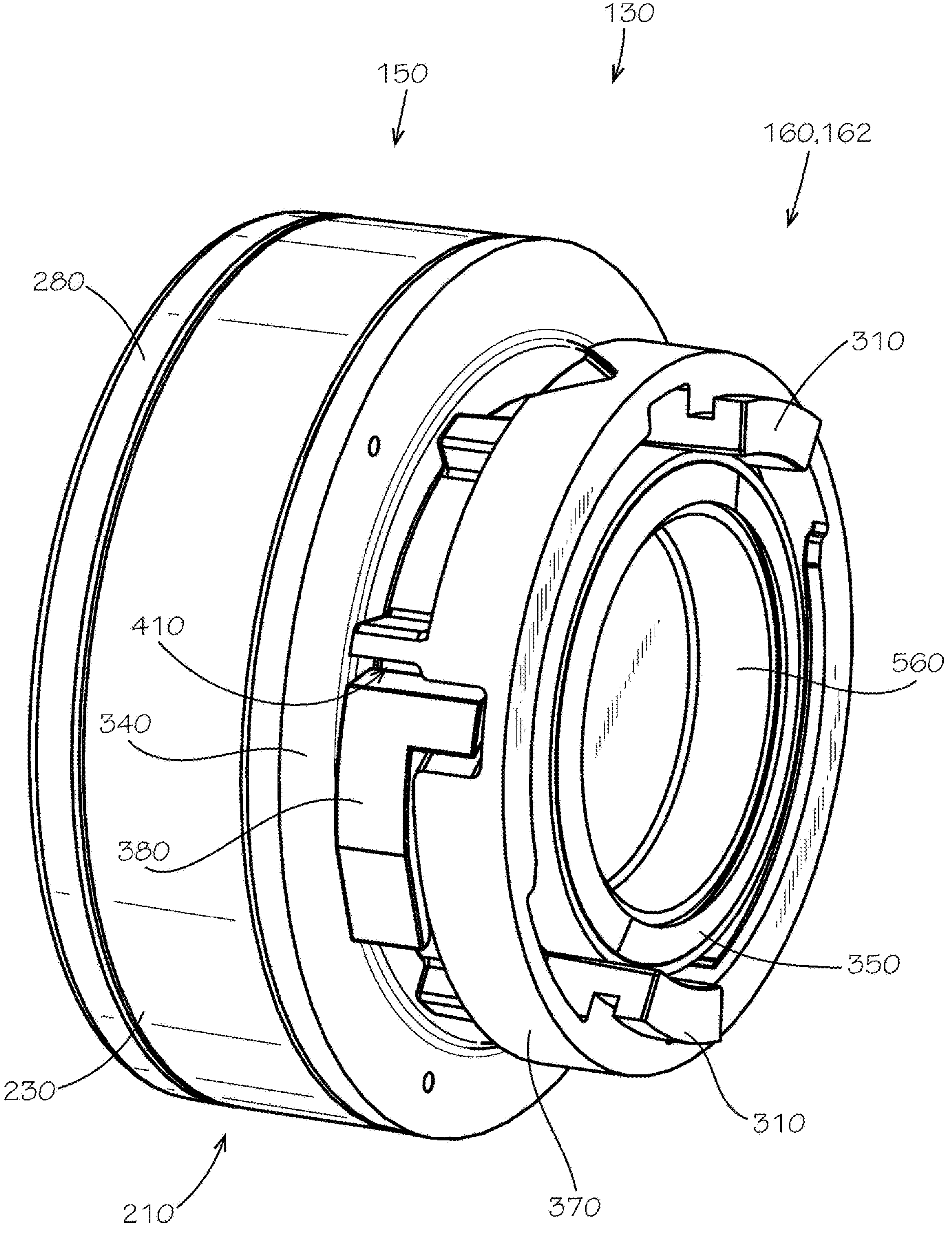
FIG. 9 is a rear perspective view of the nozzle cap coupled to the nozzle cap adapter, in accordance with another aspect of the present disclosure.

FIG. 9 illustrates the nozzle cap assembly 130 comprising the nozzle cap 150 and the nozzle cap adapter 160, in accordance with another aspect of the present disclosure. Again, the nozzle cap 150 can comprise the cap cover 280 and the cap body 210, and the cap body 210 can comprise the outer housing 230 and the inner housing 340. The nozzle cap adapter 160 can be coupled to the inner housing 340 of the nozzle cap 150 to allow the nozzle cap 150 to be mounted to the nozzle 140*a* (shown in FIG. 1A). The nozzle cap adapter 160 of the present aspect can be similar to the nozzle cap adapters 160 of FIGS. 5-6 and FIGS. 7-8. For example, the nozzle cap adapter 160 can comprise the adapter ring 370 and the gasket housing 560. Furthermore, the latch 380 can be received in the latch cutout 410 of the adapter ring 370, and the gasket 350 can be received in the gasket groove 460 (shown in FIG. 10) of the gasket housing 560. However, in the present aspect, the inner housing 340 and portions of the adapter ring 370 can be configured differently from the aspect of FIG. 5-6, as shown and described in further detail below with respect to FIG. 10.

Figure 10:
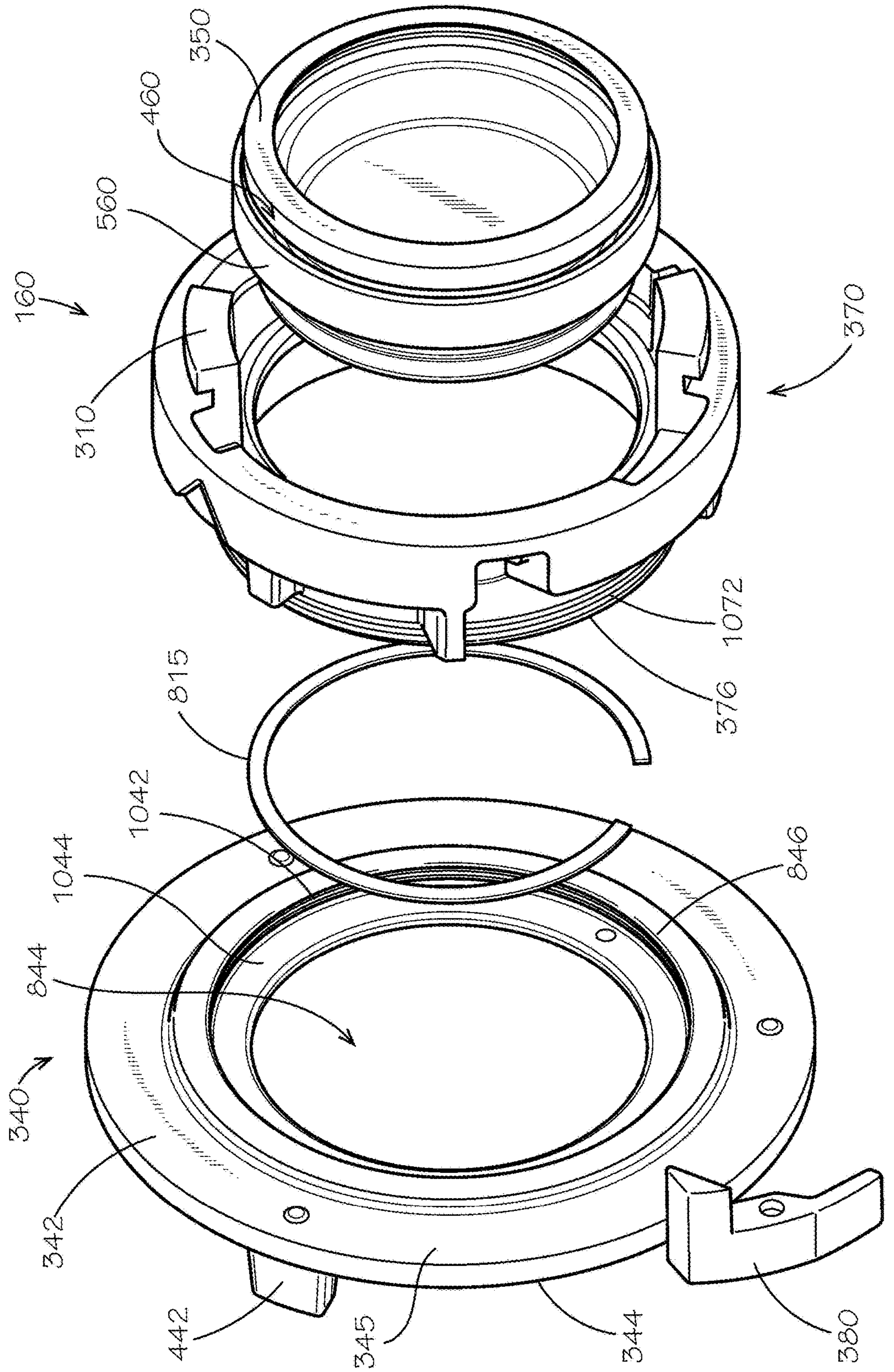
FIG. 10 is an exploded view of the nozzle cap adapter of FIG. 9.

FIG. 10 illustrates the inner housing 340 of FIG. 9 and the nozzle cap adapter 160 of FIG. 9. The gasket housing 560 can be substantially the same as the gasket housing 560 of FIGS. 7-9, and the second locking ring 815 can couple the gasket housing 560 to the adapter ring 370 in the same manner. However, the present aspect does not comprise the first locking ring 810 (shown in FIG. 8). Rather, the inner housing 340 can define internal threading 1042 formed at the boundary 846 of the housing body opening 844. Furthermore, the adapter ring 370 can define external threading 1072 formed on the outer adapter ring surface 676 proximate to the first adapter ring end 376. The external threading 1072 of the adapter ring 370 can thread into the internal threading 1042 of the inner housing 340 to couple the nozzle cap adapter 160 to the inner housing 340. In some example aspects, as shown, the inner housing 340 can define a housing body shoulder 1044 extending radially inward from the boundary 846 of the housing body opening 844 at the first housing body end 344 thereof. The housing body shoulder 1044 can serve as a stop by engaging the first adapter ring end 376 of the adapter ring 370 when the adapter ring 370 is appropriately tightened onto the inner housing 340.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A nozzle cap adapter comprising:

an adapter ring defining a cap axis and comprising an interior void extending through the adapter ring;

a nozzle connector extending from the adapter ring and configured to rotatably engage a fire hydrant nozzle; and a latch coupled to the adapter ring by a latch fastener defining a pivot axis, the latch configured to removably lock the nozzle cap adapter onto the fire hydrant nozzle;

wherein the adapter ring defines an L-shaped cutout, the latch is received within the L-shaped cutout, and the pivot axis is parallel to the cap axis.

2. The nozzle cap adapter of claim 1, wherein the adapter ring further comprises an inner adapter ring surface defined from a first end to a second end of the adapter ring and an annular adapter ring flange that extends radially inward from the inner adapter ring surface relative to the cap axis of the adapter ring.

3. The nozzle cap adapter of claim 2, wherein the annular adapter ring flange defines a flange upper surface.

4. The nozzle cap adapter of claim 1, further comprising an inner housing comprising a housing body defined from a first end to a second end of the inner housing, wherein the housing body comprises:

a mounting leg configured to engage a mounting recess of a cap body;

a locking ring opposite the mounting leg; and an inner housing shoulder configured to prevent the locking ring from advancing from the first end to the second end of the housing body.

5. The nozzle cap adapter of claim 4, wherein the inner housing shoulder defines a boundary of the housing body and a second locking ring abuts the adapter ring.

6. The nozzle cap adapter of claim 1, wherein the adapter ring comprises:

an annular ring flange on an inner adapter ring surface defining the interior void; and an adapter ring slot on an outer adapter ring surface opposite the inner adapter ring surface.

7. The nozzle cap adapter of claim 6, further comprising an inner housing defining a housing body, wherein a second locking ring is between the housing body and the adapter ring, the second locking ring is received in the adapter ring slot, and a gasket is received in the interior void, and the gasket abuts the inner adapter ring surface.

8. The nozzle cap adapter of claim 1, further comprising:

a gasket housing defining an outer gasket housing surface, a first end, a second end, and a gasket groove in the outer gasket housing surface; and a gasket received within the gasket groove, the gasket configured to engage the fire hydrant nozzle.

9. The nozzle cap adapter of claim 8, wherein the outer gasket housing surface engages an inner adapter ring surface defined in the adapter ring.

10. A nozzle cap assembly comprising:

a nozzle cap;

a nozzle cap adapter coupled to the nozzle cap, comprising:

an adapter ring defining a cap axis and comprising an interior void extending through the adapter ring; and an L-shaped cutout defined in the adapter ring; and a latch coupled to the adapter ring within the L-shaped cutout by a latch fastener defining a pivot axis, the latch configured to removably lock the nozzle cap assembly onto a nozzle;

wherein the pivot axis is parallel to the cap axis.

11. The nozzle cap assembly of claim 10, the nozzle cap adapter further comprising a gasket housing received in the interior void of the adapter ring, the gasket housing comprising a gasket received within a gasket groove defined in the gasket housing.

12. The nozzle cap assembly of claim 10, further comprising an inner housing comprising a housing body, a first locking ring, and a second locking ring, the first locking ring coupled to the housing body and the second locking ring between the housing body and the adapter ring.

13. The nozzle cap assembly of claim 10, further comprising an inner housing, wherein:

the inner housing defines a mounting leg, an inner housing shoulder, and a first locking ring;

a boundary defined on the inner housing shoulder; and the first locking ring coupled to the inner housing at the boundary.

14. A method for mounting a nozzle cap to a nozzle comprising:

providing a nozzle cap assembly, the nozzle cap assembly comprising the nozzle cap, a latch, and a nozzle cap adapter, the nozzle cap adapter coupled to the nozzle cap, the nozzle cap adapter comprising an adapter ring defining a cap axis and an L-shaped cutout, and a nozzle connector extending from the adapter ring, the latch being positioned in the L-shaped cutout and coupled to the adapter ring by a latch fastener defining a pivot axis;

engaging the nozzle connector with the nozzle; and rotating the nozzle cap assembly relative to the nozzle about the cap axis to secure the nozzle cap assembly and engage the latch with the nozzle;

wherein the pivot axis is parallel to the cap axis.

15. The method of claim 14, wherein engaging the nozzle connector with the nozzle comprises inserting the nozzle connector into an insertion region of an arcuate slot of the nozzle.

16. The method of claim 14, wherein rotating the nozzle cap assembly relative to the nozzle comprises rotating the nozzle connector within an arcuate slot of the nozzle to rotate the nozzle connector from an insertion region to a locking region of the arcuate slot.

* * * * *